US012674020B2

(12) United States Patent
Spiesschaert et al.

(10) Patent No.: US 12,674,020 B2
(45) Date of Patent: Jul. 7, 2026

(54) EPOXY-DERIVED COVALENT ADAPTABLE NETWORKS AND METHODS OF THEIR PRODUCTION

(71) Applicant: Universiteit Gent, Ghent (BE)

(72) Inventors: Yann Spiesschaert, Wondelgem (BE); Christian Michael Taplan, Bühl (DE); Johan Winne, Melle (BE); Filip du Prez, Ghent (BE)

(73) Assignee: Universiteit Gent, Ghent (BE)

( * ) Notice: Subject to any disclaimer, the term of this patent is extended or adjusted under 35 U.S.C. 154(b) by 1010 days.

(21) Appl. No.: 17/778,428

(22) PCT Filed: Nov. 24, 2020

(86) PCT No.: PCT/EP2020/083217

§ 371 (c)(1),
(2) Date: May 20, 2022

(87) PCT Pub. No.: WO2021/105127

PCT Pub. Date: Jun. 3, 2021

(65) Prior Publication Data

US 2023/0067778 A1 Mar. 2, 2023

(30) Foreign Application Priority Data

Nov. 26, 2019 (EP) .................................... 19211548

(51) Int. Cl.

*C08G 59/58* (2006.01)
*C08G 59/42* (2006.01)

(Continued)

(52) U.S. Cl.

CPC ......... *C08G 59/58* (2013.01); *C08G 59/4207* (2013.01); *C08K 3/04* (2013.01); *C08K 7/06* (2013.01); *C08K 7/14* (2013.01)

(58) Field of Classification Search

CPC ...... C08G 59/58; C08G 59/4207; C08K 3/04; C08K 7/06; C08K 7/14

(Continued)

(56) References Cited

U.S. PATENT DOCUMENTS

| | | | |
|---|---|---|---|
| 6,214,159 | B1 | 4/2001 | Pfeil et al. |
| 2013/0225725 | A1 | 8/2013 | Campbell et al. |

FOREIGN PATENT DOCUMENTS

| | | | | |
|---|---|---|---|---|
| EP | 3222682 B1 * | 9/2019 | ............. | B32B 27/30 |
| WO | WO-2021030739 A1 * | 2/2021 | ........... | B29C 43/003 |

OTHER PUBLICATIONS

Sanchez-Sanchez (Chem. Commun., 2014, 50, 1871-1874). (Year: 2014).*

(Continued)

*Primary Examiner* — Robert S Jones, Jr.
*Assistant Examiner* — Elizabeth Amato
(74) *Attorney, Agent, or Firm* — Ipsilon USA—NLO

(57) ABSTRACT

The invention relates to a composition comprising an epoxy-derived covalent adaptable network, preferably an epoxy vitrimer comprising at least one unit of formula (I)

(Continued)

(I)

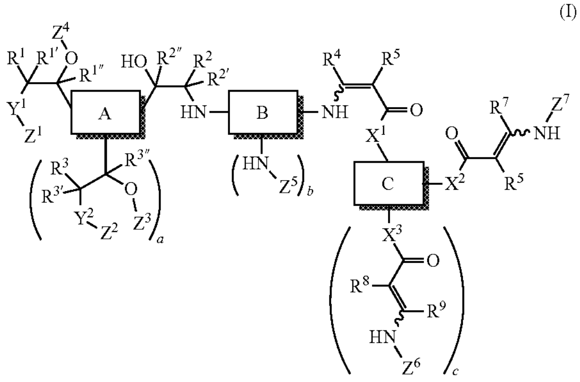

The invention further relates to a method for preparing a composition comprising an epoxy-derived covalent adaptable network by contacting at least one amine comprising primary, at least one vinylogous precursor comprising vinylogous precursor groups and at least one epoxide comprising epoxide groups whereby the number of amine groups, the number of vinylogous precursor groups and the number of epoxide groups is controlled.

17 Claims, 17 Drawing Sheets

(51) Int. Cl.

| | |
|---|---|
| *C08K 3/04* | (2006.01) |
| *C08K 7/06* | (2006.01) |
| *C08K 7/14* | (2006.01) |

(58) Field of Classification Search
USPC .......................................................... 524/612
See application file for complete search history.

(56) References Cited

OTHER PUBLICATIONS

Liu (Chemical Engineering Journal 368 (2019) 61-70). (Year: 2019).*
Epikote 828 Data Sheet (Year: 2025).*
Ancamine 2074 (EPA Comptox Database) (Year: 2025).*
Acocella (Year: 2016).*
Molecules (Year: 2024).*
Sartomer SR502 Data Sheet (Year: 2025).*
Liu et al: "Weldable, malleable and programmable epoxy vitrimers with high mechanical properties and water insensitivity", Chemical Engeneering Journal, vol. 368, Feb. 25, 2019 (Feb. 25, 2019), pp. 61-70, XP085647802, ISSN: 1385-8947, DOI: 10.1016/J.CEJ.2019.02.177.
Montarnal et al: "Silica-Like Malleable Materials from Permanent Organic Networks", vol. 334, No. 6058, Nov. 17, 2011 (Nov. 17, 2011), pp. 965-968, XP055040110, ISSN: 0036-8075, DOI: 10.1126/science.1212648.
Denissen et al: "Vitrimers: permanent organic networks with glass-like fluidity", Chemical Science, vol. 7, No. 1, 2016, pp. 30-38, XP055609548, United Kingdom. ISSN: 2041-6520, DOI: 10.1039/C5SC02223A.
Denissen et al: "Vinylogous urethane vitrimers", Adv. Function. Mater, vol. 25, Mar. 13, 2015 (Mar. 13, 2015), pp. 2451-2457, XP002799052, DOI: 10.1002/ADFM.201404553.

* cited by examiner

EPOXY-DERIVED COVALENT ADAPTABLE NETWORKS AND METHODS OF THEIR PRODUCTION

FIELD OF THE INVENTION

The present invention relates to compositions comprising an epoxy-derived covalent adaptable network, to methods for producing said compositions and to composites comprising said compositions.

BACKGROUND ART

Thermosets are the materials of choice for numerous applications because of their dimensional stability, mechanical properties and creep/chemical resistance. However, as a result of their permanent molecular architecture, thermosets cannot be reshaped, processed or recycled.

An attractive chemical strategy to introduce plasticity in cross-linked polymer networks is offered by the introduction of exchangeable chemical bonds, leading to dynamic cross-links. If chemical cross-links can be efficiently and reliably exchanged between different positions of the organic polymer chains, macroscopic flow can be achieved without risking structural damage or permanent loss of material properties. Polymer networks containing such exchangeable bonds are also known as covalent adaptable networks or CANs. CANs may be further classified into two groups depending on their exchange mechanism. The first group of CANs makes use of a dissociative cross-link exchange mechanism. In this exchange, chemical bonds are first broken and then formed again at another place. The second group of CANs makes use of associative bond exchanges between polymer chains, in which the original cross-link is only broken when a new covalent bond to another position has been formed.

In 2011, Leibler and co-workers extended the realm of associative CANs by adding a suitable transesterification catalyst to epoxy/acid or epoxy/anhydride polyester-based networks (Leibler et al. *Science,* 2011, 334, 965-968). This thermally triggered catalytic transesterification reaction resulted in permanent polyester/polyol networks that show a gradual viscosity decrease upon heating, a distinctive feature of vitreous silica, which had never been observed in organic polymer materials. Hence, the authors introduced the name vitrimers for those materials.

This new class of materials can be defined by some criteria. First, vitrimers are made of covalently bound chains forming an organic network. This network is furthermore able to change its topology via exchange reactions that are associative in nature and thermally triggered, resulting in the thermal malleability of the network. At higher temperatures, the viscosity of vitrimers is essentially controlled by chemical exchange reactions, giving a thermal viscosity decrease that follows the Arrhenius law, as is observed in typical inorganic silica materials. This latter property distinguishes vitrimers from dissociative CANs and thermoplastic materials because these materials evolve from a solid to a liquid state in a much more abrupt way, following the Williams-Landel-Ferry model for thermoplastic polymer melts. As vitrimers are permanent networks with a permanent connectivity at all temperatures (excluding degradation), these materials swell but do not dissolve in chemically inert solvents, even when heated. In contrast to classical polymer networks, swelling ratios can be expected to be higher since the elastic retractive forces, opposing the increase in entropy and heat of mixing associated with polymer swelling, can be relaxed due to topology rearrangements. For most applications, vitrimers should behave as classical thermosetting polymer networks in a useful temperature window, i.e. without significant creep. Only when heated, the network reorganization should become significant, resulting in a controlled macroscopic flow without risking structural damage. Thermal processing can even effectively repair defects, reminiscent to how classical materials such as metals or glass can be processed.

In the following years, a number of vitrimers based on different chemical exchange reactions have been developed. For example, WO2016/097169 describes a composition comprising a covalent adaptable network based on the presence of a combination of vinylogous urethane (—N—C═C—C(═O)—O—), vinylogous urea (—N—C═C—C(═O)—NR'—) or vinylogous amide (—N—C═C—C(═O)—CR'R"—) functions with free amines. These catalyst-free vitrimers rely on the transamination of said vinylogous urethane/urea/amide groups. A review of different classes of vitrimers and their properties can be found in Denissen et al. *Chemical science* 7.1 (2016): 30-38 or Scheutz, Georg M., et al. *Journal of the American Chemical Society* (2019).

Epoxy resins are a class of thermoset materials which are widely employed because of their good chemical resistance, mechanical properties, electrical insulating properties and adhesion. Furthermore, epoxidized compounds can be readily obtained from various double bound containing molecules via an oxidation reaction or it can be introduced by nucleophilic substitution via reaction with e.g. epichlorohydrin. This allows easy access to a wide variety of different monomers such as epoxidized soybean oil, epoxidized polyisoprene and bisphenol A diglycidyl ether. Finally, epoxides are versatile and are able to react with a broad range of functional groups, e.g. thiols, amines, carboxylic acids and anhydrides. Nevertheless, current epoxy materials are still irreversible thermoset materials that are unable to be repaired, reshaped or recycled, generating a significant amount of waste.

In order to obtain a material which combines the desirable properties of both vitrimers and epoxy resins, a number of attempts have been made wherein CAN chemistry was combined with epoxide monomers in a single material, with the aim of developing so-called epoxy vitrimers. For example, epoxide monomers have been employed in combination with transesterification (e.g. Leibler et al., *Science* 334(6058) (2011) 965-968; Torkelson et al. *Macromolecules* 2018, 51, 5537-5546), disulfide metathesis (e.g. Odriozola et al. *Mater. Horizons* 3(3) (2016) 241-247) and imine exchange (Wu et al. *Chemical Engineering Journal* 368 (2019) 61-70) based CAN chemistry to produce epoxy vitrimers. However, these epoxy vitrimers still display several important limitations. For example, they may rely on the use of a catalyst for formation and/or bond exchange, they may exhibit relatively slow exchange kinetics and/or they may result in dark or highly colored materials. Additionally, achieving vitrimer behaviour is often limited to specific monomers and/or monomer ratios, resulting in a relatively narrow application range.

It is an object of the present invention to provide epoxy-derived CANs which do not display one or more of the previously described disadvantages.

SUMMARY OF THE INVENTION

The present inventors have found epoxy-derived CANs wherein bond-exchange is based on the presence of a combination of vinylogous urethane (—N—C═C—C(═O)—O—), vinylogous urea (—N—C═C—C(═O)—NR'—) or vinylogous amide (—N—C═C—C(═O)—CR'R"—) functions with free amines. This unique combination of epoxide-derived permanent crosslinks with vinylogous urethane/urea/amide groups and free amines (allowing the transamination of said vinylogous bonds) in the same material results in an epoxy-derived CAN with distinctive properties, as will be shown in the appended examples. For example, the epoxy-derived CANs according to the invention exhibit vitrimer behaviour over a wide range of monomers and monomer ratios, effectively opening up a broad application window. Surprisingly, these materials have been found to possess low relaxation times and can be provided with a glass transition temperature in an economically relevant window (i.e. allowing the material to be used in many practical applications while not requiring excessive energy input for recycling). Furthermore, the epoxy-derived CANs according to the invention can be provided in transparent or translucent form and exhibit low discoloration upon heating (e.g. for reprocessing, recycling, repairing etc.).

Hence, in a first aspect the invention provides a composition comprising an epoxy-derived covalent adaptable network, preferably an epoxy vitrimer, said epoxy-derived covalent adaptable network comprising at least one unit of formula (I)

(I)

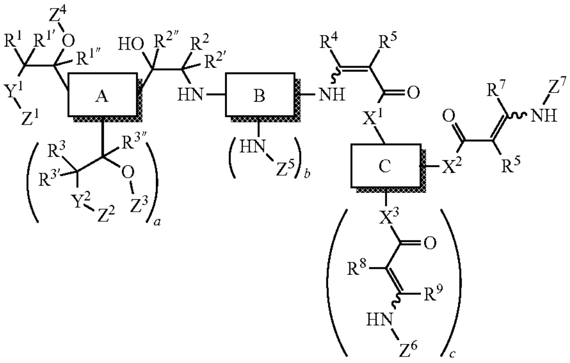

wherein

- $R^1$, $R^2$, $R^{1'}$, $R^{2'}$, $R^{1''}$, $R^{2''}$ and each occurrence of $R^3$, each occurrence of $R^{3'}$ and each occurrence of $R^{3''}$ are individually selected from the group consisting of H, alkyl, alkenyl, alkynyl, aryl, cycloalkyl, arylalkyl and polymeric groups, wherein one or wherein one or more of the carbon atoms in the backbone of said alkyl, alkenyl, alkynyl, aryl or cycloalkyl may be replaced by a heteroatom independently selected from 0, S. N and Si and/or wherein said alkyl, alkenyl, alkynyl, aryl or cycloalkyl may be substituted;
- $R^4$, $R^7$ and each occurrence of $R^9$ are individually selected from H or methyl;
- $R^5$, $R^6$ and each occurrence of $R^8$ are individually selected from H or methyl;
- $X^1$, $X^2$ and each occurrence of $X^3$ are individually selected from O, $CR^{10}R^{11}$ and $NR^{12}$;
- $R^{10}$, $R^{11}$ and $R^{12}$ are individually selected from H or methyl;
- $Y^1$ and $Y^2$ are individually selected from O and N;
- $Z^1$, $Z^2$, $Z^6$ and $Z^7$ represent the remainder of the epoxy-derived covalent adaptable network;
- $Z^3$, $Z^4$, and $Z^5$ represent H or the remainder of the epoxy-derived covalent adaptable network;
- A represents an epoxide linking moiety;
- B represents an amine linking moiety;
- C represents a vinylogous precursor linking moiety;
- a, b, and c individually represent an integer higher than or equal to 0;
- a+b+c is greater than or equal to 1; and wherein the composition further comprises primary amine groups.

In view of the versatility and richness of polymer chemistry, wherein many monomers/precursors (and resulting polymers) are known and commonly employed, it would be unduly limiting in view of the spirit and scope of the invention to define the CANs of the invention by anything else than their essential features. Hence, it will be understood by the skilled person that the epoxide linking moiety A, the amine linking moiety B, and the vinylogous precursor linking moiety C represent any chemical group capable of carrying their respective substituents. In preferred embodiments, the composition in accordance with the invention is provided wherein the epoxide linking moiety A, the amine linking moiety B and the vinylogous precursor linking moiety C each comprise or consist of a group independently selected from the group consisting of an alkyl, alkenyl, alkynyl, aryl, cycloalkyl, arylalkyl; wherein one or more of the carbon atoms in the backbone of said alkyl, alkenyl, alkynyl, aryl or cycloalkyl may be replaced by a heteroatom independently selected from O, S, N and Si; wherein said alkyl, alkenyl, alkynyl, aryl or cycloalkyl may be unsubstituted or further substituted. The alkyl comprises preferably $C_{1-40}$alkyl; the alkenyl comprises preferably $C_{2-40}$alkenyl; the alkynyl comprises preferably $C_{2-40}$alkynyl; the aryl comprises preferably $C_{6-24}$aryl; the cycloalkyl comprises preferably $C_{3-24}$cycloalkyl; and the arylalkyl comprises preferably $C_{6-24}$aryl$C_{1-40}$alkyl. More preferably, the epoxide linking moiety A, the amine linking moiety B and the vinylogous precursor linking moiety C each consist of a group independently selected from the group consisting of an unsubstituted $C_{1-10}$alkyl, $C_{6-15}$aryl, $C_{3-24}$cycloalkyl, $C_{6-12}$aryl$C_{1-10}$alkyl, wherein up to three of the carbon atoms in the backbone of said alkyl, aryl, cycloalkyl may be replaced by O or N.

In embodiments wherein the epoxide linking moiety A, the amine linking moiety B and/or the vinylogous precursor linking moiety C consists of a polymer, the polymer has preferably a molecular weight of at least 500 g/mol, at least 1000 g/mol or at least 2000 g/mol.

The unit of formula (I) has preferably at least one open attachment site to form a network.

In a further aspect, the invention provides a method for preparing a composition comprising an epoxy-derived covalent adaptable network, preferably an epoxy vitrimer, comprising the following steps:

a) providing at least one amine of formula (II) comprising primary amine groups, at least one vinylogous precursor of formula (III) comprising vinylogous precursor groups, and at least one epoxide comprising (2+a) epoxide groups (II)

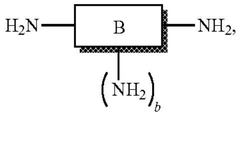

-continued (III)

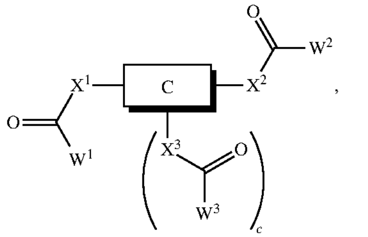

wherein $X^1$, $X^2$ and each occurrence of $X^3$ are individually selected from O, $CR^{10}R^{11}$ and $NR^{12}$;

$R^{10}$, $R^{11}$ and $R^{12}$ are individually selected from H or methyl;

$W^1$, $W^2$ and each occurrence of $W^3$ each represent a functional group so that $—X^1—C(=O)—W^1$, $—X^2—C(=O)—W^2$ and $—X^3—C(=O)—W^3$ constitute a vinylogous precursor group;

B represents an amine linking moiety;

C represents a vinylogous precursor linking moiety;

a, b, and c individually represent an integer higher than or equal to 0, preferably an integer selected from 0-50, more preferably an integer selected from the group consisting of 0, 1, 2, 3, and 4;

and b) contacting the compounds provided in step (a) thereby obtaining an epoxy-derived CAN;

wherein a vinylogous precursor group consists of or comprises a functional group which is capable of forming a vinylogous urethane, vinylogous amide or vinylogous urea upon reacting with a primary amine;

wherein the average functionality F, determined before the compounds are contacted and determined over all compounds provided in step (a), is at least 2.01, the average functionality F being defined as $$F = \frac{\sum n_i(2+a_i) + \sum n_j(2+b_j) + \sum n_k(2+c_k)}{\sum n_i + \sum n_j + \sum n_k}$$

wherein $n_i$ is the number of moles of epoxide with functionality $(2+a_i)$; $n_j$ is the number of moles of amine of formula (II) with functionality $(2+b_j)$ and $n_k$ is the number of moles of vinylogous precursor of formula (III) with functionality $(2+c_k)$; and wherein the ratio P, determined before the compounds are contacted and determined over all compounds provided in step (a), is more than 1, the ratio P being defined as $$P = \frac{\sum n_j(2+b_j)}{\sum n_i(2+a_i) + \sum n_k(2+c_k)}.$$

As described above, it would be unduly limiting in view of the spirit and scope of the invention to define the CANs of the invention by anything else than their essential features. Hence, it will be understood by the skilled person that the amine linking moiety B and the vinylogous precursor linking moiety C represent any chemical group capable of carrying their respective substituents. In preferred embodiments, the composition in accordance with the invention is provided wherein the amine linking moiety B and the vinylogous precursor linking moiety C each comprise or consist of a group independently selected from the group consisting of an alkyl, alkenyl, alkynyl, aryl, cycloalkyl, arylalkyl; wherein one or more of the carbon atoms in the backbone of said alkyl, alkenyl, alkynyl, aryl or cycloalkyl may be replaced by a heteroatom independently selected from O, S, N and Si; wherein said alkyl, alkenyl, alkynyl, aryl or cycloalkyl may be unsubstituted or further substituted. The alkyl comprises preferably $C_{1-40}$alkyl, the alkenyl comprises preferably $C_{2-40}$alkenyl, the alkynyl comprises preferably $C_{2-40}$alkynyl, the aryl comprises preferably $C_{6-24}$aryl, the cycloalkyl comprises preferably $C_{3-24}$cycloalkyl and the arylalkyl comprises preferably $C_{6-24}$aryl$C_{1-40}$alkyl. More preferably, the epoxide linking moiety A, the amine linking moiety B and the vinylogous precursor linking moiety C each consist of a group independently selected from the group consisting of an unsubstituted $C_{1-10}$alkyl, $C_{6-15}$aryl, $C_{3-24}$cycloalkyl, $C_{6-12}$aryl$C_{1-10}$alkyl, wherein up to three of the carbon atoms in the backbone of said alkyl, aryl, cycloalkyl may be replaced by O or N.

In embodiments wherein the amine linking moiety B and/or the vinylogous precursor linking moiety C consists of a polymer, the polymer has preferably a molecular weight of at least 500 g/mol, at least 1000 g/mol or at least 2000 g/mol.

In a further aspect, the invention provides an epoxy-derived covalent adaptable network obtainable by the method described herein.

In a further aspect, the invention provides a composite comprising an epoxy-derived covalent adaptable network as described herein and at least one fiber material, preferably at least one fiber material selected from the group consisting of glass fibers, carbon fibers or combinations thereof.

In a further aspect, the invention provides a polymer blend comprising an epoxy-derived covalent adaptable network as described herein and one or more additives, for example one or more additives selected from the group consisting of plasticizers, UV-stabilizers, flame retardants, impact modifiers, pigments, catalysts (for example p-toluene sulfonic acid) and antioxidants.

In a further aspect, the invention provides the use of a composition comprising an epoxy-derived covalent adaptable network, a composite comprising an epoxy-derived covalent adaptable network or a polymer blend comprising an epoxy-derived covalent adaptable network in processing techniques such as extrusion, injection moulding, compression moulding, transfer moulding, foam moulding, thermoforming, rotation moulding or 3D printing is provided.

BRIEF DESCRIPTION OF THE DRAWINGS

The present invention will be discussed in more detail below, with reference to the attached drawings, in which.

DESCRIPTION OF EMBODIMENTS

Figure 1:
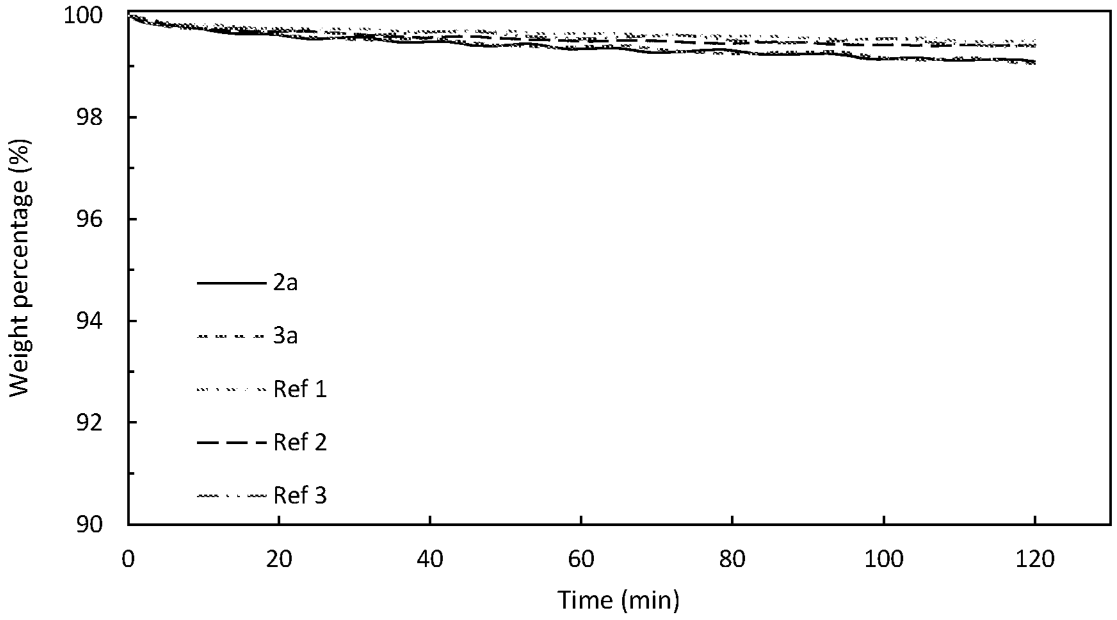
FIG. 1 depicts the isothermal TGA measurement at 150° C. for 120 minutes of selected materials as tested in example 5.

The present invention will be described with respect to particular embodiments and with reference to certain drawings, but the invention is not limited thereto but only by the claims.

When referring to the endpoints of a range, the endpoints values of the range are included.

As used herein, the singular forms “a”, “an”, and “the” include both singular and plural referents unless the context clearly dictates otherwise. By way of example, “a compound” means one compound or more than one compound.

As used herein, the term “and/or,” when used in a list of two or more items, means that any one of the listed items can be employed by itself or any combination of two or more of the listed items can be employed. For example, if a list is described as comprising group A, B, and/or C, the list can comprise A alone; B alone; C alone; A and B in combination; A and C in combination, B and C in combination; or A, B, and C in combination.

The terms “comprising”, “comprises” and “comprised of as used herein are synonymous with “including”, “includes” or “containing”, “contains”, and are inclusive or open-ended and do not exclude additional, non-recited members, elements or method steps. It will be appreciated that the terms “comprising”, “comprises” and “comprised of as used herein comprise the terms “consisting of”, “consists” and “consists of.

Reference throughout this specification to “one embodiment” or “an embodiment” are not necessarily referring to the same embodiment, although the features of the different embodiments described herein may be combined into other embodiments in any suitable manner, as would be apparent to a person skilled in the art from this disclosure.

The terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

The various embodiments, although referred to as “preferred” are to be construed as exemplary manners in which the invention may be implemented rather than as limiting the scope of the invention.

The expressions “at least one” and “one or more” are used interchangeably.

As used herein the term “vitrimer” or “vitrimer material” refers to a polymer material that is composed of a macromolecular network structure, but which possesses viscoelastic liquid behaviour at elevated temperatures through the presence of dynamic covalent bonds or cross-links. However, this viscoelastic behaviour is not caused by a depolymerisation or reversible opening of the network structure. At the chemical structural level, the network bonds in a vitrimer are preserved at all temperatures (excluding degradation temperature), giving a permanent network with a constant cross-link density, while network bonds can be rearranged through first making new bonds and then breaking old ones. In principle, this situation can be analytically verified by one skilled in the art via different spectroscopic methods at different temperatures (for example by infrared spectroscopy), as no net changes in bonding and chemical structure should occur. However, collection and interpretation of such spectroscopic data may be difficult. Therefore, a more practical solution to confirm whether a polymer material is a vitrimer, is to conduct stringent solubility tests with reactive solvents and with non-reactive solvents. For the purpose of this test a reactive solvent is a solvent being monofunctional in terms of one of the functionalities that is present as one of the bonding partners in the dynamic covalent chemistry implemented in the vitrimer. A reactive solvent comprises for example an amine or an acetoacetate such as hexylamine or butylamine to test whether the materials of this invention are considered as a vitrimer. A vitrimer material will fully dissolve in such a reactive solvent through depolymerisation, demonstrating the dynamic nature of the bonds, while non-vitrimer networks may or may not dissolve. On the other hand, a solvent lacking such functionality, but having a solubility parameter that resembles the one of the vitrimer material will not be able to depolymerise the vitrimer material. At every temperature, polymer chains will remain cross-linked into a permanent network, and cannot be removed by the action of an inert (non-reactive) solvent (except for network defects and a small soluble fraction that is not cross-linked). Common swelling tests and solubility tests, known to a person skilled in the art (such as soxhlet extractions), can thus be used to determine if a thermally reprocessable polymer network is a vitrimer. A suitable way to determine if a polymer of the invention is a vitrimer, is by adding 2 gram of the material to 20 mL of a solvent at elevated temperature (a temperature above $T_9$) to ensure exchange reactions occur on a reasonable timescale and determining if the polymer material completely dissolves within 24 hours, wherein the solvent has a Hildebrand solubility parameter similar to the Hildebrand solubility parameter of the polymer matrix (difference smaller than 2 $(MJ/m^3)^{1/2}$).

For covalent adaptable networks that can be thermally reprocessed as viscoelastic liquids but are not vitrimers, inert solvents can in principle remove all polymer chains from a network. The nature of the exchange mechanism operative in the materials of this invention can be confirmed by repeating the experiment with a high boiling amine (hexylamine, octylamine) as a solvent, which should lead to a complete dissolution of network depolymerisation.

In a first aspect, the invention provides a composition comprising an epoxy-derived covalent adaptable network, preferably an epoxy vitrimer, said epoxy-derived covalent adaptable network comprising at least one unit of formula (I)

(I)

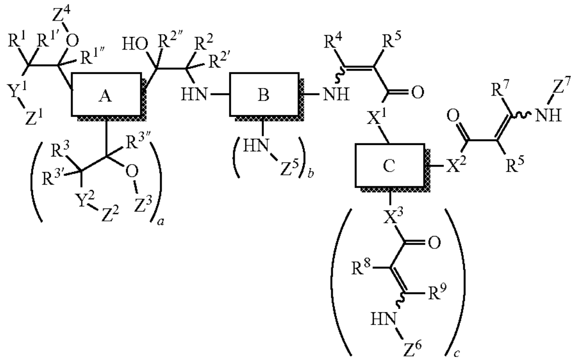

wherein $R^1$, $R^2$, $R^{1'}$, $R^{2'}$, $R^{1''}$, $R^{2''}$ and each occurrence of $R^3$, each occurrence of $R^{3'}$ and each occurrence of $R^{3''}$ are individually selected from the group consisting of H, alkyl (for example $C_{1-40}$alkyl, preferably methyl), alkenyl (for example $C_{2-40}$alkenyl), alkynyl (for example $C_{2-40}$alkynyl, aryl (for example $C_{6-24}$aryl), cycloalkyl (for example $C_{3-24}$cycloalkyl), arylalkyl (for example $C_{6-24}$aryl$C_{1-40alkyl}$) for example and polymeric groups, wherein one or wherein one or more of the carbon atoms in the backbone of said alkyl, alkenyl, alkynyl, aryl or cycloalkyl may be replaced by a heteroatom independently selected from O, S, N and Si and/or wherein said alkyl, alkenyl, alkynyl, aryl or cycloalkyl may be substituted;

$R_4$, $R_7$ and each occurrence of $R_9$ are individually selected from H or methyl, preferably $R_4$, $R_7$ and each occurrence of $R_9$ are the same, more preferably $R_4$, $R_7$ and each occurrence of $R_9$ are methyl;

$R_5$, $R_6$ and each occurrence of Ra are individually selected from H or methyl, preferably $R_5$, $R_6$ and each occurrence of Ra are the same, more preferably $R_5$, $R_6$ and each occurrence of $R_8$ are H; $R^4$, $R^7$ and each occurrence of $R^9$ are individually selected from H or methyl, preferably $R^4$, $R^7$ and each occurrence of $R^9$ are the same, more preferably $R^4$, $R^7$ and each occurrence of $R^9$ are methyl;

$R^5$, $R^6$ and each occurrence of $R^8$ are individually selected from H or methyl, preferably $R^5$, $R^6$ and each occurrence of $R^8$ are the same, more preferably $R^5$, $R^6$ and each occurrence of $R^8$ are H;

$X^1$, $X^2$ and each occurrence of $X^3$ are individually selected from O, $CR^{10}R^{11}$ and $NR^{12}$ preferably $X^1$, $X^2$ and each occurrence of $X^3$ are the same, preferably $X^1$, $X^2$ and each occurrence of $X^3$ are O;

$R^{10}$, $R^{11}$ and $R^{12}$ are individually selected from H or methyl, preferably $R^{10}$, $R^{11}$ and $R^{12}$ are the same, more preferably $R^{10}$, $R^{11}$ and $R^{12}$ are H;

$Y^1$ and $Y^2$ are individually selected from O and N;

$Z^1$, $Z^2$, $Z^6$ and $Z^7$ represent the remainder of the epoxy-derived covalent adaptable network;

$Z^3$, $Z^4$, and $Z^5$ represent H or the remainder of the epoxy-derived covalent adaptable network;

A represents an epoxide linking moiety;

B represents an amine linking moiety;

C represents a vinylogous precursor linking moiety;

a, b, and c individually represent an integer higher than or equal to 0, preferably an integer selected from 0-50, more preferably an integer selected from the group consisting of 0, 1, 2, 3, and 4;

a+b+c is greater than or equal to 1; and wherein the composition further comprises primary amine groups.

The epoxide linking moiety A, the amine linking moiety B and the vinylogous precursor linking moiety C may comprise may represent any chemical group as described above. The embodiments for A, B and C described herein elsewhere in relation to the method for preparing a composition comprising an epoxy-derived covalent adaptable network of the present disclosure are equally applicable in the context of composition in accordance with the invention and are not repeated here for the sake of conciseness.

In embodiments wherein the epoxide linking moiety A, the amine linking moiety B and/or the vinylogous precursor linking moiety C consists of a polymer, the polymer has preferably a molecular weight of at least 500 g/mol, at least 1000 g/mol or at least 2000 g/mol.

In case any of all of $R^1$, $R^2$, $R^3$, $R^{1'}$, $R^{2'}$, $R^{3'}$, $R^{1''}$, $R^{2''}$, $R^{3''}$ comprise a polymeric group, such polymeric group refers to structure comprising multiple repetition of units derived from molecules of low relative molecular mass. Examples of polymeric groups comprise polyesters, polyacrylates, polyurethanes, polyethylene oxide, polymethacrylate, polystyrene, copolymer of acrylate, poly(methyl methacrylate), methacrylate and/or styrene, poly(isobornyl acrylate), polyacrylonitrile, polyether; polylactic acid, polyamide, polyester amide, polycarbonate, poly-alpha-olefin, ethylene propylene diene monomer (M-class) rubber (EPDM), ethylene propylene rubber (EPM), hydrogenated or unhydrogenated polybutadienes, acrylonitrile butadiene styrene (ABS), styrene-butadiene rubber (SBR), polysiloxanes; and/or block, comb and/or star copolymers of such polymeric groups.

Preferably, $R^1$, $R^2$, $R^{1'}$, $R^{2'}$, $R^{1''}$, $R^{2''}$ and each occurrence of $R^3$, each occurrence of $R^{3'}$ and each occurrence of $R^{3''}$ are selected from H and methyl.

Preferably, $R^1$, $R^2$ and each occurrence of $R^3$ are the same. More preferably, $R^1$, $R^2$ and each occurrence of $R^{3'}$ are H or methyl.

Preferably, $R^{1'}$, $R^{2'}$ and each occurrence of $R^{3'}$ are the same. More preferably, $R^{1'}$, $R^{2'}$ and each occurrence of $R^{3'}$ are H or methyl.

Preferably $R^{1''}$, $R^{2''}$ and each occurrence of $R^{3''}$ are the same. More preferably, $R^{1''}$, $R^{21}$ and each occurrence of $R^{3''}$ are H or methyl.

Most preferably, $R^1$, $R^2$, $R^{1'}$, $R^{2'}$, $R^{1''}$, $R^{2''}$ and each occurrence of $R^3$, each occurrence of $R^{3'}$ and each occurrence of $R^{3''}$ are the same. More preferably, $R^1$, $R^2$, $R^{1'}$, $R^{2'}$, $R^{1''}$, $R^{2''}$ and each occurrence of $R^3$, each occurrence of $R^{3'}$ and each occurrence of $R^{3''}$ are H or methyl.

As is explained herein in more detail in the context of another aspect of the invention, the compositions of the invention are obtainable from a reaction employing at least three compounds, each compound respectively having at least two epoxide groups, primary amine groups or vinylogous precursor groups. The reaction preferably comprises a step-growth reaction as for example a condensation or addition reaction. In view of the nature of these reactions, it will be appreciated by the skilled person that it is impossible to provide an exact molecular definition of the resulting covalent adaptable network.

However, the present inventors believe that a unique and distinctive feature of the present epoxy-derived CANs resides in the combination of the vinylogous urethane, amide or urea (linking B to C) with the epoxide-derived beta-hydroxy amines (linking A to B) as reflected in the unit of formula (I). Without wishing to be bound by any theory, it is believed that the surprisingly low relaxation times observed with the CANs in accordance with the invention are related to the presence of said hydroxyl groups, which may act as internal catalysts for the transamination of the vinylogous urethane/amide/urea groups.

As will be understood by the skilled person, depending on the nature of X, the bond between B and C is a so-called vinylogous urethane, a vinylogous amide or a vinylogous urea, i.e. a urethane/amide/urea function wherein the nitrogen (N) is separated from the carbonyl (C═O) by a double bond). As is known to the skilled person, enamines may exist in equilibrium with their imine form (also known as the imine-enamine tautomery). For the purposes of the present invention, any vinylogous urethane/amide/urea converted into its imine form is considered a vinylogous urethane/amide/urea.

The relaxation time is an important parameter with a view to the processability of CANs, influencing e.g. how much time will be needed for initial material shaping or for recycling. As will be shown in the appended examples, the present inventors have found that the epoxy-derived CANs according to the invention exhibit surprisingly low relaxation times. Hence, with a view to industrial processability, in preferred embodiments, the composition according to the invention is provided exhibiting a relaxation time of less than 2 hours at a temperature of less than or equal to 200° C. or a relaxation time of less than 2 hours at a temperature of less than or equal to 150° C., preferably a relaxation time of less than 1 hour at a temperature of less than or equal to 200° C. or a relaxation time of less than 1 hour at a temperature of less than 150° C. In embodiments, the composition according to the invention is provided exhibiting a relaxation time of less than 10 minutes at a temperature of 150° C., preferably a relaxation time of less than 5 minutes at a temperature of 150° C., more preferably a relaxation time of less than 1 minute at a temperature of 150° C.

Furthermore, the present inventors have found that the low relaxation time of the epoxy-derived CANs according to the invention is maintained even after repeated heating-cooling cycles, reflecting the excellent recyclability of the materials. Hence, in preferred embodiments, the composition according to the invention is provided wherein the relaxation time determined after 3 heating-cooling cycles is less than 2 hours at a temperature of less than or equal to 200° C. or less than 2 hours at a temperature of less than or equal to 150° C.; preferably the relaxation time determined after 3 heating cycles is less than 1 hour at a temperature of less than or equal to 200° C. or less than 1 hour at a temperature of less than or equal to 150° C.; wherein each heating-cooling cycle comprises heating the composition from 20° C. to 200° C. or from 20° C. to 150° C., maintaining the temperature at 200° C. or at 150° C. for at least 10 minutes and cooling the composition back to room temperature. In embodiments, the composition according to the invention is provided wherein the relaxation time determined after 3 heating-cooling cycles is less than 10 minutes at a temperature of 150° C.; preferably the relaxation time determined after 3 heating cycles is less than 1 minute at a temperature of 150° C.; wherein each heating-cooling cycle comprises heating the composition from 20° C. to 150° C., maintaining the temperature at 150° C. for at least 10 minutes and cooling the composition back to room temperature.

A preferred method for determining the relaxation time is through stress-relaxation experiments using an Anton-Paar MCR 302 rheometer with a plate diameter of 8 mm, using a constant shear strain within the linear viscoelastic region (LVER) and a constant force to ensure contact between the plate and the sample and using samples having a diameter of 8 mm and a thickness of 1 mm. Hence, in embodiments the epoxy-derived CANs according to the invention are provided having the relaxation times described herein are determined using this method.

The present inventors have found that the epoxy-derived CANs according to the invention exhibit surprisingly low creep, such that they are suitable for use in many practical applications which have traditionally been reserved for thermoset materials. Hence, in preferred embodiments, the composition according to the invention is provided exhibiting less than 10% irreversible deformation at a temperature of 80° C. with an applied stress of 5000 Pa for 20 minutes; preferably less than 5%, preferably less than 2% or less than 1%.

A particular method for determining the irreversible deformation is through creep experiments using an Anton-Paar MCR 302 rheometer with a plate diameter of 8 mm, and using samples having a diameter of 8 mm and a thickness of 1 mm. Hence, in embodiments the epoxy-derived CANs according to the invention are provided exhibiting less than 10% irreversible deformation at a temperature of 80° C. with an applied stress of 5000 Pa for 20 minutes; preferably less than 5%, preferably less than 2% or less than 1% as determined using this method.

In preferred embodiments, the composition according to the invention is provided having an activation energy of more than 50 kJ/mol. In preferred embodiments the activation energy is calculated from an Arrhenius plot of relaxation times determined at different temperatures within the linear viscoelastic region, wherein the relaxation times are determined stress-relaxation experiments using an Anton-Paar MCR 302 rheometer with a plate diameter of 8 mm, using a constant shear strain within the LVER and a constant force to ensure contact between the plate and the sample and using samples having a diameter of 8 mm and a thickness of 1 mm.

As will be understood by the skilled person, in view of the disclosure herein, depending on the choice of backbone polymers, epoxy-derived CANs according to the invention may be provided which behave similar to a thermoset at low temperatures (such as room temperature) or which behave similar to an elastomer at low temperatures (such as room temperature).

Preferred epoxy-derived CANs according to the invention behave similar to a thermoset at low temperature (such as room temperature). Hence, in embodiments, the composition according to the invention is provided which has a glass transition temperature Tg of 60-200° C., preferably 70-150° C. In highly preferred embodiments of the invention, the composition according to the invention is provided which is a thermoset having a glass transition temperature Tg of 60-200° C., preferably 70-150° C. This may be achieved by employing rigid monomers such as bisphenol A diglycidyl ether or 4-4'-diaminocyclohexylmethane in the polymer backbone.

Alternative epoxy-derived CANs according to the invention behave similar to an elastomer at low temperature (such as room temperature). Hence, in embodiments, the composition according to the invention is provided which has a glass transition temperature Tg for example ranging between −20° C. and −130° C. In highly preferred embodiments of the invention, the composition according to the invention is provided which is an elastomer having a glass transition temperature Tg of −70° C.

A preferred way to determine the glass transition temperature is employing a Mettler Toledo instrument 1/700 to perform differential scanning calorimetry (DSC) measurements under nitrogen atmosphere with a heating rate of 10° C./min and a cooling rate of 10° C./min, and determining the glass transition temperature at the second cycle.

In embodiments, the composition according to the invention is provided which has a tensile strength characterised by a % elongation at break at 25° C. of more than 5%, preferably more than 8%, more preferably more than 10%. A preferred way of testing the % elongation at break is employing a Tinius-Olsen H10KT tensile tester, equipped with a load cell (for example a 5000 N load cell) using a speed of 10 mm/min and a pre-load of for example 0.05 N, using flat dog-bone type specimens with an effective gauge length of 13 mm, a width of 2 mm and a thickness of 1 mm, wherein the samples were cut out using a Ray-Ran dog-bone cutter.

The present inventors have found that the epoxy-derived CANs according to the invention do not suffer from undesirable dark discoloration and may be provided having desirable optical properties. Hence, in embodiments, the composition according to the invention is provided characterized by a haze of less than 30%, preferably less than 15%, more preferably less than 5% as determined in accordance with ASTM D1003 (2013) employing CIE standard Illuminant C and/or a total hemispherical luminous transmittance of more than 70%, preferably more than 85%, more preferably more than 95% as determined in accordance with ASTM D1003 (2013) employing CIE standard Illuminant C.

In a further aspect, the invention provides a method for preparing a composition comprising an epoxy-derived covalent adaptable network, preferably an epoxy vitrimer, more preferably a composition as described herein comprising the following steps:

a) providing at least one amine of formula (II) comprising primary amine groups, at least one vinylogous precursor of formula (III) comprising vinylogous precursor groups, and at least one epoxide comprising (2+a) epoxide groups (II)

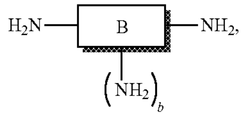

(III)

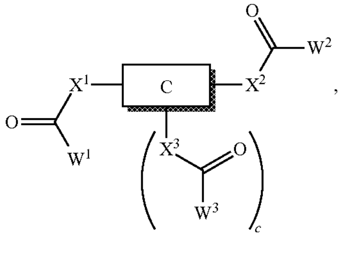

, wherein $X^1$, $X^2$ and each occurrence of $X^3$ are individually selected from O, $CR^{10}R^{11}$ and $NR^{12}$ preferably $X^1$, $X^2$ and each occurrence of $X^3$ are the same, preferably $X^1$, $X^2$ and each occurrence of $X^3$ are O;

$R^{10}$, $R^{11}$ and $R^{12}$ are individually selected from H or methyl, preferably $R^{10}$, $R^{11}$ and $R^{12}$ are the same, more preferably $R^{10}$, $R^{11}$ and $R^{12}$ are H;

$W^1$, $W^2$ and each occurrence of $W^3$ each represent a functional group so that —$X^1$—C(═O)—$W^1$, —$X^2$—C(═O)—$W^2$ and —$X^3$—C(═O)—$W^3$ constitute a vinylogous precursor group;

B represents an amine linking moiety;

C represents a vinylogous precursor linking moiety;

a, b, and c individually represent an integer higher than or equal to 0, preferably an integer selected from 0-50, more preferably an integer selected from the group consisting of 0, 1, 2, 3, and 4;

and b) contacting the compounds provided in step (a) thereby obtaining an epoxy-derived CAN;

wherein a vinylogous precursor group consists of or comprises a functional group which is capable of forming a vinylogous urethane, vinylogous amide or vinylogous urea upon reacting with a primary amine;

wherein the average functionality F, determined before the compounds are contacted and determined over all compounds provided in step (a), is at least 2.01, the average functionality being defined as $$F = \frac{\sum n_i(2 + a_i) + \sum n_j(2 + b_j) + \sum n_k(2 + c_k)}{\sum n_i + \sum n_j + \sum n_k}$$

wherein $n_i$ is the number of moles of epoxide with functionality (2+$a_i$); $n_j$ is the number of moles of amine of formula (II) with functionality (2+$b_j$) and $n_k$ is the number of moles of vinylogous precursor of formula (III) with functionality (2+$c_k$); and wherein the ratio P, determined before the compounds are contacted and determined over all compounds provided in step (a), is more than 1, the ratio P being defined as $$P = \frac{\sum n_j(2 + b_j)}{\sum n_i(2 + a_i) + \sum n_k(2 + c_k)}.$$

The amine linking moiety B and the vinylogous precursor linking moiety comprise or consist of a group as specified above.

It has been found that in order to provide the epoxy-derived CANs of the present invention, it is important that at least one of the compounds provided in step (a) and subsequently contacted in step (b) has a functionality of three or more, and that this compound (or a plurality of compounds having a functionality of three or more) is present in a sufficient amount such that the reaction will result in network formation. As will be understood by the skilled person, the functionality of an epoxide comprising (2+a) epoxide groups is 2+a; the functionality of an amine of formula (II) is 2+b and the functionality of a vinylogous precursor of formula (III) is 2+c. This requirement is reflected in the method according to the invention by requiring that the average functionality F is at least 2.01, the average functionality being defined as:

$$F = \frac{\sum n_i(2 + a_i) + \sum n_j(2 + b_j) + \sum n_k(2 + c_k)}{\sum n_i + \sum n_j + \sum n_k}$$

wherein $n_i$ is the number of moles of epoxide with functionality (2+$a_i$); $n_j$ is the number of moles of amine of formula (II) with functionality (2+$b_j$) and $n_k$ is the number of moles of vinylogous precursor of formula (III) with functionality (2+$c_k$); a, b and c having the meaning defined herein before. It will be understood that the average functionality is determined before the compounds are contacted and determined over all compounds provided in step (a).

In preferred embodiments of the invention, the functionality F is more than 2.02, preferably more than 2.05, more preferably more than 2.1 and/or less than 4, preferably less than 3, more preferably less than 2.5.

As will be understood by the skilled person, in order to enable transamination of the vinyloguous urethane/amide/urea bonds, the mechanism through which the CAN of the present invention exhibits temperature-induced dynamic behaviour, free amines need to be present in the composition obtainable by the method described herein. This requirement is reflected in the method according to the invention by requiring that the ratio of the number of primary amine groups to the sum of the number of epoxide groups and the number of vinylogous precursor groups, determined before the compounds are contacted and determined over all compounds provided in step (a), is more than 1. This can be represented mathematically as follows, wherein the ratio is designated P:

$$P = \frac{\sum n_j(2 + b_j)}{\sum n_i(2 + a_i) + \sum n_k(2 + c_k)} > 1$$

wherein $n_i$ is the number of moles of epoxide with functionality (2+$a_i$); $n_j$ is the number of moles of amine of formula (II) with functionality (2+$b_j$) and $n_k$ is the number of moles of vinylogous precursor of formula (III) with functionality (2+$c_k$); a, b and c having the meaning defined herein before.

In preferred embodiments of the invention, P is more than 1.005, preferably more than 1.01, more preferably more than 1.04 and/or less than 3, preferably less than 2, more preferably less than 1.5.

As will be understood by the skilled person, in case step (a) comprises providing the at least one epoxide or the at least one compound of formula, (II) or (III) in the form of a polymer, the average functionality of the polymer can be used in the calculation of the average functionality F. Similarly, in such case, the average number of primary amine groups and/or the average number of epoxide groups and/or the average number of vinylogous precursor groups can be used in the calculation of the ratio P.

As will be understood by the skilled person, any acid or base in the presence of (trace amounts of) water is in equilibrium with its conjugated base or acid. For the purposes of the present invention, whenever a compound is mentioned as an acid or base, unless the context dictates otherwise), both the acid/base and its conjugated form are considered as the same compound. For example, amines of formula (II) are considered as amines of formula (II) regardless of the amine group being present as $RNH_2$ or as $RNH_3^+$.

In particular embodiments, the method according to the invention is provided wherein step (a) comprises providing at least two different epoxides comprising (2+a) epoxide groups, at least two different amines of formula (II), or at least two different vinylogous precursors of formula (III), preferably step (a) comprises providing at least two different amines of formula (II).

In preferred embodiments, the method according to the invention is provided wherein step (a) comprises providing at least two different amines of formula (II) wherein said two different amines of formula (II) comprise a different number of amine groups. As will be understood by the skilled person, this means that the integer b is different for the two different amines of formula (II). In embodiments of the invention, step (a) comprises providing a first amine of formula (II) wherein b=0, and a second amine of formula (II) wherein b=1.

As is illustrated in the appending examples, the present inventors have found that, depending on the nature and ratio of reactants employed, the invention is not particularly limited with regard to the relative amounts of vinylogous (i.e. exchangeable) bonds and epoxide (i.e. permanent) bonds in the network. Hence, in embodiments the method according to the invention is provided wherein the ratio of the number of vinylogous precursor groups to the sum of the number of epoxide groups and the number of vinylogous precursor groups, determined before the compounds are contacted and determined over all compounds provided in step (a) is in the range of 0.1-0.8. This can be represented mathematically as follows, wherein the ratio is designated S:

$$S = \frac{\sum n_k(2+c_k)}{\sum n_i(2+a_i) + \sum n_k(2+c_k)}$$

and $$0.1 \le S \le 0.8$$

wherein $n_i$ is the number of moles of epoxide with functionality $(2+a_i)$; and $n_k$ is the number of moles of vinylogous precursor of formula (III) with functionality $(2+c_k)$; a and c having the meaning defined herein before.

It is within the capabilities of the skilled person, based on the present disclosure, to adapt the ratio of vinylogous bonds to epoxide bonds to achieve appropriate properties for the envisaged application. In order to provide optimal vitrimer behaviour, the ratio is preferably in the range of 0.2-0.8, for example in the range of 0.3-0.6, in the range of 0.3-0.5, for example in the range of 0.35-0.45, for example 0.38, 0.40 or 0.42.

Although the method of the present invention allows many practical routes to synthesize the epoxy-derived CANs of the invention, the present inventors have found two methods to be of particular preference, namely via a so-called one pot synthesis or what is referred to herein as a two-step reaction. In preferred embodiments, step (b) further comprises mixing the reaction mixture within 10 minutes, preferably within 5 minutes, more preferably within 1 minute of contacting the compounds provided in step (a). Mixing may be performed using any apparatus or method known in the art, such as manual mixing using a utensil (e.g. a spatula), high-shear mixing, rotor-stator mixing etc.

The one pot synthesis allows easy manufacture of epoxy-derived CANs in accordance with the invention by providing a single step wherein all necessary compounds are contacted. Hence, in preferred embodiments, the method according to the invention is provided wherein step (b) comprises contacting all compounds provided in step (a) substantially at the same time. As will be understood by the skilled person, depending on the reagents used, the epoxy-derived CAN obtained using the one pot synthesis may comprise substantial amounts of defects due to water being released in the reaction between the vinylogous precursor groups and the primary amines. Hence, in embodiments the method according to the invention is provided wherein step (b) comprises a step (b1) contacting all compounds provided in step (a) substantially at the same time, and further comprises a step (b2): grinding or comminuting the epoxy-derived CAN obtained in step (b) into pieces having a largest dimension of less than 1 cm, preferably less than 0.1 cm, removing water from the grinded or comminuted epoxy-derived CAN and optionally heating the dewatered epoxy-derived CAN above its glass transition temperature such that the pieces are rejoined. Removing water in step (b2) may be performed by any method known to the skilled person, such as by heating the material to a temperature of 35-150° C., preferably 35-100° C.

In the two-step reaction, the vinylogous precursor groups and at least part of the primary amines are combined without the presence of epoxide groups, thereby forming a vinylogous curing agent, which is the low molecular weight reaction product of the aforementioned reagents. This has several advantages, for example water (which may be formed from the reaction between the vinylogous precursor group and the primary amine) can be removed before network formation, resulting in a defect-free network. Additionally, the two-step reaction allows more manufacturing flexibility, for example allowing some time to pass between preparation of the vinylogous curing agent and addition of the epoxide groups Hence, in preferred embodiments, the method according to the invention is provided wherein step (b) comprises the following steps: b1) contacting at least part of the amine of formula (II) with at least part of the vinylogous precursor of formula (III) to obtain a composition comprising a vinylogous curing agent; b2) preferably reducing the water content of the composition comprising the vinylogous curing agent of step (b1), preferably to a water content of less than 5 wt. % (by total weight of the reaction mixture), preferably to a water content of less than 2 wt. %, more preferably less than 1 wt. %; b3) contacting the composition comprising the vinylogous curing agent of step (b1) or (b2) with the epoxide and optional remaining reagents provided in step (a), thereby obtaining an epoxy-derived CAN. In embodiments, the two-step reaction is provided wherein step (a) comprises providing a first amine of formula (II) and a second amine of formula (II); step (b1) comprises contacting the first amine of formula (II) with at least part of the vinylogous precursor of formula (III), and step (b3) comprises contacting the second amine of formula (II) with the vinylogous curing agent of step (b1) or (b2), the epoxide and optional remaining reagents provided in step (a).

In preferred embodiments of the two-step reaction, step (b1) comprises mixing the reaction mixture within 10 minutes, preferably within 5 minutes, more preferably within 1 minute of contacting at least part of the amine of formula (II) with at least part of the vinylogous precursor of formula (III); and/or step (b3) comprises mixing the reaction mixture within 10 minutes, preferably within 5 minutes, more preferably within 1 minute of contacting the composition comprising the vinylogous curing agent of step (b1) or (b2) with the epoxide and optional remaining reagents provided in step (a).

In highly preferred embodiments of the two-step reaction, the composition comprising a vinylogous curing agent of step (b1) or (b2) has a weight average molecular weight of the vinylogous curing agent of less than 50000 g/mol, preferably less than 10000 g/mol, preferably less than 5000 g/mol.

As is known to the skilled person, after contacting the different reagents, network formation (also referred to as curing) generally requires some time, the speed of curing being dependent on the reagents employed. In order to speed up the curing process, it may be desirable to heat the material. Hence, in embodiments the methods according to the invention are provided comprising a further step (c) wherein the material is cured for at least 10 minutes at a temperature of more than 35° C., preferably for at least 30 minutes at a temperature of more than 50° C. Alternatively, as is known to the skilled person, curing agents/accelerants may be employed.

The present inventors believe that the methods provided herein can equally well be employed when a reagent is provided in the form of a precursor, which forms the functional groups required in step (a) in situ, i.e. in a reaction mixture. Hence, in embodiments step (a) comprises providing an epoxide comprising (2+a) epoxide groups, a compound of formula (II), or a compound of formula (III) in the form of a precursor from which an epoxide comprising (2+a) epoxide groups, a compound of formula (II), or a compound of formula (III) is generated during or after step (b) (i.e. in the reaction mixture). It will be understood by the skilled person that, for the purpose of all embodiments or features of the invention described herein relating to the (relative) amount of functional groups determined before the compounds are contacted and determined over all compounds provided in step (a), the precursor groups should be considered as the respective functional group they will be converted to. In a particularly preferred embodiment of the invention, step (a) comprises providing an amine according to formula (II) in the form of a primary amine precursor, preferably an isocyanate from which a compound of formula (II) is generated during or after step (b).

In preferred embodiments, the amine linking moiety B comprises or consists of a group selected from the group consisting of $C_{1-40}$alkyl, $C_{2-40}$alkenyl, $C_{2-40}$alkynyl, $C_{6-24}$aryl, $C_{3-24}$cycloalkyl, $C_{6-24}$aryl$C_{1-40}$alkyl; wherein one or more of the carbon atoms in the backbone of said alkyl, alkenyl, alkynyl, aryl or cycloalkyl may be replaced by a heteroatom independently selected from O, S, N and Si; wherein said alkyl, alkenyl, alkynyl, aryl or cycloalkyl may be unsubstituted or further substituted. Preferably the amine linking moiety B consists of a group selected from the group consisting of unsubstituted $C_{1-10}$alkyl, $C_{6-15}$aryl, $C_{3-24}$cycloalkyl, $C_{6-12}$aryl$C_{1-10}$alkyl, wherein up to three of the carbon atoms in the backbone of said alkyl, aryl, cycloalkyl may be replaced by O or N.

Examples of suitable compounds of formula (II) are given in the below table:

| Name | CAS-number | Structure |
|---|---|---|
| Diethylenetriamine (DTA) | 111-40-0 | 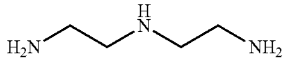 |
| Triethylenetetramine | 112-24-3 | 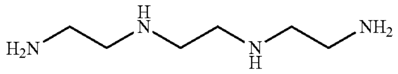 |
| 2,2-Dimethyl-1,3-propanediamine | 7328-91-8 |  |
| 4,4'-Methylenebis(2-methylcyclohexylamine) | 6864-37-5 | 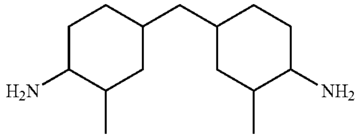 [SMILES: CC1CC(CC2CCC(N)C(C)C2)CCC1N] |
| Menthane diamine | 80-52-4 | 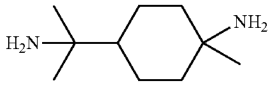 |
| Isophoronediamine | 2855-13-2 | 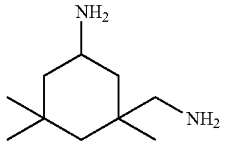 |
| 4-4'-Diaminocyclohexylmethane | 1761-71-3 | 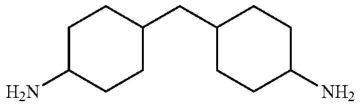 [SMILES: NC1CCC(CC2CCC(N)CC2)CC1] |
| 1,2-Diaminocyclohexane | 1121-22-8 | 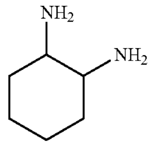 |

-continued

| Name | CAS-number | Structure |
|---|---|---|
| 1,3-Bis(Aminomethyl)cyclohexane | 2579-20-6 | 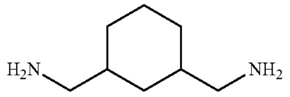 |
| m-xylenediamine | 1477-55-0 | 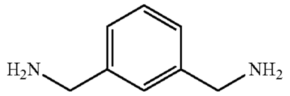 |
| Diaminodiphenylmethane | 101-77-9 | 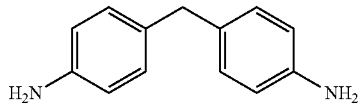 [SMILES: Nc1ccc(Cc2ccc(N)cc2)cc1] |
| 2-2'-(Ethylenedioxy)bis(ethylamine) | 929-59-9 | 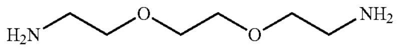 |
| Poly(propylene glycol) bis(2-aminopropyl ether) | 9046-10-0 | 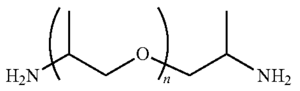 |
| Tris(2-aminomethyl)amine | 4097-89-6 | 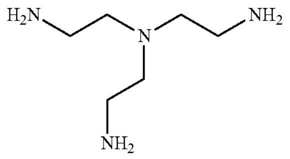 |

Hence, in highly preferred embodiments the method described herein is provided wherein the compound of formula (II) provided in step (a) is a compound selected from the group consisting of Diethylenetriamine (DTA); triethylenetetramine; 2,2-Dimethyl-1,3-propanediamine; 4,4'-Methylenebis(2-methylcyclohexylamine); Menthane diamine; Isophoronediamine; 4-4'-Diaminocyclohexylmethane; 1,2-Diaminocyclohexane; 1,3-Bis(Aminomethyl)cyclohexane; m-xylenediamine; Diaminodiphenylmethane; 2-2'-(Ethylenedioxy)bis(ethylamine); Poly(propylene glycol) bis(2-aminopropyl ether); and Tris(2-aminomethyl) amine.

In highly preferred embodiments of the invention, the method described herein is provided wherein the vinylogous precursor of formula (III) is 1,3 dicarbonyl of formula (IV), an alkynon of formula (V), or an alkenon of formula (VI)

(IV)

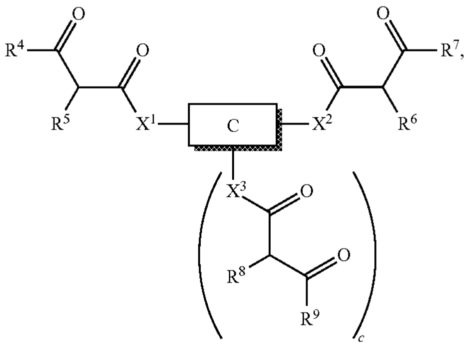

-continued (V)

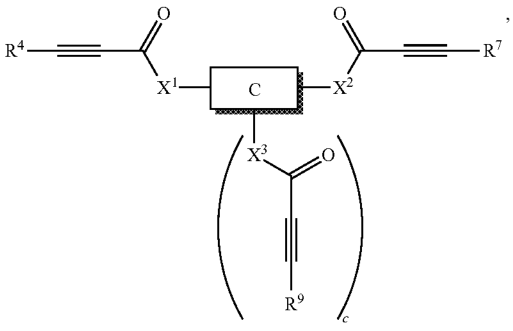

, (VI)

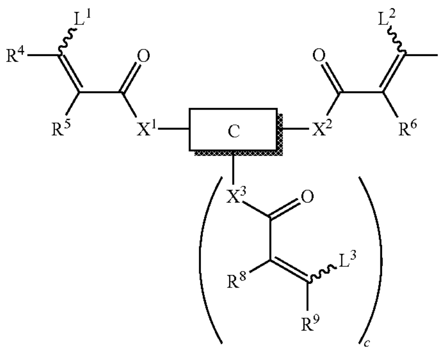

wherein $R^4$, $R^7$ and each occurrence of $R^9$ are individually selected from H, methyl or phenyl, preferably $R^4$, $R^7$ and each occurrence of $R^9$ are the same, more preferably $R^4$, $R^7$ and each occurrence of $R^9$ are methyl;

$R^5$, $R^6$ and each occurrence of $R^8$ are individually selected from H or methyl, preferably $R^5$, $R^6$ and each occurrence of $R^8$ are the same, more preferably $R^5$, $R^6$ and each occurrence of $R^8$ are H;

$X^1$, $X^2$ and each occurrence of $X^3$ have the same meaning as defined herein before;

C represents a vinylogous precursor linking moiety; and $L^1$, $L^2$ and each occurrence of $L^3$ represent a leaving group which can be displaced upon reaction with a primary amine, preferably $L^1$, $L^2$ and each occurrence of $L^3$ represent a functional group selected from the group consisting of —$OR^{13}$, —$NHR^{14}$, —Cl, —Br, and —$SR^{15}$ with $R^{13}$, $R^{14}$, $R^{15}$ comprising an alkyl, for example a $C_{1-40}$alkyl, preferably methyl.

In preferred embodiments, the vinylogous precursor linking moiety C comprises or consists of a group selected from the group consisting of $C_{1-40}$alkyl, $C_{2-40}$alkenyl, $C_{2-40}$alkynyl, $C_{6-24}$aryl, $C_{3-24}$cycloalkyl, $C_{6-24}$aryl$C_{1-40}$alkyl; wherein one or more of the carbon atoms in the backbone of said alkyl, alkenyl, alkynyl, aryl or cycloalkyl may be replaced by a heteroatom independently selected from O, S, N and Si; wherein said alkyl, alkenyl, alkynyl, aryl or cycloalkyl may be unsubstituted or further substituted. Preferably the vinylogous precursor linking moiety C consists of a group selected from the group consisting of an unsubstituted $C_{1-10}$alkyl, $C_{6-10}$aryl, $C_{3-24}$cycloalkyl, $C_{6-12}$aryl$C_{1-10}$alkyl, wherein up to three of the carbon atoms in the backbone of said alkyl, aryl, cycloalkyl may be replaced by O or N.

Preferred compounds of formula (III) are 1,3 dicarbonyls of formula (IV), alkynons of formula (V), or alkenons of formula (VI) obtainable from converting the alcohol groups in a compound selected from the group consisting of 1,4-Benzenedimethanol; 1,4-Cyclohexanedimethanol; 1,2-Ethanediol; 1,10-Decanediol; Trimethylolpropane; 2,2'-Biphenyl dimetanol; 2,4-Dimethyl-2,4-pentanediol; 1,2-Cyclohexanediol; Isosorbide; Di(trimethylolpropane); Dipentaerythritol; and 2,2-Dimethyl-1,3-propanediol into 1,3 dicarbonyls, alkynons or alkenons.

In embodiments according to the invention, the method described herein is provided wherein the epoxide comprising (2+a) epoxide groups provided in step (a) is a compound of formula (VII)

(VII)

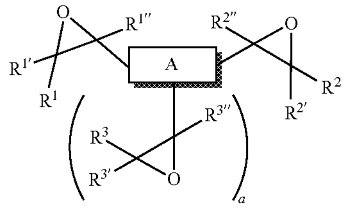

wherein $R^1$, $R^2$ and each occurrence of $R^3$ are individually selected from H or methyl, preferably $R^1$, $R^2$ and each occurrence of $R^3$ are the same, more preferably $R^1$, $R^2$ and each occurrence of $R^3$ are H;

$R^{1'}$, $R^{2'}$ and each occurrence of $R^{3'}$ are individually selected from H or methyl, preferably $R^{1'}$, $R^{2'}$ and each occurrence of $R^{3'}$ are the same, more preferably $R^{1'}$, $R^{2'}$ and each occurrence of $R^{3'}$ are H;

$R^{1''}$, $R^{2''}$ and each occurrence of $R^{3''}$ are individually selected from H or methyl, preferably $R^{1''}$ $R^{2''}$ and each occurrence of $R^{3''}$ are the same, more preferably $R^{1''}$, $R^{2''}$ and each occurrence of $R^{3''}$ are H;

a represents an integer higher than or equal to 0, preferably an integer selected from 0-50, more preferably an integer selected from the group consisting of 0, 1, 2, 3, and 4; and A represents an epoxide linking moiety.

Epoxide linking moiety A comprises or consists of a group as defined above.

In preferred embodiments, the epoxide linking moiety A comprises or consists of a group independently selected from the group consisting of $C_{1-40}$alkyl, $C_{2-40}$alkenyl, $C_{2-40}$alkynyl, $C_{6-24}$aryl, $C_{3-24}$cycloalkyl, $C_{6-24}$aryl$C_{1-40}$alkyl; wherein one or more of the carbon atoms in the backbone of said alkyl, alkenyl, alkynyl, aryl or cycloalkyl may be replaced by a heteroatom independently selected from O, S, N and Si; wherein said alkyl, alkenyl, alkynyl, aryl or cycloalkyl may be unsubstituted or further substituted.

Examples of suitable compounds of formula (VII) are given in the below table:

| Name | CAS-number | Structure |
|---|---|---|
| Tris(4-hydroxyphenyl)methane triglycidyl ether | 66072-38-6 | 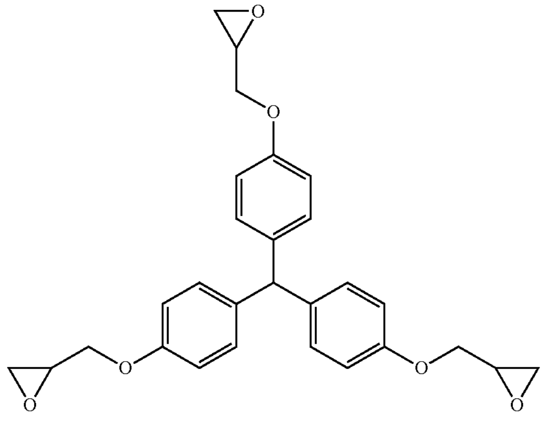 [SMILES: c1cc(C(c2ccc(OCC3CO3)cc2)c2ccc(OCC3CO3)cc2)ccc1OCC1CO1] |

-continued
| Name | CAS-number | Structure |
| --- | --- | --- |
| Trimethylolpropane triglycidyl ether | 3454-29-3 | 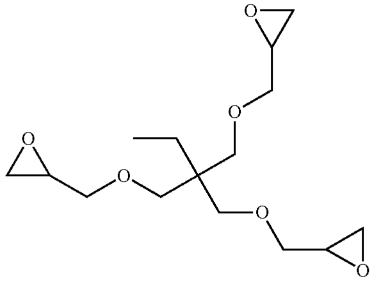 [SMILES: CCC(COCC1CO1)(COCC1CO1)COCC1CO1] |
| Bisphenol A diglycidyl ether | 1675-54-3 | 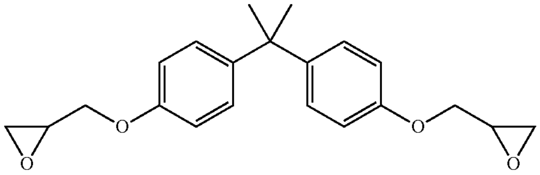 [SMILES: CC(C)(c1ccc(OCC2CO2)cc1)c1ccc(OCC2CO2)cc1] |
| 1,6-Hexanediol diglycidyl ether | 16096-31-4 | 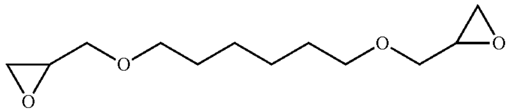 [SMILES: C(CCCOCC1CO1)CCOCC1CO1] |
| 1,4-Butanediol diglycidyl ether | 2425-79-8 | 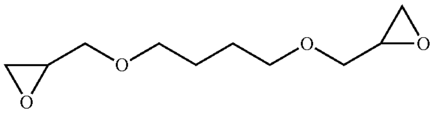 [SMILES: C(CCOCC1CO1)COCC1CO1] |
| Triglycidylisocyanuraat | 2451-62-9 | 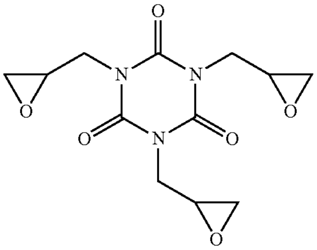 [SMILES: O=c1n(CC2CO2)c(=O)n(CC2CO2)c(=O)n1CC1CO1] |
| Hydrogenated bisphenol A diglycidyl ether | 13410-58-7 | 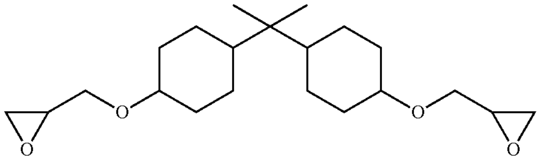 [SMILES: CC(C)(C1CCC(OCC2CO2)CC1)C1CCC(OCC2CO2)CC1] |
| 1,6-Naphthalenediol diglycidyl ether | 27610-48-6 | 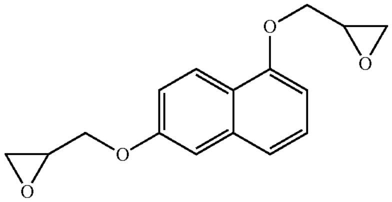 [SMILES: c1cc(OCC2CO2)c2ccc(OCC3CO3)cc2c1] |
| Neopentyl glycol diglycidyl ether | 17557-23-2 |  |
| Poly(propylene glycol) diglycidyl ether | 26142-30-3 | 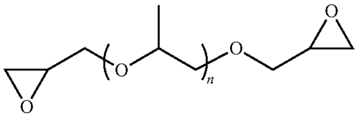 |

-continued

| Name | CAS-number | Structure |
| --- | --- | --- |
| 4,4'-Methylenebis(N,N-diglycidylaniline) | 28768-32-3 | 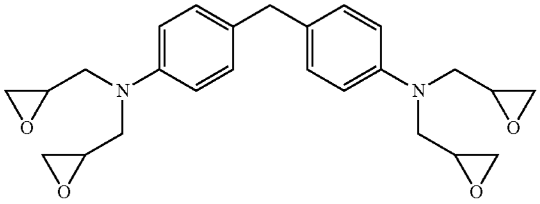 [SMILES: c1cc(N(CC2CO2)CC2CO2)ccc1Cc1ccc(N(CC2CO2)CC2CO2)cc1] |
| N,N-diglycidyl-4-glycidyloxyanilne | 5026-74-4 | 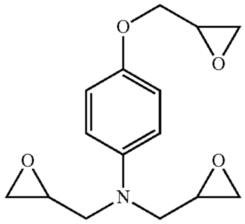 [SMILES: c1cc(N(CC2CO2)CC2CO2)ccc1OCC1CO1] |

Hence, in highly preferred embodiments the method described herein is provided wherein the epoxide comprising (2+a) epoxide groups provided in step (a) is a compound selected from the group consisting of diglycidyl ethers, triglycidyl ethers, diglycidyl amines, triglycidyl amines, diglycidyl isocyanurates and triglycidyl isocyanurates, more preferably a compound selected from the group consisting of Tris(4-hydroxyphenyl)methane triglycidyl ether; Trimethylolpropane triglycidyl ether; Bisphenol A diglycidyl ether; Bisphenol F diglycidyl ether; Bisphenol C diglycidyl ether; Bisphenol E diglycidyl ether; Bisphenol BP diglycidyl ether; Bisphenol FC diglycidyl ether; Bisphenol Z diglycidyl ether; 1,6-Hexanediol diglycidyl ether; 1,4-Butanediol diglycidyl ether; Trig lycidylisocyanuraat; Hydrogenated Bisphenol A diglycidyl ether; Hydrogenated Bisphenol F diglycidyl ether; Hydrogenated Bisphenol C diglycidyl ether; Hydrogenated Bisphenol E diglycidyl ether; Hydrogenated Bisphenol BP diglycidyl ether; Hydrogenated Bisphenol FC diglycidyl ether; Hydrogenated Bisphenol Z diglycidyl ether; 1,6-Naphthalenediol diglycidyl ether; Neopentyl glycol diglycidyl ether; Poly(propylene glycol) diglycidyl ether; 4,4'-Methylenebis(N,N-diglycidylaniline); and N,N-diglycidyl-4-glycidyloxyaniline.

In embodiments according to the invention, the method described herein is provided wherein the epoxide comprising (2+a) epoxide groups provided in step (a) is an epoxidized polydiene or a co-polymer thereof.

In embodiments according to the invention, the method described herein is provided wherein the epoxide comprising (2+a) epoxide groups provided in step (a) is an epoxidized vegetable oil or a co-polymer thereof. Preferred epoxidized polydienes are epoxidized natural rubbers, epoxidized poly(1,4-butadiene) and epoxidized styrene-butadiene rubber. Preferred epoxidized vegetable oils are epoxidized soy bean oil, epoxidized castor oil, epoxidized sunflower oil and epoxidized linseed oil.

In embodiments according to the invention, the method described herein is provided wherein the epoxide comprising (2+a) epoxide groups provided in step (a) is an epoxidized terpene or a co-polymer thereof, preferably an epoxidized cycloterpene, most preferably an epoxidized cyclic monoterpene. Preferred epoxidized terpenes are epoxidized limonene, epoxidized terpineol, epoxidized humulene, epoxidized myrcene.epoxidized linalool, epoxidized citronellol and epoxidized pinene.

The present inventors have found that the relaxation time and/or activation energy of the epoxy-derived CANs may be modified by the presence of a catalyst in the network. Hence, in embodiments the method according to the invention is provided wherein step (a) further comprises adding a catalyst, preferably an organic catalyst.

In a further aspect, the invention provides the epoxy-derived covalent adaptable networks obtainable from the methods described herein.

In a further aspect, the invention provides a composite comprising an epoxy-derived covalent adaptable network as described herein and at least one fiber material, preferably at least one fiber material selected from the group consisting of glass fibers, carbon fibers or combinations thereof.

In a further aspect, the invention provides a polymer blend comprising an epoxy-derived covalent adaptable network as described herein and one or more additives selected from the group consisting of plasticizers, UV-stabilizers, flame retardants, impact modifiers, pigments, catalysts and antioxidants.

In a further aspect, the invention provides the use of a composition comprising an epoxy-derived covalent adaptable network, a composite comprising an epoxy-derived covalent adaptable network or a polymer blend comprising an epoxy-derived covalent adaptable network in processing techniques such as extrusion, injection moulding, compression moulding, transfer moulding, foam moulding, thermoforming, rotation moulding or 3D printing is provided.

EXAMPLES

EPIKOTE® Resin MGS LR 135 and EPIKURE® Curing Agent MGS LH 135 were obtained from Hexion. Ethylene glycol (99%) was purchased from J&K. Tert-butyl acetoacetate (>98%), tris(2-aminoethyl)amine (96%) 1,6-hexanediol (99%), m-xylylenediamine (99%), tris(4-hydroxyphenyl)methane triglycidyl ether, isophorone diamine (>99%), 1,1,1-tris(hydroxymethyl)propane triglycidyl ether (technical grade), tris(hydroxymethyl)propane (>98%), Resorcinol diglycidyl ether, 1,10-decanediol (98%), 1,6-diaminohexane and Bisphenol A diglycidylether were purchased from Sigma-Aldrich. 1,3-bis(aminomethyl)cyclohexane, 1,4-benzenedimethanol (>99%), 1,4-diaminobutane (>98%), piperazine (>98%), 1,4-butanediol diglycidyl ether (>93%) and 4,4'-methylenebis(cyclohexylamine) were purchased from TCI Europe. Glass-fiber fabric style 3025 was obtained from Porcher Industries. Everything was used as received unless specified.

Example 1: Synthesis of Ethylene glycol-bisacetoacetate (1)

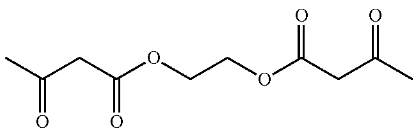

1

Ethylene glycol (1 eq.) was mixed together with tert-butyl acetoacetate (2.3 eq.) in a vacuum distillation set-up. The mixture was then heated to 130° C. at 800 mbar for 3 h to remove tert-butanol. Afterwards, the pressure was reduced gradually to 5 mbar over a period of at least 1 h. Finally, to remove the final traces of tert-butanol and tert-butylacetoacetate the mixture was left for another 1 h at 5 mbar. No purification was performed. Yield (1)=95%. $^1$H NMR (400 MHz, CDC13, δ): 11.87 (s, 2H, enol), 4.99 (s, 2H, enol), 4.35 (s, 4H), 3.47 (s, 4H), 2.25 (s, 6H), 1.95 (s, 6H, enol).

Example 2: Synthesis of 1,6-hexanediol Bisacetoacetate (2)

2

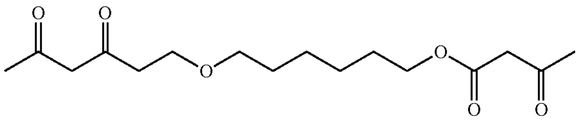

1,6-hexanediol (1 eq.) was mixed together with tert-butyl acetoacetate (2.3 eq.) in a vacuum distillation set-up. The mixture was then heated to 130° C. at 800 mbar for 3 h to remove tert-butanol. Afterwards, the pressure was reduced gradually to 5 mbar over a period of at least 1 h. Finally, to remove the final traces of tert-butanol and tert-butylacetoacetate the mixture was left for another 1 h at 5 mbar. No purification was performed. Yield (2)=94%. $^1$H NMR (300 MHz, $CDCl_3$): δ (ppm)=1.37 (p, 4H, $OCH_2CH_2CH_2CH_2CH_2CH_2O$), 1.64 (p, 4H, $OCH_2CH_2CH_2CH_2CH_2CH_2O$), 2.25 (s, 6H, $CH_3COCH_2$), 3.44 (s, 4H, $CH_3COCH_2COO$), 4.11 (t, 4H, $CH_2CH_2OCO$).

Example 3: Synthesis of 1,4-Dimethanolbenzene Bisacetoacetate (3)

3

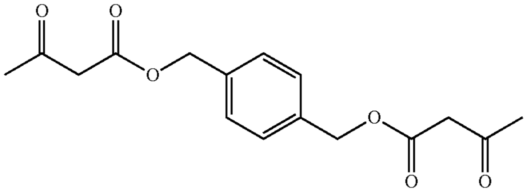

1,4-dimethanolbenzene (1 eq.) was mixed together with tert-butyl acetoacetate (2.3 eq.) in a vacuum distillation set-up. The mixture was then heated to 130° C. at 800 mbar for 3 h to remove tert-butanol. Afterwards, the pressure was reduced gradually to 5 mbar over a period of at least 1 h. Finally, to remove the final traces of tert-butanol and tert-butylacetoacetate the mixture was left for another 1 h at 5 mbar. No purification was performed. Yield (3)=90%. $^1$H NMR (300 MHz, $CDCl_3$): δ (ppm)=2.24 (s, 6H, $CH_3COCH_2$), 3.49 (s, 4H, $CH_3COCH_2COO$), 5.16 (s, 4H, $CCH_2OCO$), 7.35 (s, 4H, ArH).

Example 4: Synthesis of Trimethylolpropane Bisacetoacetate (4)

4

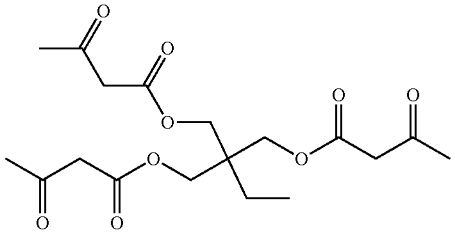

1,1,1-trimethylolpropane (10 g, 74.5 mmol, 1 eq.) and tert-butyl acetoacetate (42.44 g, 268.2 mmol, 3.6 eq.) were dissolved in a mixture of xylene (85 mL) and hexane (55 mL) in a 250 mL flask equipped with a still-head, a thermometer and a cooler. The mixture was heated to 135° C. until the temperature of the vapour dropped to 63° C. Then the temperature was increased to 150° C. until no more solvent loss was observed. The remaining solvent was removed via rotary evaporation. Afterwards a vacuum distillation was performed from 80° C. to 100° C. to remove the last traces of solvent and the excess of tert-butyl acetoacetate. Yield (4)=94% $^1$H NMR (300 MHz, $CDCl_3$): δ (ppm) =0.85 (t, 3H, $CH_3CH_2C$), 1.42 (q, 2H, $CH_3CH_2C$), 2.21 (s, 9H, $CH_3COCH_2$), 3.45 (s, 6H, $CH_3COCH_2COO$), 4.04 (s, 6H, $CCH_2OCO$).

Example 5: Synthesis of 1,10-decanediol Bisacetoacetate (5)

5

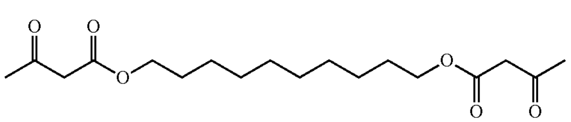

1,10-decanediol (1 eq.) was mixed together with tert-butyl acetoacetate (2.3 eq.) in a vacuum distillation set-up. The mixture was then heated to 130° C. at 800 mbar for 3 h to remove tert-butanol. Afterwards, the pressure was reduced gradually to 5 mbar over a period of at least 1 h. Finally, to remove the final traces of tert-butanol and tert-butylacetoacetate the mixture was left for another 1 h at 5 mbar. No purification was performed. Yield (5)=94% $^1H$ NMR (300 MHz, $CDCl_3$): δ (ppm)=1.29 (m, 12H, —$CH_2CH_2CH_2CH_2CH_2O$), 1.62 (p, 4H, $CH_2CH_2O$), 2.25 (s, 6H, $CH_3COCH_2$), 3.44 (s, 4H, $CH_3COCH_2COO$), 4.12 (t, 4H, $CH_2CH_2OCO$).

Example 6: Synthesis of 1,1'-(piperazine-1,4-diyl) bis(butane-1,3-dione) (6)

6

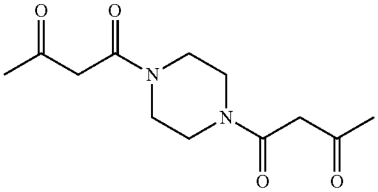

Piperazine (50 g, 0.58 mol, 1.0 eq.) was dissolved in tert-butyl acetoacetate (192.5 g, 1.22 mol, 2.1 eq.) at 130° C. The mixture was continuously heated at 130° C. at 870 mbar for 3 h to remove tert-butanol. Afterwards, the pressure was reduced gradually to <10 mbar over a period of at least 1 h. Finally, to remove the final traces of tert-butanol and tert-butylacetoacetate the mixture was left for another 1 h at <10 mbar. The product was then recrystalised in acetone and then precipitated into cold diethyl ether and dried under vacuum at 40° C., over weekend. Yield=46%. $^1H$ NMR (300 MHz, DMSO-$d_6$): δ (ppm)=3.68 (d, 4H, O═$CCH_2C$═O), 3.53-3.41 (m, 4H, $N(CH_2)_2$), 3.39-3.28 (m, 4H, $N(CH_2)_2$), 2.16 (s, 6H, $CH_3$).

Example 7: Synthesis of Epoxy-Derived CANs Through One Pot Reaction

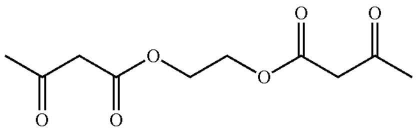

1

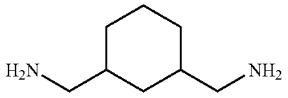

7

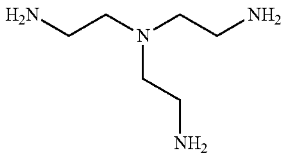

8

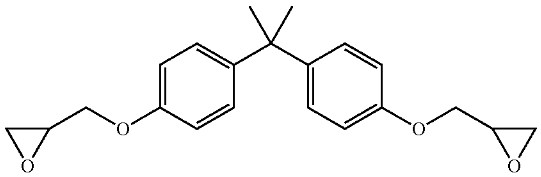

9

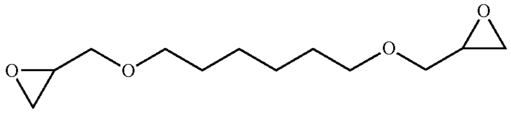

10

Epoxy-derived CAN

Ethylene glycol-bisacetoacetate 1 was mixed together with 1,3-bis(aminomethyl)cyclohexane 7, tris(2-aminoethyl)amine 8 and EPIKOTE® Resin MGS LR 135 using a speedMixer® DAC 150.1 FVZ for 2×2 minutes at 2500 rpm in the ratios shown in Table 1 table. The resulting compositions were cured for 1 h at 90° C. and afterwards dried in a vacuum oven at 100° C. overnight, thereby obtaining an epoxy-derived CAN in accordance with the invention.

EPIKOTE® Resin MGS LR 135 comprises bisphenol A diglycidylether 9 and 1,6-hexanediol diglycidylether 10. The amount of EPIKOTE® Resin MGS LR 135 resin employed was determined based on the target proportion of vinylogous bonds (based on total vinylogous+epoxy bonds), which can be translated into the number of equivalents of epoxide groups shown in the Table 1.

This is illustrated as follows for example 7a: 1 equivalent of ethylene glycol-bisacetoacetate 1 implies that 2 equivalents of acetoacetate functions are used, which are vinylogous precursor functions that will react with primary amines to form 2 equivalents of vinylogous bonds. Hence, in order to reach the target 42% of vinylogous bonds (based on total vinylogous+epoxy bonds), X equivalents of epoxide groups (which react with primary amines to form epoxy bonds) need to be employed, wherein X can be calculated as 2/(2+x)=0.421; i.e. X=2.75.

TABLE 1

| Ex. | Excess primary amines (%) | Ratio P* | Average functionality F* | % vinylogous bonds | 1 (eq.) | 2 (eq.) | 3 (eq.) | Epoxide groups (eq.) | 4 + 5 (eq.) |
|---|---|---|---|---|---|---|---|---|---|
| 7a | 5 | 1.05 | 2.11 | 42.1 | 1 | 1.75 | 0.5 | 2.75 | 1.375 |
| 7b | 5 | 1.05 | 2.41 | 60 | 1 | 0 | 1.1667 | 1.33 | 0.665 |
| 7c | 5 | 1.05 | 2.20 | 60 | 1 | 0.837 | 0.609 | 1.33 | 0.665 |
| 7d | 5 | 1.05 | 2.02 | 30 | 1 | 3.29 | 0.14 | 4.66 | 2.33 |

*The ratio P and the average functionality F are calculated as defined herein elsewhere.

Example 8: Synthesis of Epoxy-Derived CANs Through Two-Step Reaction

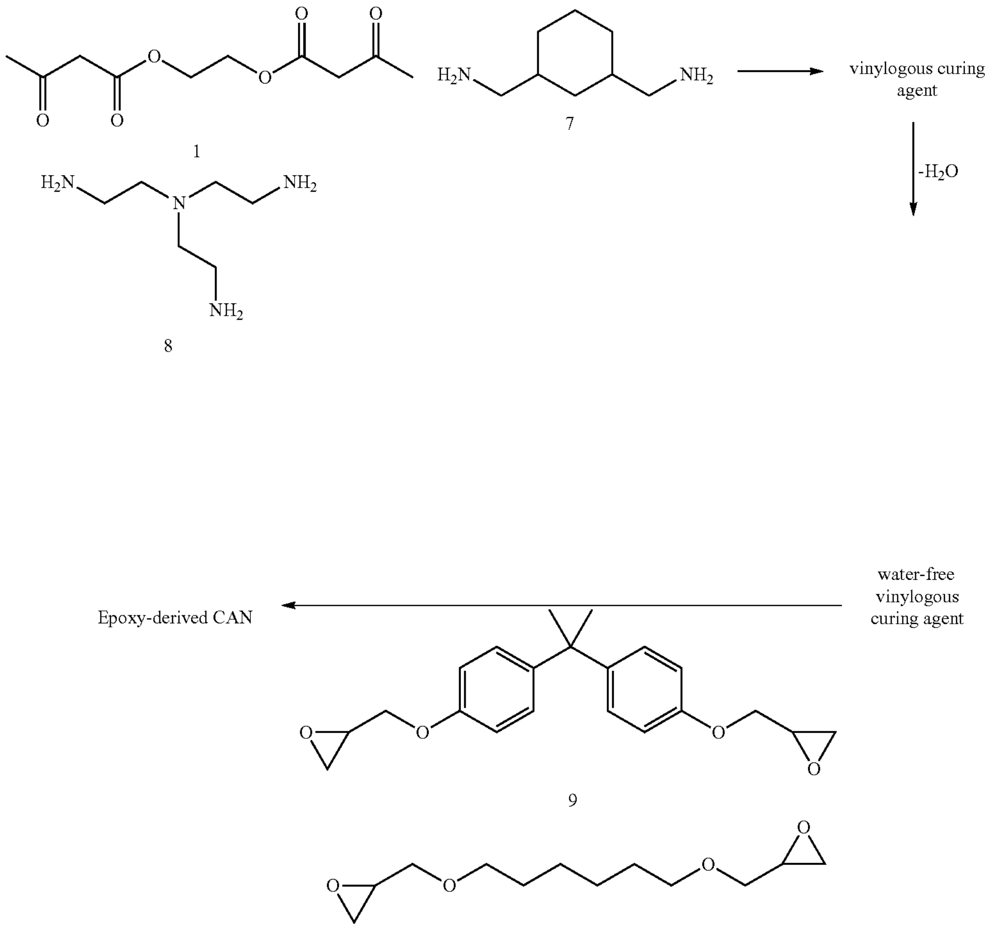

1, 7, 8, 9, 10

Ethylene glycol-bisacetoacetate 1 was mixed together with 1,3-bis(aminomethyl)cyclohexane 7 and tris(2-aminoethyl)amine 8 using a speedMixer® DAC 150.1 FVZ for 2×2 minutes at 2500 rpm in the ratios shown in Table 2 thereby obtaining a vinylogous curing agent. The mixture was dried in a vacuum oven at 65° C. to remove the formed water. The water-free curing agent was mixed with EPIKOTE® Resin MGS LR 135 using a speedMixer® DAC 150.1 FVZ for 2×2 minutes at 2500 rpm in the ratios shown in Table 2. The resulting compositions were cured for 1 h at 90° C. and afterwards dried in a vacuum oven at 100° C. overnight, thereby obtaining an epoxy-derived CAN in accordance with the invention.

EPIKOTE® Resin MGS LR 135 comprises bisphenol A diglycidylether 9 and 1,6-hexanediol diglycidylether 10. The amount of EPIKOTE® Resin MGS LR 135 resin employed was determined based on the target proportion of vinylogous bonds (based on total vinylogous+epoxy bonds), which can be translated into the number of equivalents of epoxide groups shown in the Table 2.

This is illustrated as follows for example 8a: 1 equivalent of ethylene glycol-bisacetoacetate 1 implies that 2 equivalents of acetoacetate functions are used, which are vinylogous precursor functions that will react with primary amines to form 2 equivalents of vinylogous bonds. Hence, in order to reach the target 42% of vinylogous bonds (based on total vinylogous+epoxy bonds), X equivalents of epoxide groups (which react with primary amines to form epoxy bonds) need to be employed, wherein X can be calculated as 2/(2+x)=0.421; i.e. X=2.75.

TABLE 2

| Ex. | Excess primary amines (%) | Ratio P* | Average functionality F* | % vinylogous bonds | 1 (eq.) | 2 (eq.) | 3 (eq.) | Epoxide groups (eq.) | 4 + 5 (eq.) |
|---|---|---|---|---|---|---|---|---|---|
| 8a | 5 | 1.05 | 2.11 | 42.1 | 1 | 1.75 | 0.5 | 2.75 | 1.375 |
| 8b | 5 | 1.05 | 2.20 | 42.1 | 1 | 1.20 | 0.87 | 2.75 | 1.375 |
| 8c | 5 | 1.05 | 2.06 | 42.1 | 1 | 2.06 | 0.29 | 2.75 | 1.375 |
| 8d | 5 | 1.05 | 2.02 | 42.1 | 1 | 2.35 | 0.1 | 2.75 | 1.375 |

*The ratio P and the average functionality F are calculated as defined herein elsewhere.

Example 9: Synthesis of Epoxy-Derived CAN Through One Pot Reaction

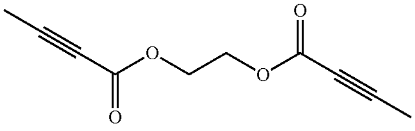

11

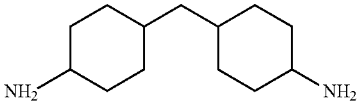

12

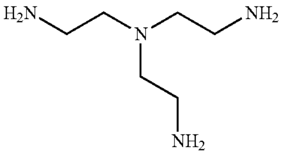

8

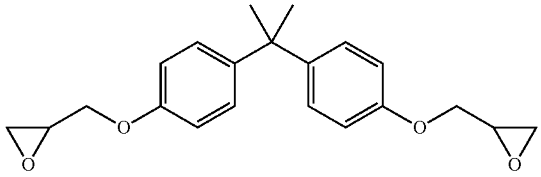

9

One-pot reaction

Epoxy-derived CAN

Ethylene glycol-bispropargylester 11 was mixed with bisphenol A diglycidylether 9 and heated until a homogenous solution is obtained. 4,4'-Methylenebis(cyclohexylamine) 12 and tris(2-aminoethyl)amine 8 were added and the resulting composition was mixed using a speedMixer® DAC 150.1 FVZ for 2×2 minutes at 2500 rpm. Ingredients were employed in the ratios shown in the Table 3. The mixed compositions were cured for 30 minutes at 60° C. followed by 30 minutes at 100° C. in a dry heat oven and afterwards dried in a vacuum oven at 100° C. overnight, thereby obtaining an epoxy-derived CAN in accordance with the invention.

TABLE 3

| Ex. | Excess primary amines (%) | Ratio P* | Average functionality F* | % vinylogous bonds | 6 (eq.) | 7 (eq.) | 3 (eq.) | Epoxide groups (eq.) | 4 (eq.) |
|---|---|---|---|---|---|---|---|---|---|
| 9a | 5 | 1.05 | 2.11 | 42.1 | 1 | 1.75 | 0.5 | 2.75 | 1.375 |
| 9b | 5 | 1.05 | 2.17 | 42.1 | 1 | 1.35 | 0.77 | 2.75 | 1.375 |

TABLE 3-continued

| Ex. | Excess primary amines (%) | Ratio P* | Average functionality F* | % vinylogous bonds | 6 (eq.) | 7 (eq.) | 3 (eq.) | Epoxide groups (eq.) | 4 (eq.) |
|---|---|---|---|---|---|---|---|---|---|
| 9c | 5 | 1.05 | 2.06 | 42.1 | 1 | 2.06 | 0.29 | 2.75 | 1.375 |
| 9d | 5 | 1.05 | 2.11 | 60 | 1 | 1.225 | 0.35 | 1.333 | 0.6667 |

*The ratio P and the average functionality F are calculated as defined herein elsewhere.

The epoxy-derived CANs of examples 7-9 were characterised and compared with reference materials Ref 1, Ref 2 and Ref 3.

Synthesis of Reference Material Ref 1

Ref 1 is a standard epoxy network without exchangeable bonds, synthesized as follows. EPIKOTE® resin MGS LR 135 and EPIKURE® curing agent MGS LH 135 were mixed in a ratio of 100:35±2 (LR135:LH135). The mixture was mixed using a speedMixer® DAC 150.1 FVZ for 2 minutes at 2500 rpm. After which it was left at 45° C. for 1 h and then fully cured at 100° C. in a vacuum oven overnight.

Synthesis of Reference Material Ref 2

Ref 2 is an epoxy network prepared with the same amines employed in examples 2 and 3, but without any vinylogous precursor groups, such that no vinylogous (i.e. exchangeable) bonds are present in the network. EPIKOTE® resin MGS LR 135 was mixed with 1,3-bis(aminomethyl)cyclohexane 7 and tris(2-aminoethyl)amine 8 (employing a ratio of 1,3-bis(aminomethyl)cyclohexane:tris(2-aminoethyl) amine of 3.5:1) and employing a 10% excess of primary amines. The mixture was mixed using a speedMixer® DAC 150.1 FVZ for 2 minutes at 2500 rpm, after which it was left at 45° C. for 1 h and then fully cured at 100° C. in a vacuum oven overnight.

Synthesis of Reference Material Ref 3

Ref 3 is a vinylogous urethane network wherein no epoxide was used during synthesis and consequently no epoxy bonds are present. Ethylene glycol-bisacetoacetate 1 was mixed together with 1,3-bis(aminomethyl)cyclohexane 7 and tris(2-aminoethyl)amine 8 (employing a ratio of 1,3-bis(aminomethyl)cyclohexane:tris(2-aminoethyl)amine of 3.5:1) and employing a 10% excess of primary amines. The mixture was mixed using a speedMixer® DAC 150.1 FVZ for 2×2 min at 2500 rpm. Then it was cured for 1 h at 90° C. and afterwards transferred to a vacuum oven at 100° C. overnight.

Characterisation Procedures (Examples 7-9)

Thermogravimetric analyses (TGA) were performed on a Mettler-Toledo TGA/SDTA 851e instrument. All dynamic thermogravimetric measurements were performed under nitrogen atmosphere with a heating rate of 10° C./min from 25° C. to 800° C. Isothermal thermogravimetric measurements were performed under nitrogen atmosphere at 150° C. for 120 minutes with a heating rate of 10° C./min. $T_{d5\%}$ is the temperature at which a weight loss of 5% is observed.

A Mettler Toledo instrument 1/700 was used to perform differential scanning calorimetry (DSC) measurements under nitrogen atmosphere with a heating rate of 10° C./min and a cooling rate of 10° C./min. Several cycles of measurements were performed from 25° C. to 150° C. The glass transition temperature ($T_9$) was determined at the second cycle.

Stress-relaxation tests were performed using an Anton-Paar MCR 302 rheometer with a plate diameter of 8 mm and on samples having a diameter of 8 mm and a thickness of 1 mm. Amplitude sweep experiments were performed using a frequency of 1 Hz, a constant force of 5 N and a variable shear strain that was ramped up logarithmically from 0.01% to 100%. Time sweep experiments with a constant shear strain of 1%, a constant force of 5N and an angular frequency of 1 rad·$s^{-1}$ during which both the storage and the loss modulus were measured, were performed before every stress-relaxation measurement. Then stress-relaxation experiments were performed using a constant shear strain of 1% and a constant force of 5 N. Creep experiments at different temperatures were also performed using a constant force of 5 N. Additionally, for creep experiments in the first 300 s no shear stress was applied. Following this, a 5000 Pa shear stress was applied for 1200 s and finally the shear stress was removed again for another 1200 s. Viscosity experiments were performed at a specified temperature and using a shear rate of 50 $s^{-1}$. The relaxation time ($\tau$) at a specified temperature was determined as the time at which $G/G_0$ equals 1/e in a stress-relaxation test using the aforementioned parameters at the specified temperature. The activation energy was calculated from an Arrhenius plot of relaxation times determined at different temperatures within the linear viscoelastic region.

Uniaxial tensile experiments were performed on a Tinius-Olsen H10KT tensile tester at room temperature, equipped with a 5000 N load cell and at a speed of 10 mm/min and a pre-load of 0.05 N. Flat dog-bone type specimens with an effective gauge length of 13 mm, a width of 2 mm and a thickness of 1 mm were used for the tensile tests. The samples were cut out using a Ray-Ran dog-bone cutter, the samples and the dog-bone cutter were pre-heated for 5 minutes in a 7.5-ton manual rubberstamp press at 150° C. The tensile tests performed on the composite samples were carried out on a servo-hydraulic INSTRON 8801 tensile testing machine utilizing a load cell of +100 kN, a FastTrack 8800 digital controller and a speed of 2 mm/min. In order to prevent relative rotation of the grips, a special fixture is mounted on the tensile machine. Additionally, an INSTRON alignment kit was used to align the grips. The tensile data was registered using a National Instruments C-series data acquisition card. The signals from strain gauges as well as the load, displacement and strain recorded by the FastTrack controller were measured on the same time basis. The samples had a rectangular shape of 3×20 $cm^2$.

Attenuated total reflection Fourier transform Infrared (ATR-FTIR) analyses were realized on a Perkin-Elmer Spectrum1000 FTIR infrared spectrometer equipped with a diamond ATR probe.

The networks were (re)processed using compression molding. The samples were cut into small pieces and placed in the mold. They were then put in a heated press at 150° C. for 15 minutes at 0 metric ton pressure, after which the pressure was increased to 0.25 metric tons for 20 minutes. Following this, the pressure was further raised to 1 metric tons for a final 20 minutes. The samples were then removed from the mold while they were still warm.

Soxhlet experiments were performed using toluene at 125° C. for 24 h. Then, the samples were carefully taken out and were dried in a vacuum oven at 110° C. overnight to remove the remainder of the solvent. The soluble fraction was calculated as $((m_{initial}-m_{dry})/(m_{initial}))\times100\%$. The reported results are averages of three measurements.

Swelling degree was determined by submerging the samples in 15 mL toluene for 24 h at 25° C. Then, the samples were taken out of the vial and weighed. The swelling ratio was calculated using following equation. Swelling ratio $\%=(_{swollen}-m_{initial})/(m_{initial})\times100\%$.

Recyclability was investigated by breaking the samples into small pieces and compression molding them in a hot press at 150° C. for 15 minutes, allowing the material to cool to room temperature and characterizing the resulting material. Recycling step 0 denotes the material as synthesized, while recycling step X denotes the material after X cycles of heating at 150° C. for 15 minutes and cooling back to room temperature.

Results (Examples 7-9)

Figure 2:
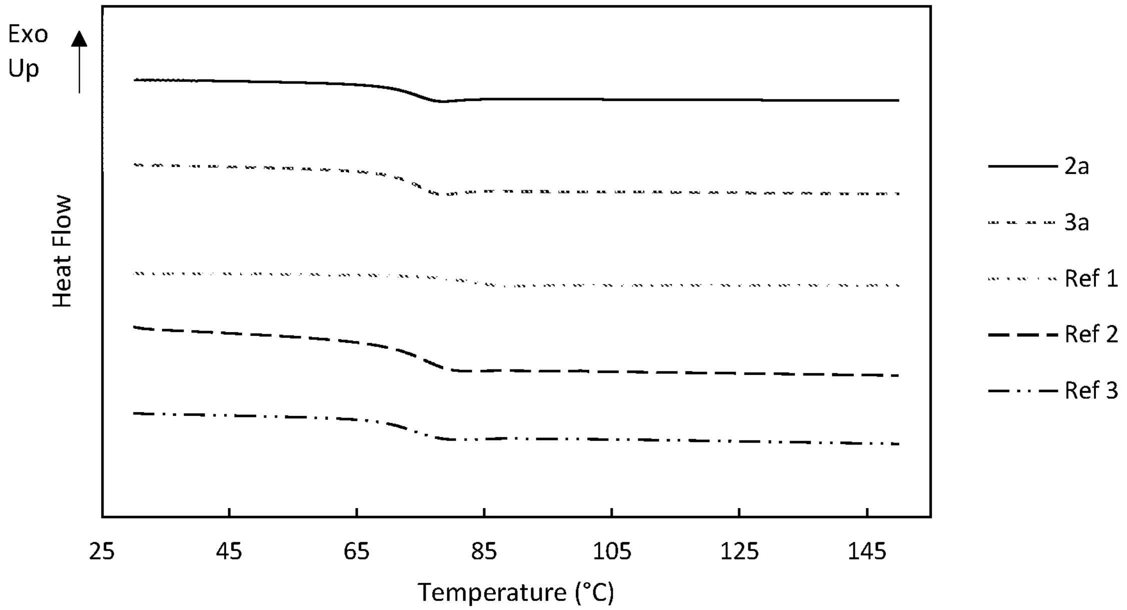
FIG. 2 depicts the DSC thermograms applying a heating and cooling rate of 10° C./min of selected materials as tested in example 5.
Figure 3A:
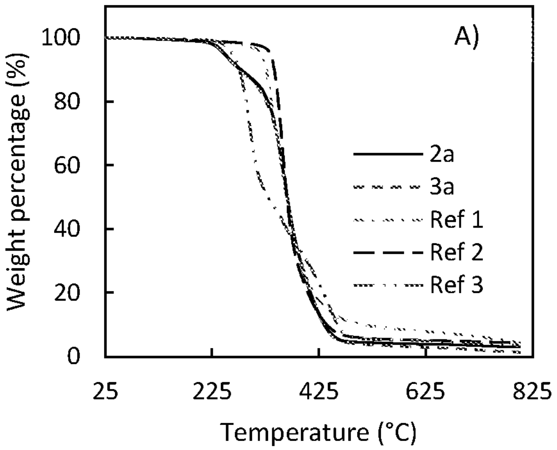
FIG. 3A depicts the TGA measurement of selected materials as tested in example 5, applying a temperature ramp from 25 to 800° C. at 10° C./min.
Figure 3B:
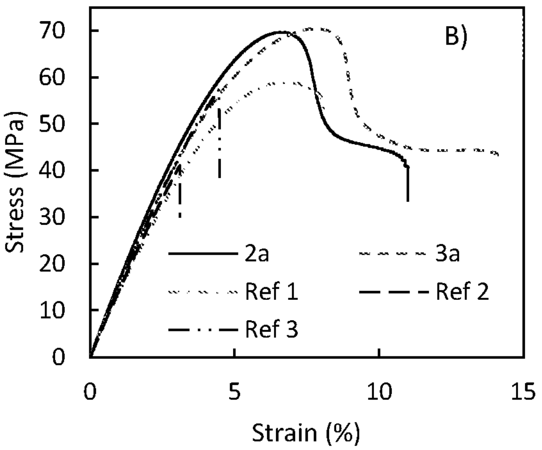
FIG. 3B depicts the stress-strain curves of these selected materials as tested in example 5.
Figure 4A:
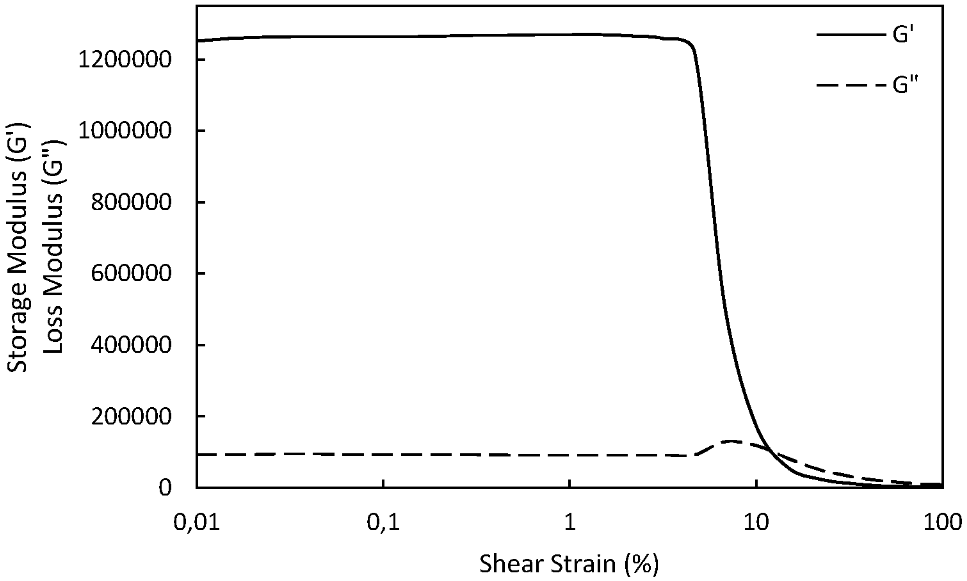
FIGS. 4A, 4B and 4C depict the rheological characterisation (amplitude sweep at 160° C. with a force of 5N) of examples 2a (0 recycling steps), 3a (0 recycling steps) and Ref 3 (0 recycling steps) respectively as tested in example 5.
Figure 4B:
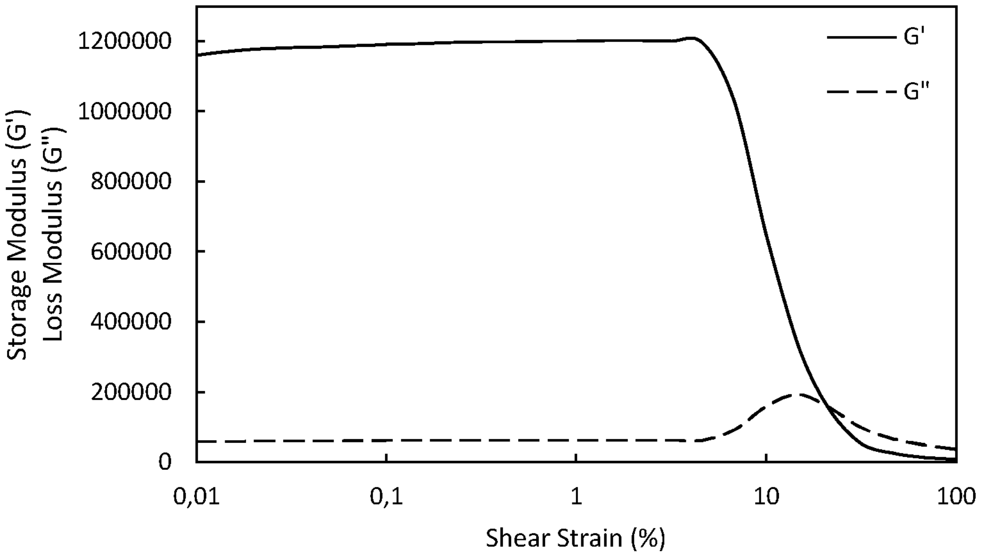
Figure 4C:
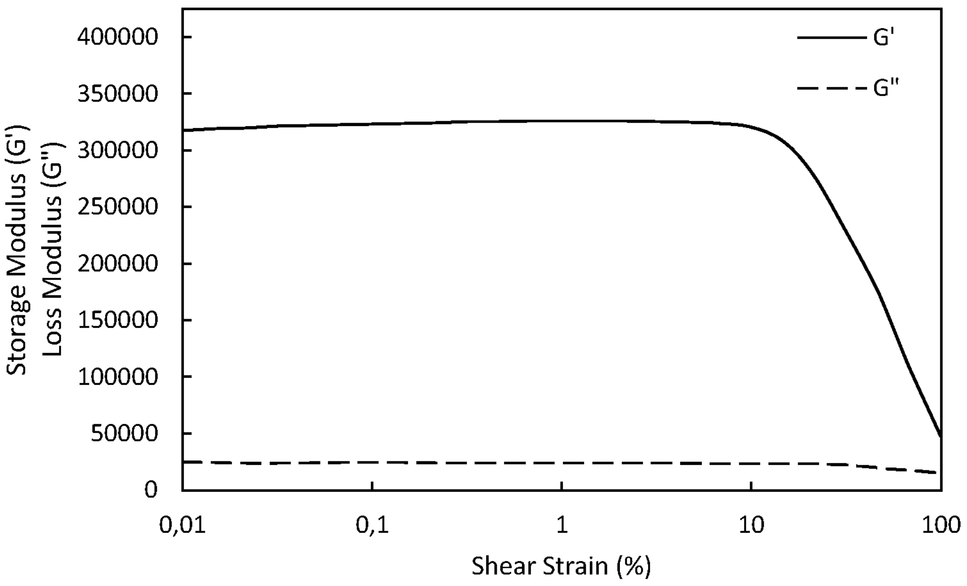
Figure 5A:
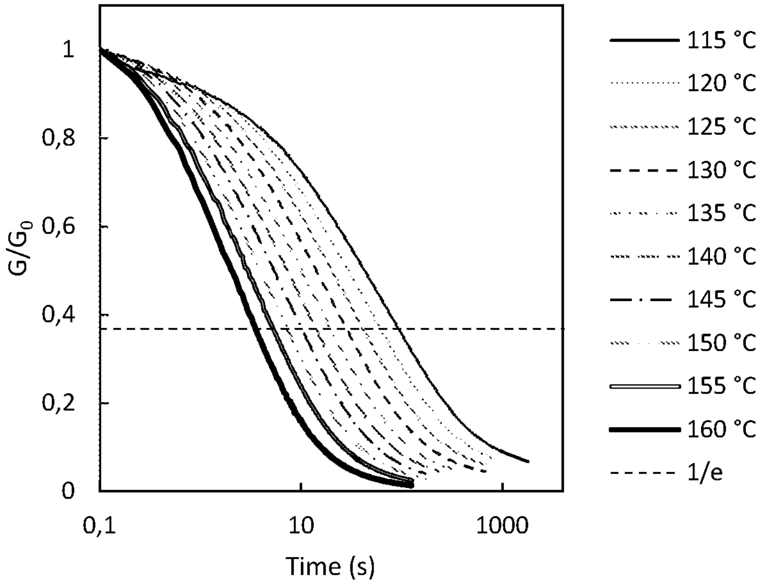
FIGS. 5A, 5B and 5C depict the stress relaxation experiments from 115-160° C. of examples 2a (0 recycling steps), 3a (0 recycling steps) and Ref 3 (0 recycling steps) respectively as tested in example 5. The dashed line corresponds to the value 1/e, which defines the characteristic relaxation time T. A constant strain of 1% was applied, which was within the linear viscoelastic region (LVER).
Figure 5B:
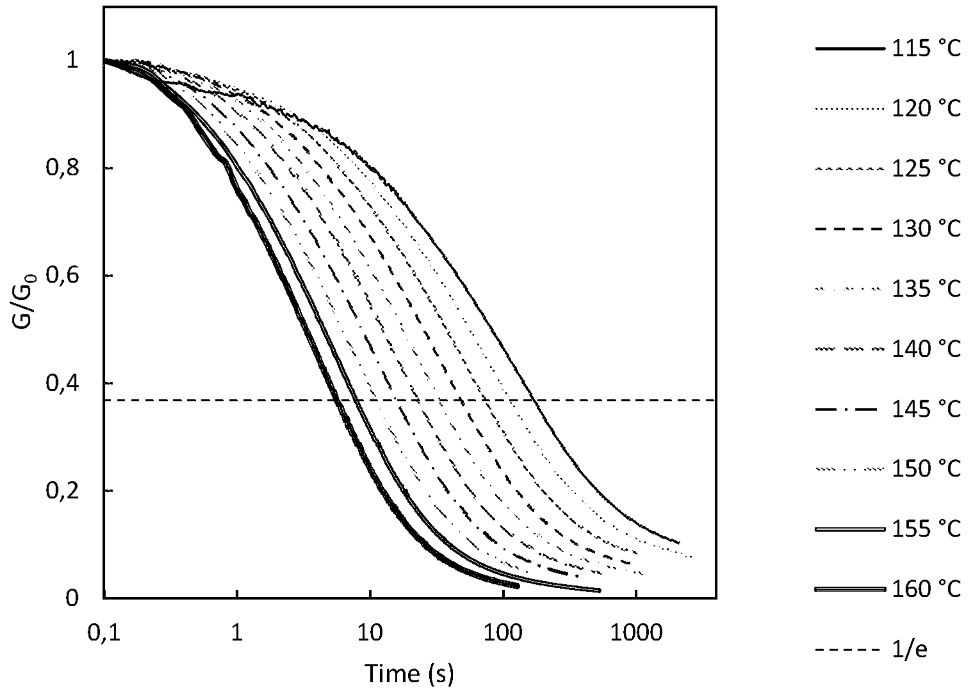
Figure 5C:
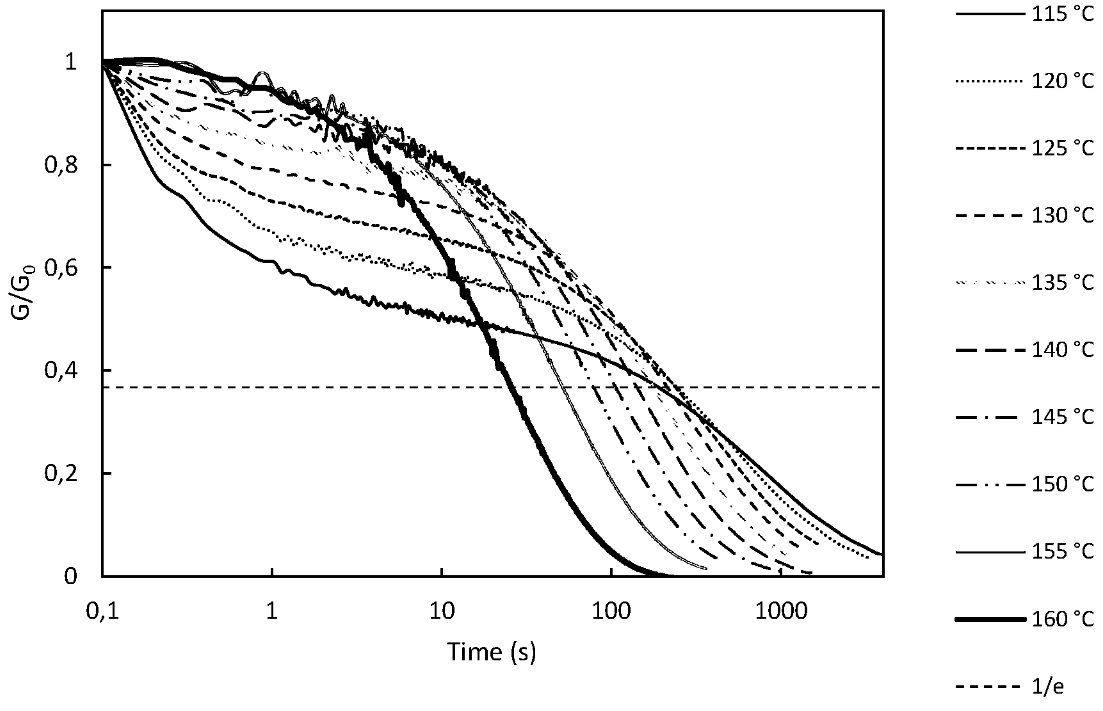
Figure 6A:
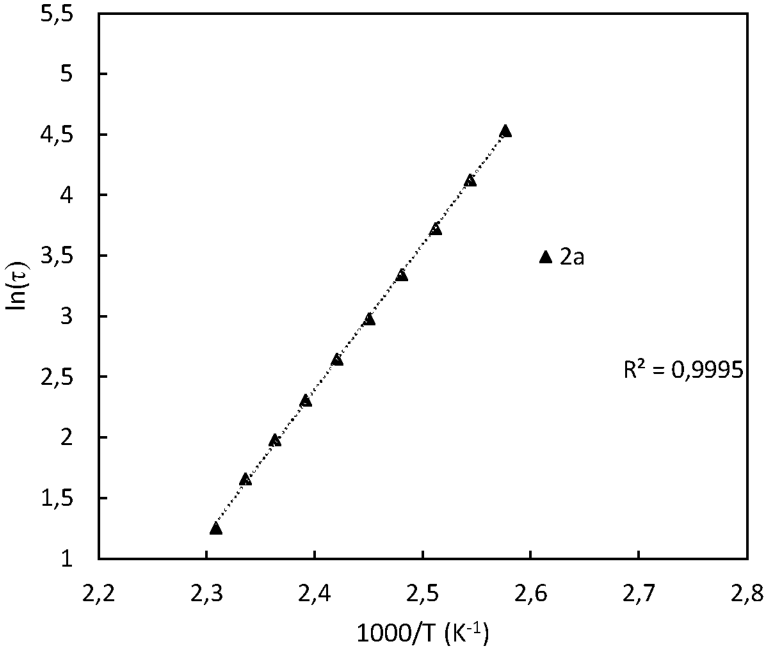
FIGS. 6A, 6B and 6C depicts respectively the Arrhenius plot of the obtained relaxation times for examples 2a (0 recycling steps), 3a (0 recycling steps) and Ref 3 (0 recycling steps) with a linear trendline, as tested in example 5.
Figure 6B:
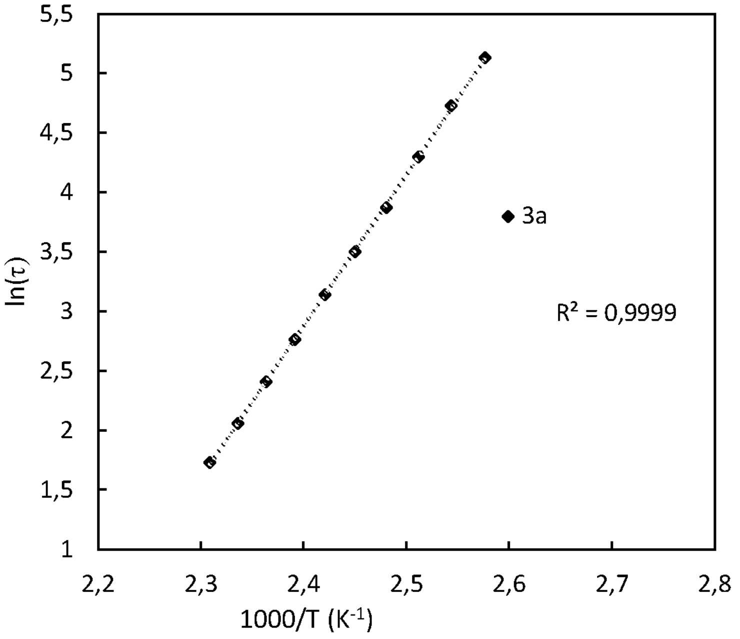
Figure 6C:
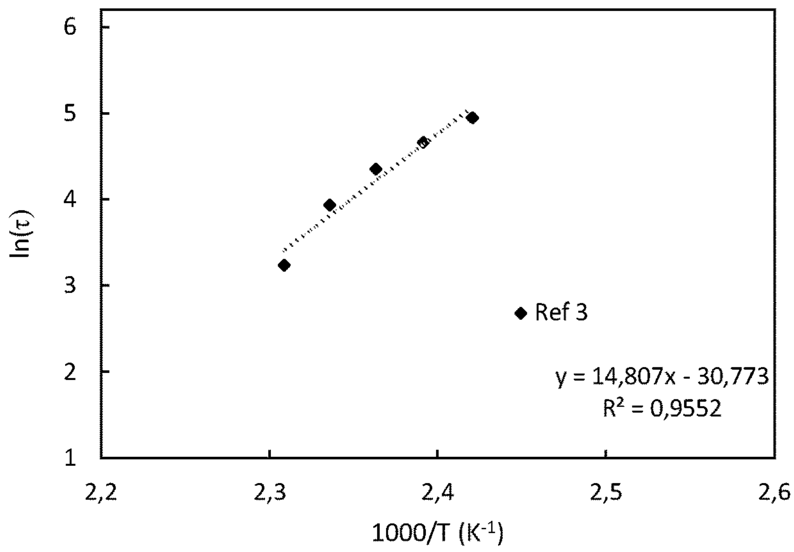
Figure 7:
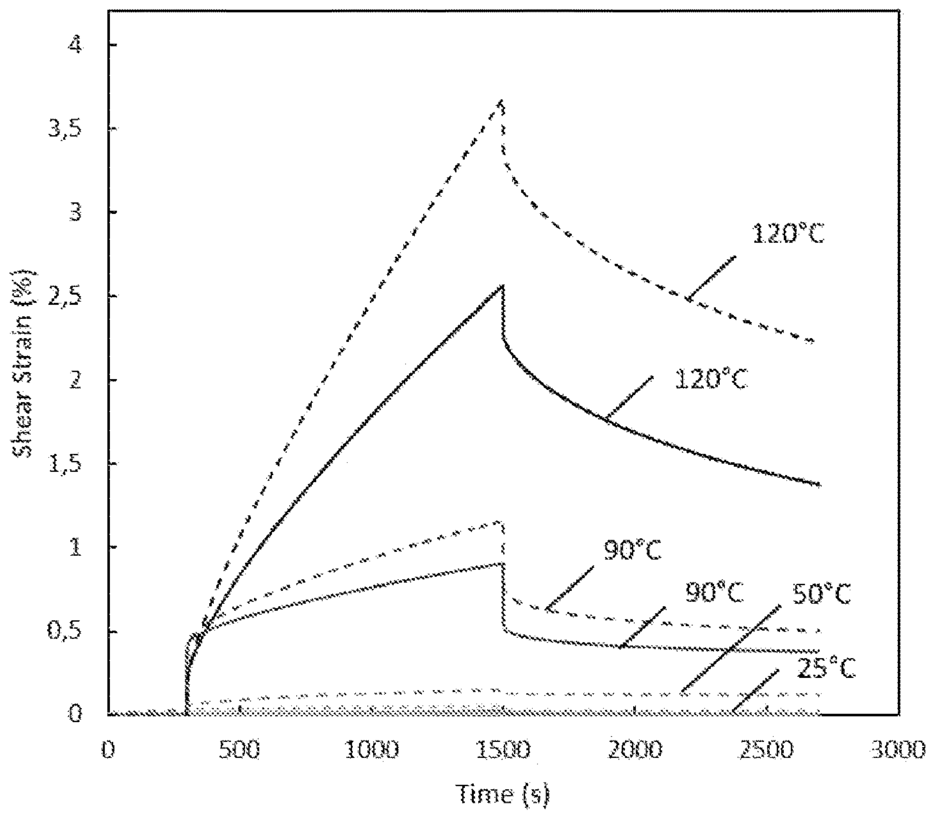
FIG. 7 depicts the creep recovery experiments of example 2a (0 recycling steps) (dashed line) and example 3a (0 recycling steps) (full line) at different temperatures with an applied stress of 5000 Pa for 20 minutes as tested in example 5.
Figure 8:
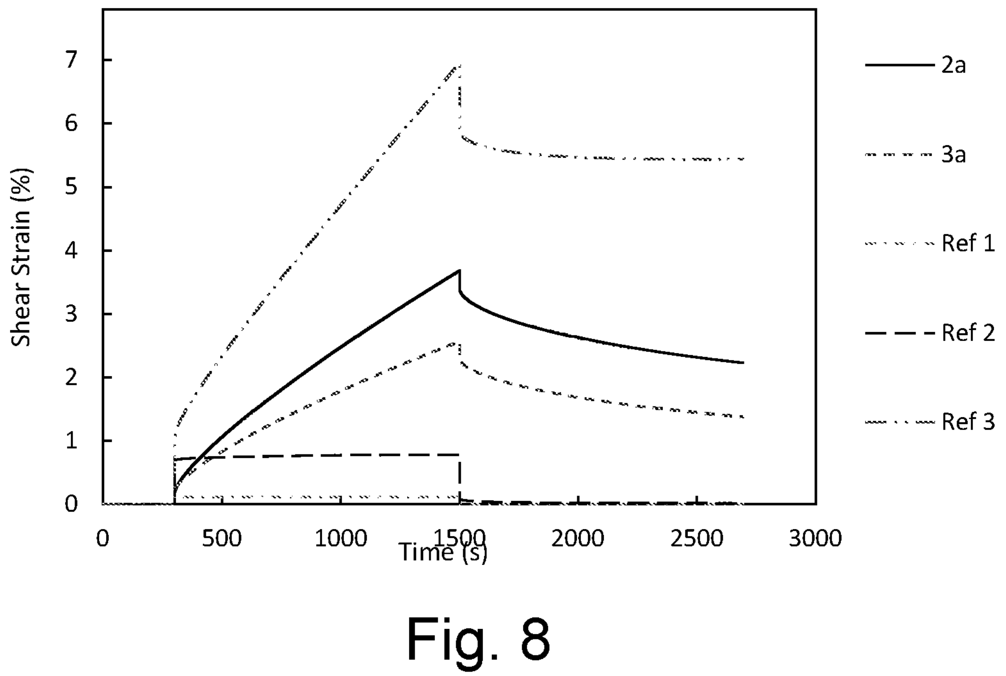
FIG. 8 depicts the creep recovery experiments of selected materials at 120° C. with an applied stress of 5000 Pa for 20 minutes as tested in example 5.
Figure 9:
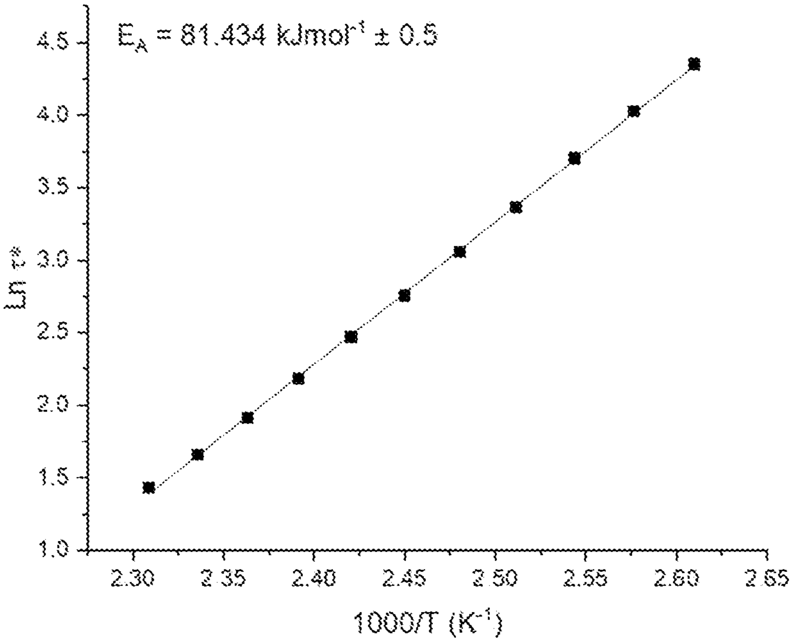
FIG. 9 depicts the Arrhenius plot of the obtained relaxation times for example 11D.

FIGS. 1-9, described herein earlier, show selected results of the characterisations performed in examples 7-9.

Table 4 summarizes the main characteristics of the tested materials.

TABLE 4

| Example | Recycling step | $T_g$ (° C.) | $T_{d5\%}$ (° C.) | Soluble fraction (%) | Elongation at break ϵ (%) | Young's Modulus E' (MPa) | Relaxation time at 150° C. (s) | Activation Energy $E_A$ (kJ/mol) |
|---|---|---|---|---|---|---|---|---|
| 7a | 0 | 74 | 250 | 5.0 | 10.60 ± 1.98 | 1680 ± 25 | | |
| | 1 | 74 | ND | ND | 3.92 ± 1.65 | 1710 ± 101 | | |
| | 2 | 73 | ND | ND | 3.66 ± 0.81 | 1620 ± 36 | | |
| | 3 | 73 | ND | ND | 4.05 ± 1.03 | 1650 ± 36 | | |
| | 4 | 74 | 247 | 1.0 | 4.67 ± 1.34 | 1610 ± 45 | | |
| 7b | 0 | 82 | 250 | 18 | ND | ND | 18.4 | 107 ± 1 |
| 7c | 0 | 75 | 242 | 9 | ND | ND | 8.6 | 102 ± 1 |
| 7d | 0 | 73 | 260 | 21 | ND | ND | 18.4 | 100 ± 6 |
| 8a | 0 | 74 | 248 | 1.4 | 13.50 ± 1.19 | 1560 ± 50 | | |
| | 1 | 74 | ND | ND | 4.85 ± 0.68 | 1500 ± 7 | | |
| | 2 | 75 | ND | ND | 4.31 ± 1.37 | 1520 ± 82 | | |
| | 3 | 74 | ND | ND | 2.79 ± 0.61 | 1530 ± 66 | | |
| | 4 | 75 | 252 | 0.7 | 2.80 ± 0.14 | 1560 ± 54 | | |
| 8b | 0 | 78 | 255 | 7.2 | ND | ND | 30 | 106 ± 1 |
| 8c | 0 | 74 | 258 | 1.7 | ND | ND | 12.5 | 107 ± 0.8 |
| 8d | 0 | 73 | 258 | 3.8 | ND | ND | 11.5 | 102 ± 0.5 |
| 9a | 0 | 95 | ND | ND | ND | ND | 21.5 | 103.7 ± 4.10 |
| Ref 1 | 0 | 82 | 313 | 3.0 | 7.44 ± 0.71 | 1430 ± 60 | | |
| Ref 2 | 0 | 75 | 333 | 0.6 | 2.08 ± 0.63 | 1540 ± 152 | | |
| Ref 3 | 0 | 73 | 254 | 16.0 | 4.18 ± 1.47 | 1600 ± 87 | 25.5 (at 160° C.) | |

ND = not determined

Additionally, isothermal TGA analysis showed that none of the materials of examples 7-9 displayed a weight loss of more than 1% after 120 minutes at 150° C. Swelling degree measurements were performed on the samples at recycling step 0 (i.e. before any recycling steps were performed), the results are shown in Table 5.

TABLE 5

| Example | Recycling step | Swelling degree (%) |
|---|---|---|
| 7a | 0 | |
| | 1 | |
| | 2 | |
| | 3 | |
| | 4 | |
| 7b | 0 | 18 ± 3 |
| 7c | 0 | 9 ± 2 |
| 7d | 0 | 21 ± 1 |
| 8a | 0 | |
| | 1 | |
| | 2 | |
| | 3 | |
| | 4 | |
| 8b | 0 | 7 ± 8 |
| 8c | 0 | 12 ± 1 |
| 8d | 0 | 19 ± 0 |
| 9a | 0 | |
| Ref 1 | 0 | |
| Ref 2 | 0 | |
| Ref 3 | 0 | |

As can be observed from the data presented herein and from the figures, the epoxy-derived CANs according to the invention can be provided as vitrimers, exhibiting viscoelastic flow behaviour above their $T_9$ while not dissolving in toluene. Furthermore, the $T_9$ is in a similar range as certain commercially available epoxy materials (e.g. Ref 1 having a $T_g$ of 82° C.), allowing a broad application range, while showing full recyclability at higher temperatures. Even the thermal stability, reflected by $T_{d5\%}$ and importantly the low weight loss after 120 minutes at 150° C., is more than adequate to allow the epoxy-derived CANs to be industrially applicable. In addition, the materials of the present invention combine these advantageous properties with a low soluble fraction and Young's moduli which are very similar to the reference materials. Furthermore, when comparing the tensile strength data, a clear difference is visible between the epoxy-derived CANs of the present invention and the reference materials, the latter allowing a much higher elongation (e.g. more than 10%—example 7a and 8a) to be achieved.

The stress-relaxation experiments showed that the epoxy-derived CANs of the invention exhibit full stress-relaxation following a single exponential decay relaxation typical of a Maxwell behavior. Furthermore, a near perfect linear behavior is obtained in the Arrhenius plots confirming the vitrimer-nature of these materials, despite the high proportion of irreversible bonds. The topoly freezing temperature of example 7a, 8a and Ref 3 was determined to be 31° C., 39° C. and 51° C. respectively.

The relaxation time of the epoxy-derived CANs of the present invention was surprisingly low, even much lower than the relaxation time of a similar network containing 100% exchangeable bonds and no epoxide bonds (Ref 3). Without wishing to be bound by any theory, the present inventors believe that this significant difference in relaxation time observed upon addition of epoxides, may be due to the resulting formation of secondary hydroxyl groups increasing the transamination rate of vinylogous urethanes. However, despite this significantly increased relaxation time, the epoxy-derived CANs of the present invention display markedly better creep resistance than Ref 3.

Upon recycling, the Young's modulus of the present epoxy-derived CANs advantageously remains unchanged. Furthermore, DSC measurements did not exhibit a significant difference over the course of the recycling process, for example the $T_g$ was maintained. In addition, no change was observed in the FTIR spectra of the recycled materials. Furthermore, after four recycling steps similar degradation temperatures and soluble fraction were obtained, compared to the original material before recycling. Hence, it is clear that the epoxy-derived CANs of the present invention are highly recyclable.

Finally, the epoxy-derived CANs of the present invention are characterized by an off-white to light-yellow colour, while being highly transparent and having low haze. For example, text on a piece of paper was still easily readable through a layer of 1 cm thick epoxy-derived CAN according to the invention.

Example 10: Composite Formation

The epoxy-derived CANs of the present invention were used to produce composite material (denoted as example 10a) as follows. A synthesis similar to example 8a was applied. However, after water removal from the vinylogous curing agent, and before mixing the resulting water-free vinylogous curing agent with the EPIKOTE® resin MGS LR 135, both the curing agent and the resin were separately heated to 45° C. Once both were at 45° C., they were mixed together and partially poured on glass-fiber fabric style 3025 (obtained from Porcher Industries). The poured epoxy mixture was then manually spread using a pressure roller until all fibers were impregnated. Following this, a next layer of glass fiber was placed on top of the impregnated layer of glass fiber. A next amount of epoxy resin was poured on the new layer of glass fiber and again manually spread. This process was repeated until four layers of glass fiber were impregnated (at an angle of 0°). Then the foil was closed in a bag and sealed under vacuum. The composite was then placed in an oven at 100° C. and cured for 4 h.

The fiber volume fraction of composite 6a was determined using TGA (resin burning-off) to be 53%. A tensile test was performed as described in the characterisation procedures section of examples 7-9 and the values compared to a unidirectional glass fabric reinforced epoxy reference (denoted Ref 4). The results are shown in Table 6. However, since failure occurred at the grips, the values obtained for the strain and elongation at failure are most likely underestimated.

TABLE 6

| | Example 11a | Ref 4 |
|---|---|---|
| Stiffness $E_{11}$ (GPa) | 31.6 | 42 |
| Strain at failure $X_t$ (MPa) | 405 | 939 |
| Elongation at failure $\varepsilon_{11}$ (%) | 1.36 | 2.5 |
| Poisson ratio $v_{12}$ | 0.259 | 0.259 |

In a similar manner to the production of example 10a, single-layer composite material (denoted as example 10b) was produced. The reshapeability of example 10b was tested by placing it in a pre-heated oven at 150° C. for 10 minutes together with the weights used for reshaping. Once the sample and the weights were at the right temperature, the sample was gradually deformed. After the desired deformation was reached, the sample was kept in its new shape for 15 minutes to ensure full stress release due to reorganization of the vinylogous urethane matrix. Following this, the weights were removed, and the sample was left to cool down. The sample maintained its new shape without visible damage to the matrix.

Example 11: Further Examples of Epoxy-Derived CANs Through One Pot Reaction Containing 42% Vinylogous Bonds A range of epoxy-derived CANs (Table 10) containing 42% vinylogous bonds were synthesised through a one pot reaction, using varying combinations of the building blocks shown in Table 7.

TABLE 7

| Epoxy | Acetoacetate | Amine |
|---|---|---|
| Tris(4-hydroxyphenyl)methane triglycidyl ether | 1,6-Hexanediol bisacetoacetate | m-Xylylenediamine |
| 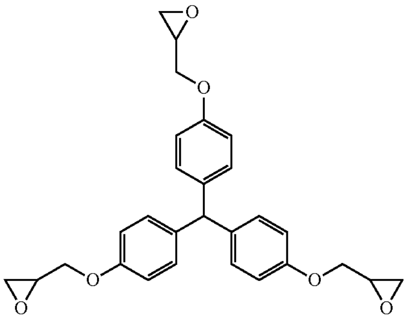 [SMILES: c1cc(C(c2ccc(OCC3CO3)cc2)c2ccc(OCC3CO3)cc2)ccc1OCC1CO1] | 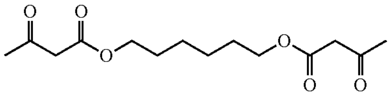 [SMILES: CC(=O)CC(=O)OCCCCCCOC(=O)CC(C)=O] | 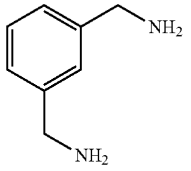 |
| 13 | 17 | 22 |
| Trimethylolpropane triglycidyl ether | 1,4-Dimethanolbenzene bisacetoacetate | 1,3-Cyclohexanebis(methylamine) |
| 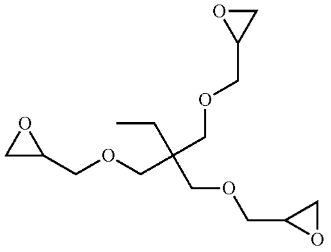 [SMILES: CCC(COCC1CO1)(COCC1CO1)COCC1CO1] | 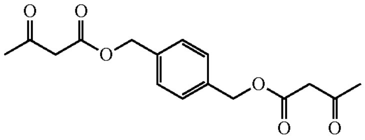 [SMILES: CC(=O)CC(=O)OCc1ccc(COC(=O)CC(C)=O)cc1] | 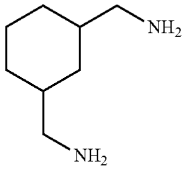 |
| 14 | 18 | 7 |
| 1,4-Butanediol diglycidyl ether | 1,2-Ethyleneglycol bisacetoacetate | Isophorone diamine |
| 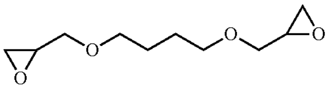 [SMILES: C(CCOCC1CO1)COCC1CO1] | 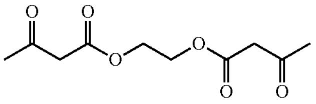 [SMILES: CC(=O)CC(=O)OCCOC(=O)CC(C)=O] | 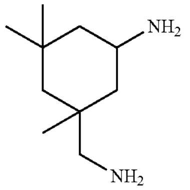 |
| 15 | 1 | 23 |
| Bisphenol A diglycidyl ether | Trimethylolpropane bisacetoacetate | 1,4-Butanediamine |
| 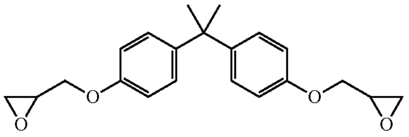 [SMILES: CC(C)(c1ccc(OCC2CO2)cc1)c1ccc(OCC2CO2)cc1] | 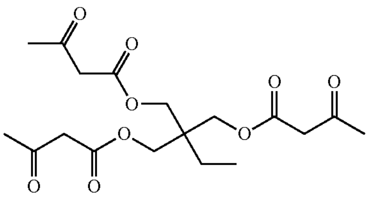 [SMILES: CCC(COC(=O)CC(C)=O)(COC(=O)CC(C)=O)COC(=O)CC(C)=O] | 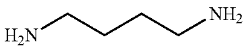 |
| 9 | 19 | 24 |
| Resorcinol diglycidyl ether | 1,10-Decanediol bisacetoacetate | 1,6-Hexanediamine |
| 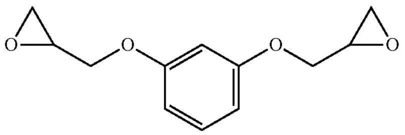 [SMILES: c1cc(OCC2CO2)cc(OCC2CO2)c1] | 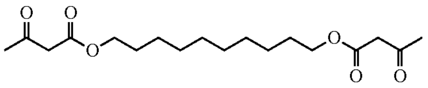 [SMILES: CC(=O)CC(=O)OCCCCCCCCCCOC(=O)CC(C)=O] | 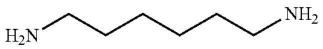 |
| 16 | 20 | 25 |

TABLE 7-continued

| Acetoamide | |
|---|---|
| 1,1'-(piperazine-1,4-diyl)bis(butane-1,3-dione) | Tris(2-aminoethyl)amine |
| 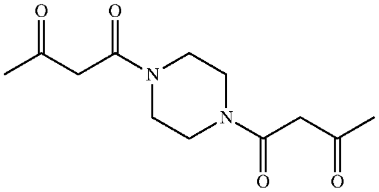 [SMILES: CC(=O)CC(=O)N1CCN(C(=O)CC(C)=O)CC1] | 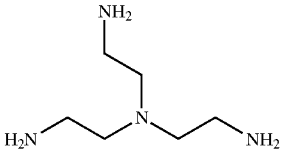 |
| 21 | 8 |

When the acetoacetate was tri-functionalised (19), then the number of relative epoxy and amine functional groups were calculated as follows:

$$S = 0.42 = \frac{N.\text{ acetoacetate }(AA)\text{ functional groups}}{N.AA + N.\text{ epoxy functional groups}} = \frac{3}{3+x}(0.42\times 3) + (0.42x) = 3$$

$$x = \frac{3-(0.42\times 3)}{0.42} = 4.14 = N.\text{ epoxy functional groups}$$

$$P = 1.05 = \frac{N.\text{ amine functional groups}}{N.AA\text{ functional groups} + N.\text{ epoxy functional groups}} = \frac{x}{3+4.14}$$

$$\therefore x = 7.50$$

To calculate the equivalents used (in order to calculate the molar amounts required), the relative number of functional groups (N.XX) was divided by the number of functionalities of the, acetoacetate (3), diamine (2) and epoxy (2), as shown below in Table 8.

TABLE 8

| | N. functional groups | Equivalents |
|---|---|---|
| Acetoacetate | 3.00 | 1.00 |
| Epoxy | 4.14 | 2.07 |
| Diamine | 7.50 | 3.75 |

When the acetoacetate was bi-functionalised (17, 18, 1, 20), then the number of relative epoxy and amine functional groups were calculated as follows:

$$S = 0.42 = \frac{N.\text{ acetoacetate }(AA)\text{ functional groups}}{N.AA + N.\text{ epoxy functional groups}} = \frac{2}{2+x}(0.42\times 2) + (0.42x) = 2$$

$$x = \frac{2-(0.42\times 2)}{0.42} = 2.76 = N.\text{ epoxy functional groups}$$

-continued $$P = 1.05 = \frac{N.\text{ amine functional groups}}{N.AA\text{ functional groups} + N.\text{ epoxy functional groups}} = \frac{x}{2+2.76}$$

$$\therefore x = 5.00$$

To calculate the equivalents used (in order to calculate the molar amounts required), the relative number of functional groups (N.XX) was divided by the number of functionalities of the acetoacetate (2), diamine (2/3) and epoxy (3/2), as shown below in Table 9.

TABLE 9

| | N. functional groups | Equivalents |
|---|---|---|
| Acetoacetate | 2.00 | 1.00 |
| Epoxy | 2.76 | 0.92/1.38 |
| Diamine | 5.00 | 2.50/1.67 |

The acetoacetate was added to the epoxy, which were then mixed using a SpeedMixer™ for 2 minutes at 2500 rpm. In the case of compounds which were solid at room temperature, these were gently heated until they were liquid to ensure homogenous mixing. The amine was then added (again the acetoacetate-epoxy mixture was first gently heated beforehand if it was solid at room temperature), before being mixed again for 2 minutes at 2500 rpm. The mixture was then placed in an oven at 90-100° C. for 1 hour, before being cured under vacuum overnight (see Table 10 for applicable curing temperature).

The resulting epoxy-derived CANs were processed using a hydraulic laboratory moulding press (Carver 3690), using at least 1.5 metric ton of pressure for at least 15 minutes until well-formed (see Table 10 for the actual temperature of the moulding press during processing). The thermal stability using thermal gravimetric analysis (TGA) and glass transition temperature ($T_g$) using differential scanning calorimetry (DSC) of the resulting networks were subsequently measured (see Table 10).

TABLE 10

| Example | Epoxy | Acetoacetate | Amine | $T_g$/ ° C. | $T_{deg\ 5\%}$/ ° C. | Processing Temp./ ° C. | Curing Temp./ ° C. | T*/ s 150° C. | $E_A$/ kJ $mol^{-1}$ |
|---|---|---|---|---|---|---|---|---|---|
| 11A | 14 | 17 | 22 | 40 | 247 | 150 | 100 | | |
| 11B | 13 | 17 | 7 | 40 | 271 | 150 | 100 | | |
| 11C | 15 | 19 | 25 | 6 | 267 | 150 | 100 | | |
| 11D | 15 | 19 | 22 | 26 | 268 | 150 | 100 | 6.8 | 81.4 ± 0.5 |
| 11E | 9 | 19 | 22 | 79 | 150 | 150 | 100 | | |
| 11F | 9 | 19 | 7 | 83 | 268 | 150 | 100 | | |
| 11G | 16 | 19 | 22 | 57 | 271 | 150 | 100 | 2.4 | 87.5 ± 1.2 |
| 11H | 16 | 19 | 24 | 53 | 263 | 150 | 100 | 3.8 | 101.1 ± 1.0 |
| 11I | 9 | 17 | 8 | 67 | 278 | 150 | 100 | | |
| 11J | 15 | 17 | 8 | 21 | 270 | 150 | 100 | 43.2 | 123.2 ± 5.11 |
| 11K | 15 | 20 | 8 | 16 | 268 | 150 | 100 | | |
| 11L | 9 | 20 | 8 | 45 | 241 | 150 | 100 | | |
| 11M | 14 | 20 | 7 | 54 | 237 | 150 | 100 | | |
| 11N | 13 | 1 | 8 | 75 | 265 | 150 | 140 | | |
| 11O | 13 | 1 | 7 | 79 | 244 | 150 | 100 | | |
| 11P | 13 | 1 | 22 | 74 | 242 | 150 | 100 | | |

Example 12: Further Examples of Epoxy-Derived CANs Through Two Step Reaction Containing 42% Vinylogous Bonds A range of epoxy-derived CANs (Table 11) containing 42% vinylogous bonds were synthesised through a two-step reaction, using varying combinations of the building blocks shown in Table 7.

When the acetoacetate was tri-functionalised (19), then the number of relative epoxy and amine functional groups were calculated as follows:

$$S = 0.42 =$$

$$\frac{N.\ \text{acetoacetate}\ (AA)\ \text{functional groups}}{N.AA + N.\ \text{epoxy functional groups}} = \frac{3}{3+x}(0.42 \times 3) + (0.42x) = 3$$

$$x = \frac{3 - (0.42 \times 3)}{0.42} = 4.14 = N.\ \text{epoxy functional groups}$$

$$P =$$

$$1.05 = \frac{N.\ \text{amine functional groups}}{N.AA\ \text{functional groups} + N.\ \text{epoxy functional groups}} = \frac{x}{3 + 4.14}$$

$$\therefore x = 7.50$$

To calculate the equivalents used (in order to calculate the molar amounts required), the relative number of functional groups (N.XX) was divided by the number of functionalities of the acetoacetate (3), diamine (2) and epoxy (2), as shown in Table 8.

When the acetoacetate was bi-functionalised (17, 18, 1, 20), then the number of relative epoxy and amine functional groups were calculated as follows:

$$S = 0.42 =$$

$$\frac{N.\ \text{acetoacetate}\ (AA)\ \text{functional groups}}{N.AA + N.\ \text{epoxy functional groups}} = \frac{2}{2+x}(0.42 \times 2) + (0.42x) = 2$$

$$x = \frac{2 - (0.42 \times 2)}{0.42} = 2.76 = N.\ \text{epoxy functional groups}$$

$$P =$$

-continued $$1.05 = \frac{N.\ \text{amine functional groups}}{N.AA\ \text{functional groups} + N.\ \text{epoxy functional groups}} = \frac{x}{2 + 2.76}$$

$$\therefore x = 5.00$$

To calculate the equivalents used (in order to calculate the molar amounts required), the relative number of functional groups (N.XX) was divided by the number of functionalities of the acetoacetate (2), diamine (2/3) and epoxy (3/2), as shown in Table 9.

The VU curing agent was first prepared by adding the amine to the acetoacetate. In the case of 1,4-dimethanolbenzene bisacetoacetate (8), this was first gently heated until liquid before addition of the amine. The mixture was then mixed using a SpeedMixer™ for 2×2 minutes at 2500 rpm. This mixture was then dried under vacuum (see Table 11 for applicable temperatures) overnight to remove the water formed during the condensation reaction. The epoxy was then added to the curing agent (again this was gently heated beforehand if solid at room temperature). The mixture was then mixed using a SpeedMixer™ for 2×2 minutes at 2500 rpm. The mixture was then placed in an oven at 90-100° C. for 1 hour, before being cured under vacuum overnight (see Table 11 for applicable curing temperature).

The resulting epoxy-derived CANs were processed using a hydraulic laboratory moulding press (Carver 3690), using at least 1.5 metric ton of pressure for at least 15 minutes until well-formed (see Table 11 for the actual temperature of the moulding press during processing). The thermal stability using thermal gravimetric analysis (TGA) and glass transition temperature ($T_g$) using differential scanning calorimetry (DSC) of the resulting networks were subsequently measured (see Table 11).

TABLE 11

| Example | Epoxy | Acetoacetate | Amine | $T_g$/ ° C. | $T_{deg\ 5\%}$/ ° C. | Processing Temp./ ° C. | Curing agent drying temp./ ° C. | Curing Temp./ ° C. | $\tau^*$/ s 150° C. | $E_A$/ kJ $mol^{-1}$ |
|---|---|---|---|---|---|---|---|---|---|---|
| 12A | 14 | 17 | 22 | 41 | 248 | 150 | 65 | 100 | | |
| 12B | 13 | 17 | 7 | 52 | 275 | 150 | 65 | 100 | | |
| 12C | | | | | | | | | | |
| 12D | | | | | | | | | | |
| 12E | | | | | | | | | | |
| 12F | | | | | | | | | | |
| 12G | 16 | 19 | 22 | 56 | 269 | 150 | 65 | 100 | 2.5 | 80.5 ± 3.7 |
| 12H | 16 | 19 | 24 | 60 | 263 | 150 | 65 | 100 | 26.8 | 162.6 ± 20.2 |
| 12I | 9 | 17 | 8 | 68 | 272 | 150 | 65 | 100 | | |
| 12J | 15 | 17 | 8 | 24 | 270 | 150 | 65 | 100 | | |
| 12K | 15 | 20 | 8 | 13 | 268 | 150 | 65 | 100 | | |
| 12L | | | | | | | | | | |
| 12M | | | | | | | | | | |
| 12N | 13 | 1 | 8 | 87 | 265 | 150 | 70 | 140 | | |
| 12O | 13 | 1 | 7 | 94 | 261 | 150 | 65 | 100 | | |
| 12P | 13 | 1 | 22 | 82 | 256 | 150 | 65 | 100 | | |

Example 13: Further Examples of Epoxy-Derived CANs Through One Pot Reaction Containing 60% Vinylogous Bonds A range of epoxy-derived CANs (Table 14) containing 60% vinylogous bonds were synthesised through a one pot reaction, using varying combinations of the building blocks shown in Table 7.

When the acetoacetate was tri-functionalised (19), then the number of relative epoxy and amine functional groups were calculated as follows:

$$S = 0.60 =$$

$$\frac{N.\text{ acetoacetate }(AA)\text{ functional groups}}{N.AA + N.\text{ epoxy functional groups}} = \frac{3}{3+x}(0.60 \times 3) + (0.60x) = 3$$

$$x = \frac{3-(0.60 \times 3)}{0.60} = 2.00 = N.\text{ epoxy functional groups}$$

$$P =$$

$$1.05 = \frac{N.\text{ amine functional groups}}{N.AA\text{ functional groups} + N.\text{ epoxy functional groups}} = \frac{x}{3+2.00}$$

$$\therefore x = 5.25$$

To calculate the equivalents used (in order to calculate the molar amounts required), the relative number of functional groups (N.XX) was divided by the number of functionalities of the acetoacetate (3) diamine (2) and epoxy (2), as shown below in Table 12.

TABLE 12

| | N. functional groups | Equivalents |
|---|---|---|
| Acetoacetate | 3.00 | 1.00 |
| Epoxy | 2.00 | 2.00 |
| Diamine | 5.25 | 2.63 |

When the acetoacetate/acetoamide was bi-functionalised (17, 18, 1, 20), or the bi-functional acetoamide (21) was used, then the number of relative epoxy and amine functional groups were calculated as follows:

$$S = 0.60 =$$

$$\frac{N.\text{ acetoacetate }(AA)\text{ functional groups}}{N.AA + N.\text{ epoxy functional groups}} = \frac{2}{2+x}(0.42 \times 2) + (0.42x) = 2$$

$$x = \frac{2-(0.42 \times 2)}{0.42} = 1.33 = N.\text{ epoxy functional groups}$$

$$P =$$

$$1.05 = \frac{N.\text{ amine functional groups}}{N.AA\text{ functional groups} + N.\text{ epoxy functional groups}} = \frac{x}{2+2.76}$$

$$\therefore x = 3.50$$

To calculate the equivalents used (in order to calculate the molar amounts required), the relative number of functional groups (N.XX) was divided by the number of functionalities of the acetoacetate/acetoamide (2), diamine (2/3) and epoxy (3/2), as shown below in Table 13.

TABLE 13

| | N. functional groups | Equivalents |
|---|---|---|
| Acetoacetate/Acetoamide | 2.00 | 1.00 |
| Epoxy | 1.33 | 0.44/0.67 |
| Diamine | 3.50 | 1.75/1.17 |

The acetoacetate (or acetoamide) was added to the epoxy, which were then mixed using a SpeedMixer™ for 2 minutes at 2500 rpm. In the case of compounds which were solid at room temperature, these were gently heated until they were liquid to ensure homogenous mixing. The amine was then added (again the acetoacetate/acetoamide-epoxy mixture was first gently heated beforehand if it was solid at room temperature), before being mixed again for 2 minutes at 2500 rpm. The mixture was then placed in an oven at 90-100° C. for 1 hour, before being cured under vacuum overnight (see Table 9 for applicable curing temperature).

The resulting epoxy-derived CANs were processed using a hydraulic laboratory moulding press (Carver 3690), using at least 1.5 metric ton of pressure for at least 15 minutes until well-formed (see Table 14 for the actual temperature of the moulding press during processing). The thermal stability using thermal gravimetric analysis (TGA) and glass transition temperature (Tg) using differential scanning calorimetry (DSC) of the resulting networks were subsequently measured (see Table 14).

TABLE 14

| Example | Epoxy | Acetoacetate/ Acetoamide | Amine | $T_g$/ ° C. | $T_{deg\ 5\%}$ ° C. | Processing Temp./ ° C. | Curing Temp./ ° C. | $\tau^*$/ S 150° C. | $E_A$/ kJ $mol^{-1}$ |
|---|---|---|---|---|---|---|---|---|---|
| 13A | 13 | 17 | 23 | 82 | 275 | 150 | 140 | | |
| 13B | 13 | 1 | 7 | 86 | 258 | 150 | 140 | | |
| 13C | 13 | 18 | 23 | 121 | 276 | 150 | 140 | | |
| 13D | 13 | 18 | 22 | 86 | 278 | 150 | 140 | | |
| 13E | 13 | 1 | 22 | 107 | 263 | 150 | 140 | | |
| 13F | 9 | 1 | 8 | 76 | 258 | 170 | 140 | | |
| 13G | 13 | 17 | 22 | 60 | 268 | 160 | 140 | | |
| 13H | 13 | 17 | 7 | 53 | 270 | 160 | 140 | | |
| 13I | 14 | 21 | 23 | 119 | 269 | 150 | 100 + 140* | | |
| 13J | 9 | 21 | 23 | 114 | 289 | 150 | 100 + 140* | | |
| 13K | 15 | 21 | 8 | 54 | 285 | 150 | 100 + 140* | 6.2 | 81.1 ±3.2 |
| 13L | 9 | 21 | 8 | 91 | 279 | 150 | 100 + 140* | 5.9 | 97.2 ±8.5 |

*Material was cured for one night at 100° C. and then a further night at 140° C.

Example 14: Further Examples of Epoxy-Derived CANs Through Two Step Reaction Containing 60% Vinylogous Bonds A range of epoxy-derived CANs (Table 15) containing 60% vinylogous bonds were synthesised through a two step reaction, using varying combinations of the building blocks shown in Table 7.

When the acetoacetate was tri-functionalised (19), then the number of relative epoxy and amine functional groups were calculated as follows:

$$S = 0.6 =$$

$$\frac{N.\ \text{acetoacetate}\ (AA)\ \text{functional groups}}{N.AA + N.\ \text{epoxy functional groups}} = \frac{3}{3+x}(0.42 \times 3) + (0.42x) = 3$$

$$x = \frac{3 - (0.42 \times 3)}{0.42} = 4.14 = N.\ \text{epoxy functional groups}$$

$$P =$$

$$1.05 = \frac{N.\ \text{amine functional groups}}{N.AA\ \text{functional groups} + N.\ \text{epoxy functional groups}} = \frac{x}{3 + 4.14}$$

$$\therefore x = 7.50$$

To calculate the equivalents used (in order to calculate the molar amounts required), the relative number of functional groups (N.XX) was divided by the number of functionalities of the acetoacetate (3), diamine (2) and epoxy (2), as shown in Table 12.

When the acetoacetate/acetoamide was bi-functionalised (17, 18, 1, 20), then the number of relative epoxy and amine functional groups were calculated as follows:

$$S = 0.60 =$$

$$\frac{N.\ \text{acetoacetate}\ (AA)\ \text{functional groups}}{N.AA + N.\ \text{epoxy functional groups}} = \frac{2}{2+x}(0.42 \times 2) + (0.42x) = 2$$

$$x = \frac{2 - (0.42 \times 2)}{0.42} = 2.76 = N.\ \text{epoxy functional groups}$$

$$P =$$

-continued $$1.05 = \frac{N.\ \text{amine functional groups}}{N.AA\ \text{functional groups} + N.\ \text{epoxy functional groups}} = \frac{x}{2 + 2.76}$$

$$\therefore x = 5.00$$

To calculate the equivalents used (in order to calculate the molar amounts required), the relative number of functional groups (N.XX) was divided by the number of functionalities of the acetoacetate/acetoamide (2) diamine (2/3) and epoxy (3/2), as shown in Table 13.

The VU curing agent was first prepared by adding the amine to the acetoacetate (or acetoamide). In the case of 1,4-dimethanolbenzene bisacetoacetate (8), this was first gently heated until liquid before addition of the amine. The mixture was then mixed using a SpeedMixer™ for 2×2 minutes at 2500 rpm. This mixture was then dried under vacuum (see Table 10 for applicable temperatures) overnight to remove the water formed during the condensation reaction. The epoxy was then added to the curing agent (again this was gently heated beforehand if solid at room temperature). The mixture was then mixed using a SpeedMixer™ for 2×2 minutes at 2500 rpm. The mixture was then placed in an oven at 90-100° C. for 1 hour, before being cured under vacuum overnight (see Table 10 for applicable curing temperature).

The resulting epoxy-derived CANs were processed using a hydraulic laboratory moulding press (Carver 3690), using at least 1.5 metric ton of pressure for at least 15 minutes until well-formed (see Table 15 for the actual temperature of the moulding press during processing). The thermal stability using thermal gravimetric analysis (TGA) and glass transition temperature (Tg) using differential scanning calorimetry (DSC) of the resulting networks were subsequently measured (see Table 15).

TABLE 15

| Example | Epoxy | Acetoacetate | Amine | $T_g$/ ° C. | $T_{deg\ 5\%}$/ ° C. | Processing Temp./ ° C. | Curing agent drying temp./ ° C. | Curing Temp./ ° C. | $\tau$*/ s 150° C. | $E_A$/ kJ mol$^{-1}$ |
|---|---|---|---|---|---|---|---|---|---|---|
| 14A | 13 | 17 | 23 | 99 | 283 | 150 | 70 | 140 | | |
| 14B | 13 | 1 | 7 | 94 | 261 | 150 | 100 | 140 | | |
| 14C | | | | | | | | | | |
| 14D | 13 | 18 | 22 | 92 | 274 | 150 | 100 | 140 | | |
| 14E | | | | | | | | | | |
| 14F | | | | | | | | | | |
| 14G | 13 | 17 | 22 | 71 | 282 | 160 | 100 | 140 | | |
| 14H | 13 | 17 | 7 | 67 | 280 | 160 | 100 | 140 | | |
| 14I | 14 | 21 | 23 | 105 | 268 | 150 | 100 | 140 | | |
| 14J | 9 | 21 | 23 | 105 | 298 | 150 | 100 | 140 | | |
| 14K | | | | | | | | | | |
| 14L | 9 | 21 | 8 | 104 | 284 | 150 | 100 | 140 | 6.5 | 76.9 ± 2.7 |

Characterisation Procedures (Examples 11-14)

Thermogravimetric analyses (TGA) were performed on a Mettler-Toledo TGA/SDTA 851e instrument. All dynamic thermogravimetric measurements were performed under nitrogen atmosphere with a heating rate of 10° C./min from 25° C. to 800° C. $T_{d5\%}$ is the temperature at which a weight loss of 5% is observed.

A Mettler Toledo instrument 1/700 was used to perform differential scanning calorimetry (DSC) measurements under nitrogen atmosphere with a heating rate of 10° C./min and a cooling rate of 10° C./min. Several cycles of measurements were performed from 0° C. to 200° C. The midpoint of the glass transition temperature ($T_g$) was determined from the second heating cycle.

Stress-relaxation tests were performed using an Anton-Paar MCR 302 rheometer with a plate diameter of 8 mm and on samples having a diameter of 8 mm and a thickness of 1 mm. Amplitude sweep experiments were performed using a frequency of 1 Hz, a constant force of 1 N and a variable shear strain that was ramped up logarithmically from 0.01% to 100%. Then stress-relaxation experiments were performed using a constant shear strain of between 0.1% and 1%, as predetermined by an amplitude sweep. During the stress-relaxation experiment, either a constant force of 1 N was applied or priorto each stress-relaxation measurement, a nominal force of between 0.2 and 0.5 N was applied for 20 seconds prior to the measurement to ensure good contact. The characteristic relaxation time ($\tau$*) at a specified temperature was determined as the time at which $G/G_0$ equals 1/e (≈0.37). The activation energy was calculated from an Arrhenius plot of relaxation times determined at different temperatures within the linear viscoelastic region.

The networks were (re)processed using compression moulding. The samples were broken into small pieces and placed in a mould. They were then placed between the two heated plates of a hydraulic laboratory moulding press (Carver 3690) at a defined temperature (see Tables 10, 11, 14 and 15) for around 5 minutes with 0 metric ton pressure applied, after which the pressure was increased to at least 1.5 metricton of pressure for at least 15 minutes until well-formed. The samples were removed from the mould whilst they were still warm.

Figure 11:
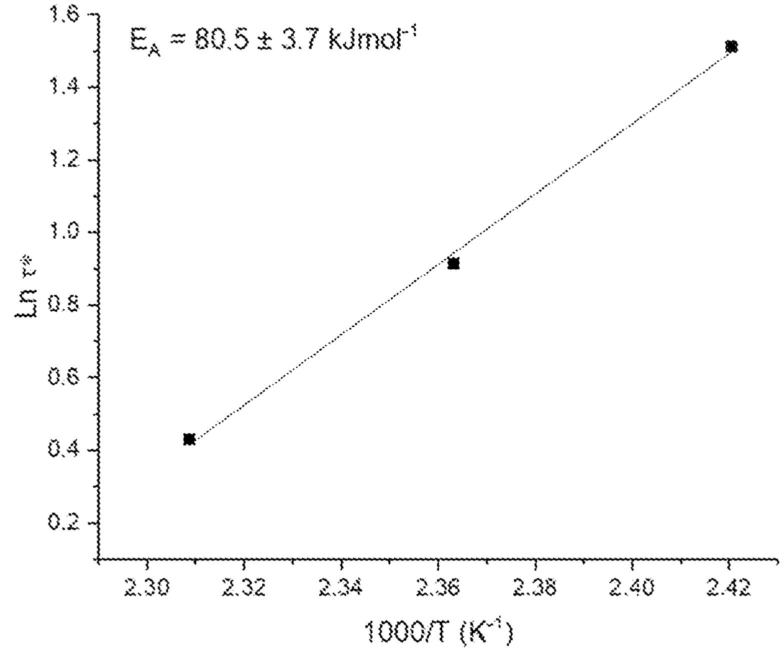
FIG. 11 depicts the Arrhenius plot of the obtained relaxation times for example 11G.
Figure 13:
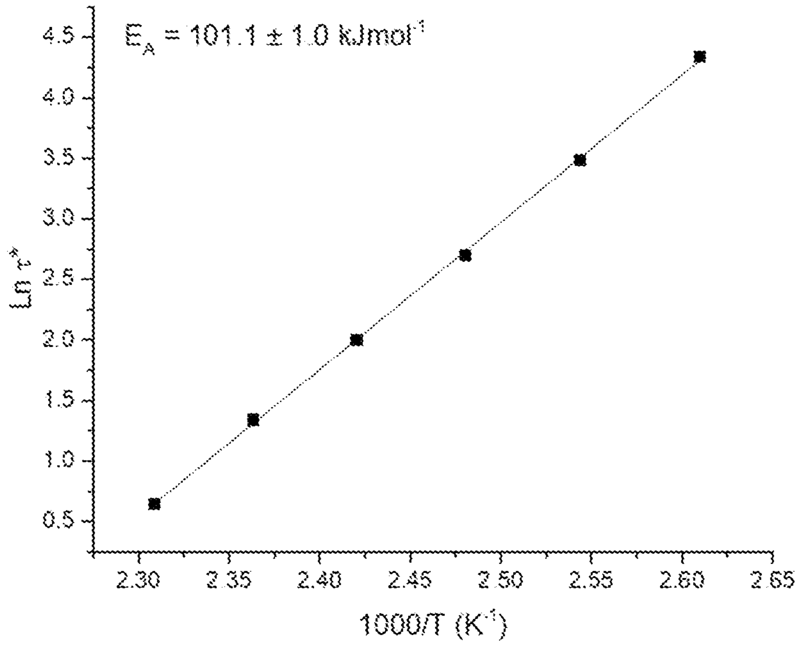
FIG. 13 depicts the Arrhenius plot of the obtained relaxation times for example 11H.
Figure 15:
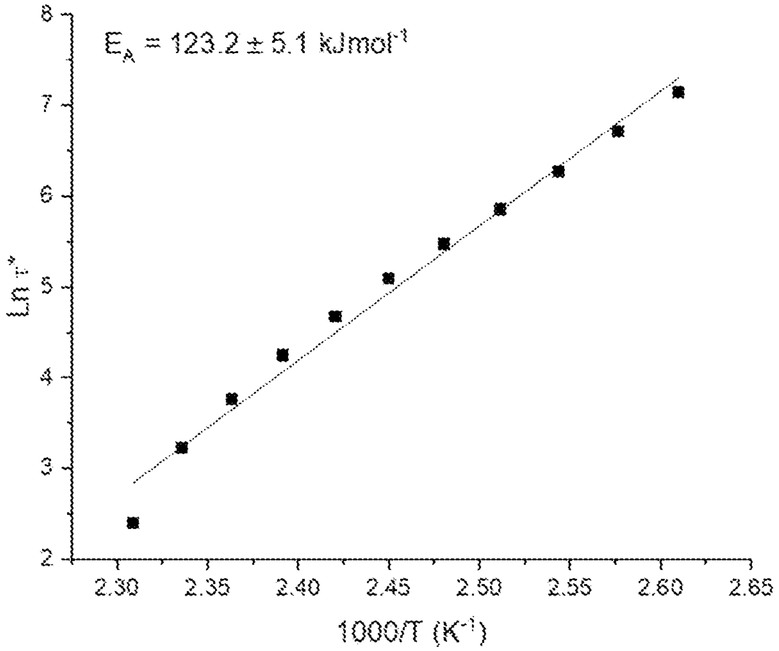
FIG. 15 depicts the Arrhenius plot of the obtained relaxation times for example 11J.
Figure 17:
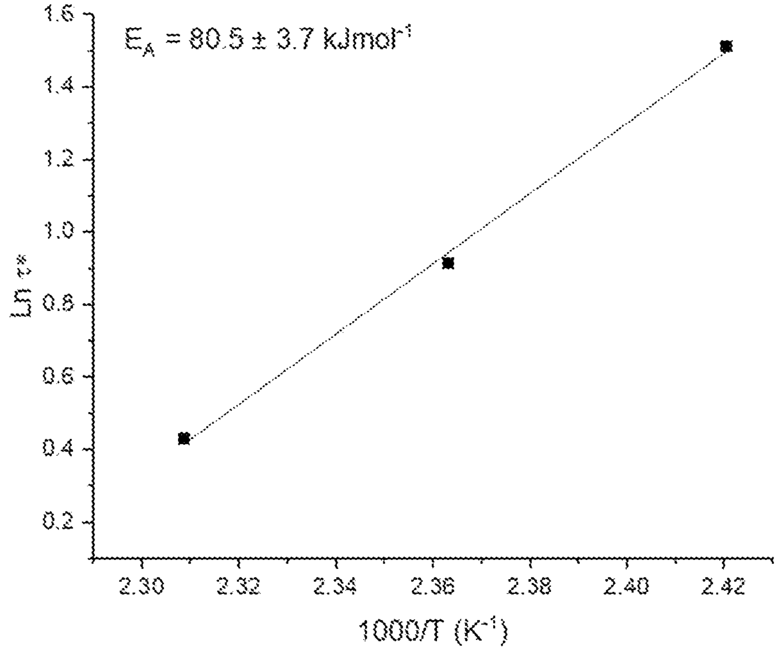
FIG. 17 depicts the Arrhenius plot of the obtained relaxation times for example 12G.
Figure 19:
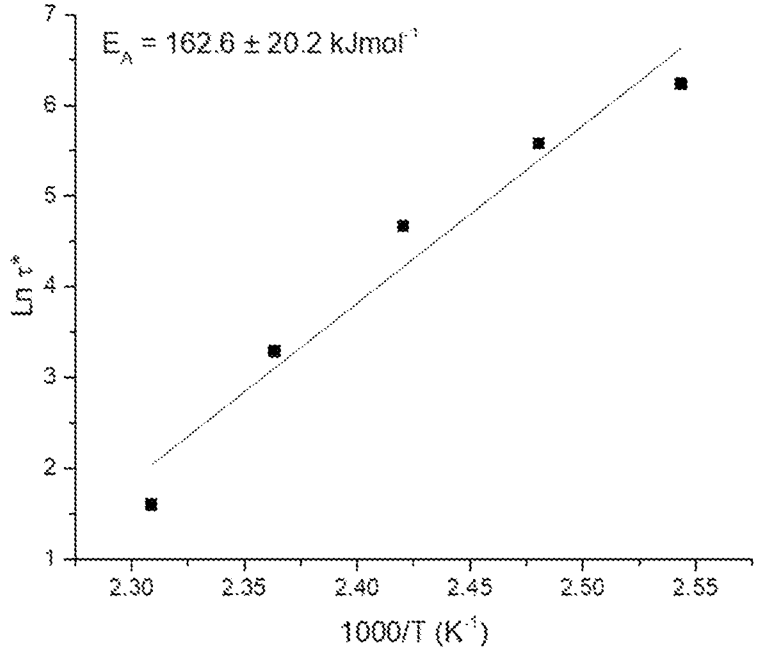
FIG. 19 depicts the Arrhenius plot of the obtained relaxation times for example 12H.
Figure 21:
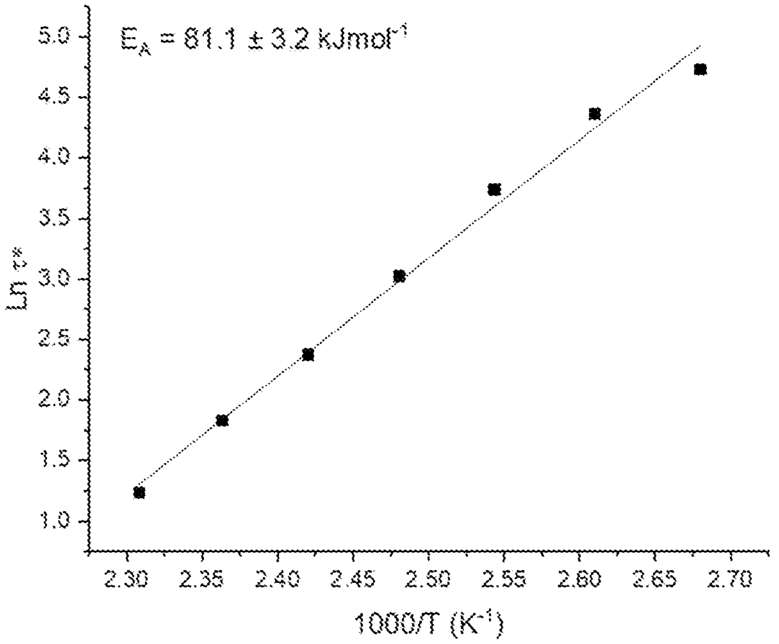
FIG. 21 depicts the Arrhenius plot of the obtained relaxation times for example 13K.
Figure 23:
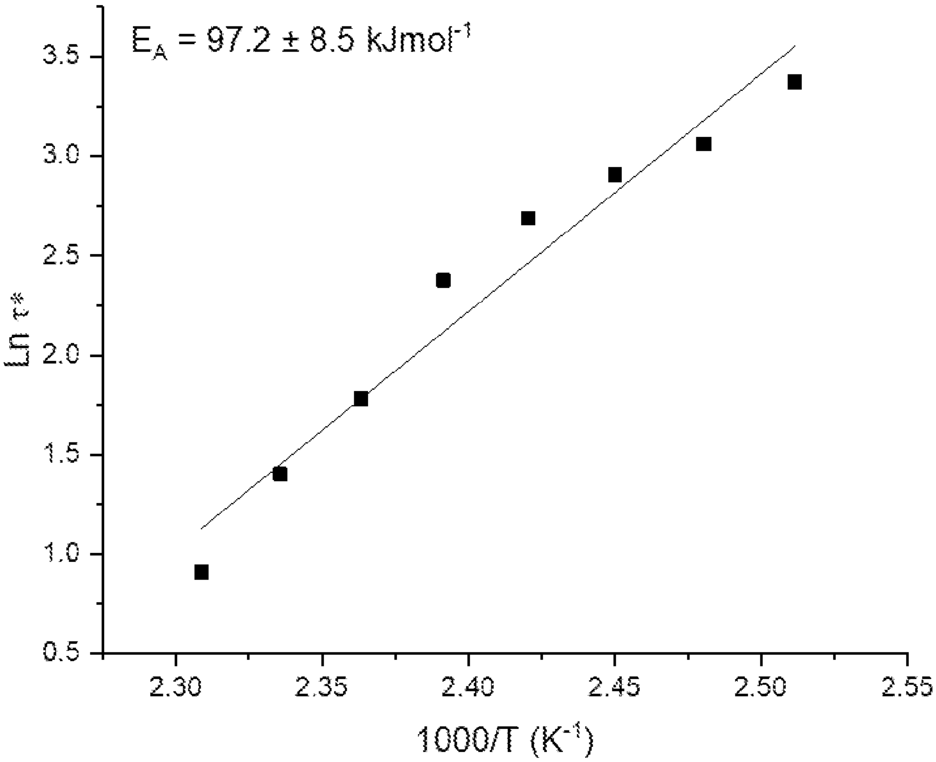
FIG. 23 depicts the Arrhenius plot of the obtained relaxation times for example 13L.
Figure 25:
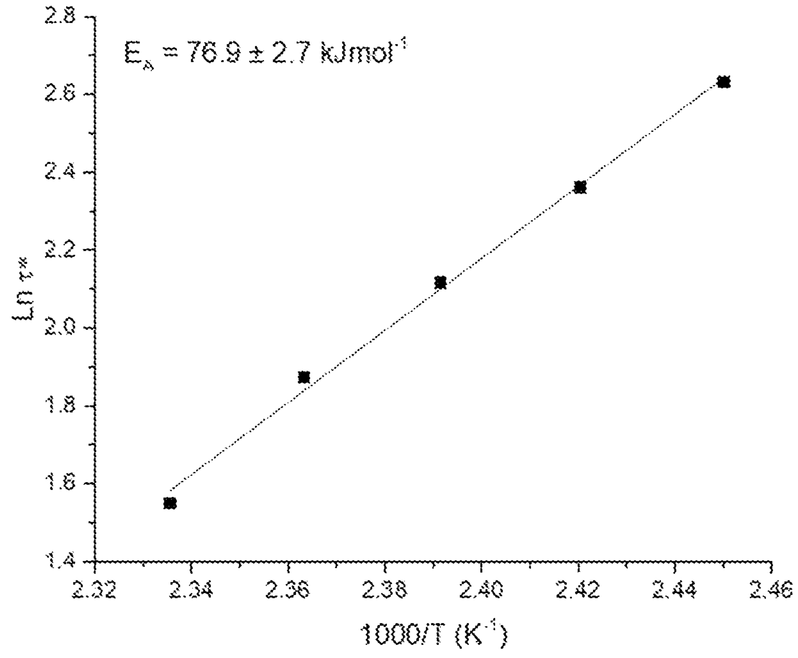
FIG. 25 depicts the Arrhenius plot of the obtained relaxation times for example 14L.

Normalised stress-relaxation plots of examples 11D, 11G, 11H, 11J, 12G, 12H, 13K, 13L and 14 L are shown in FIGS. 9, 11, 13, 15, 17, 19, 21, 23 and 25, respectively.

Figure 10:
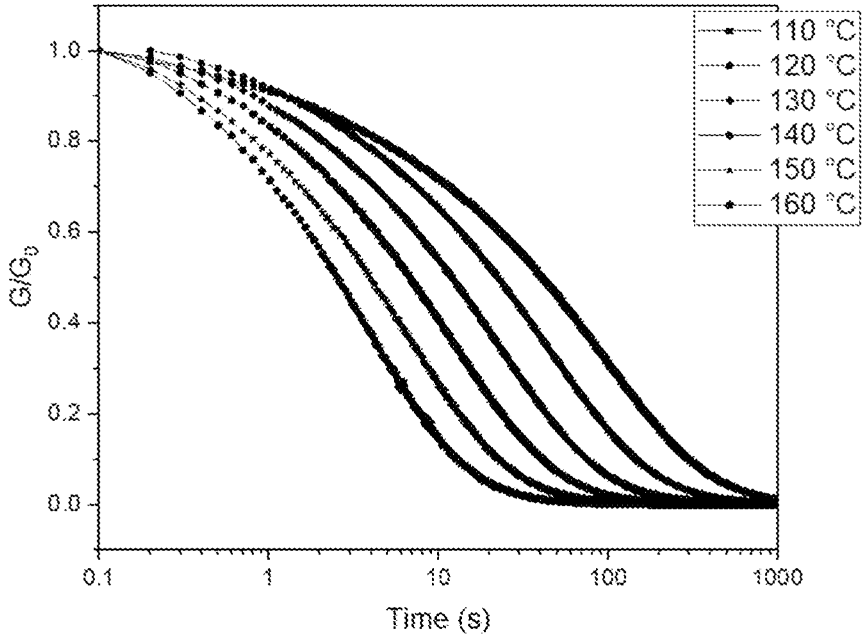
FIG. 10 depicts the stress relaxation experiments from 110-160° C. of example 11D. A constant strain of 1% was applied, which was within the linear viscoelastic region (LVER).
Figure 12:
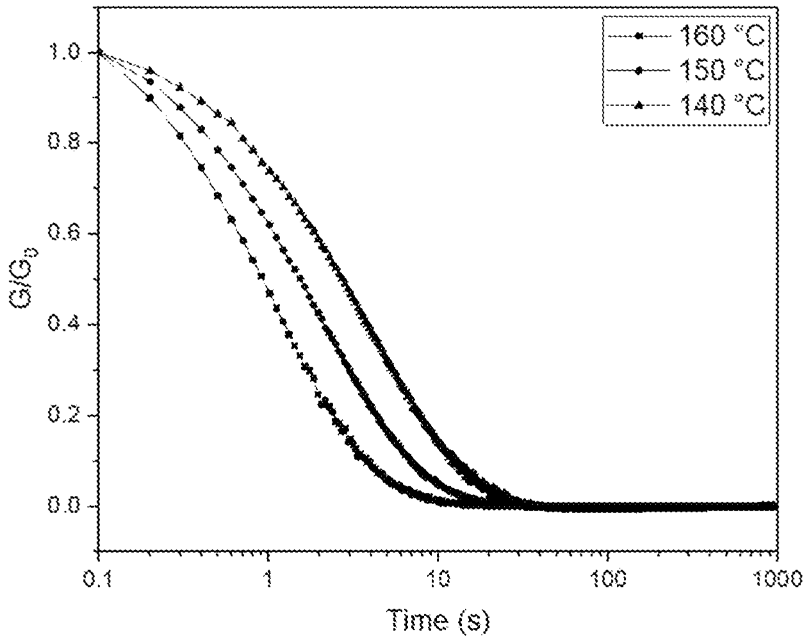
FIG. 12 depicts the stress relaxation experiments from 140-160° C. of example 11G. A constant strain of 1% was applied, which was within the linear viscoelastic region (LVER).
Figure 14:
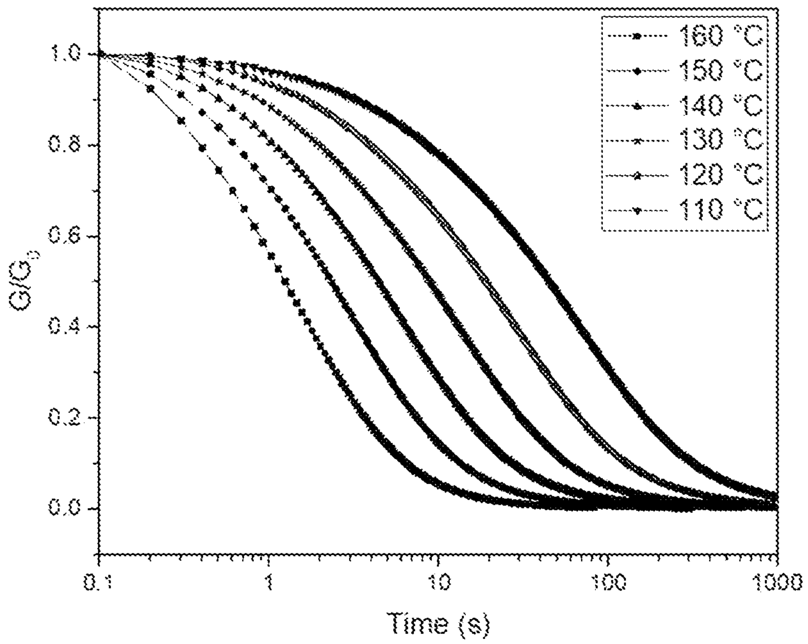
FIG. 14 depicts the stress relaxation experiments from 110-160° C. of example 11H. A constant strain of 1% was applied, which was within the linear viscoelastic region (LVER).
Figure 16:
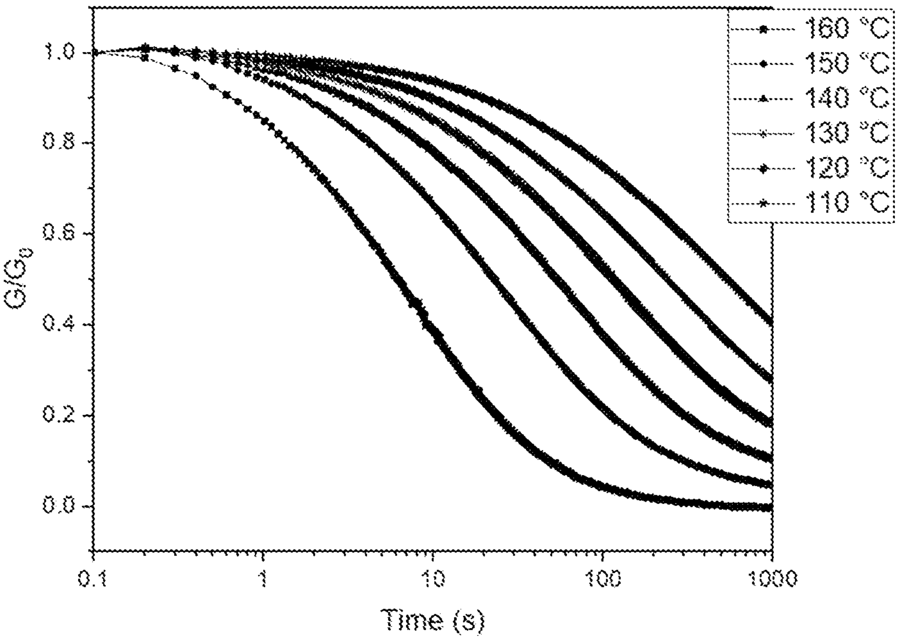
FIG. 16 depicts the stress relaxation experiments from 110-160° C. of example 11J. A constant strain of 0.5% was applied, which was within the linear viscoelastic region (LVER).
Figure 18:
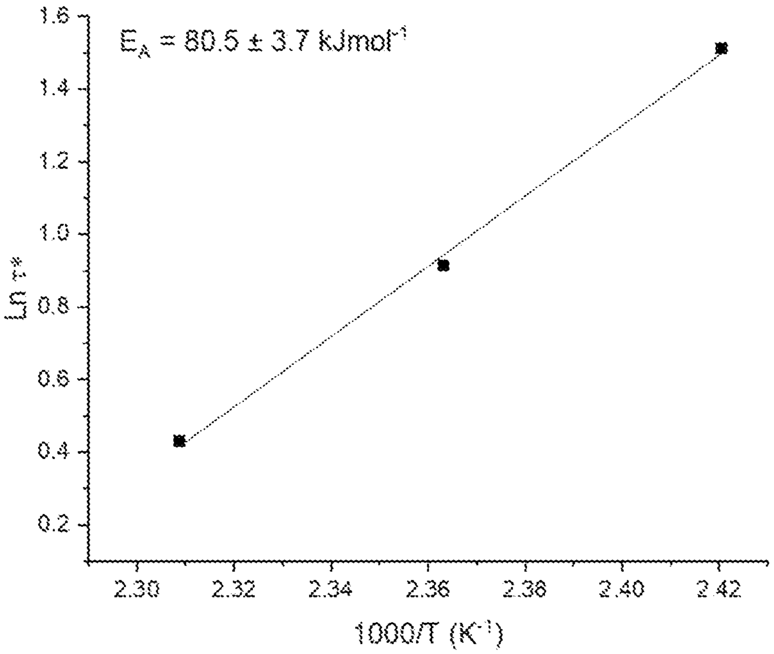
FIG. 18 depicts the stress relaxation experiments from 140-160° C. of example 12G. A constant strain of 1% was applied, which was within the linear viscoelastic region (LVER).
Figure 20:
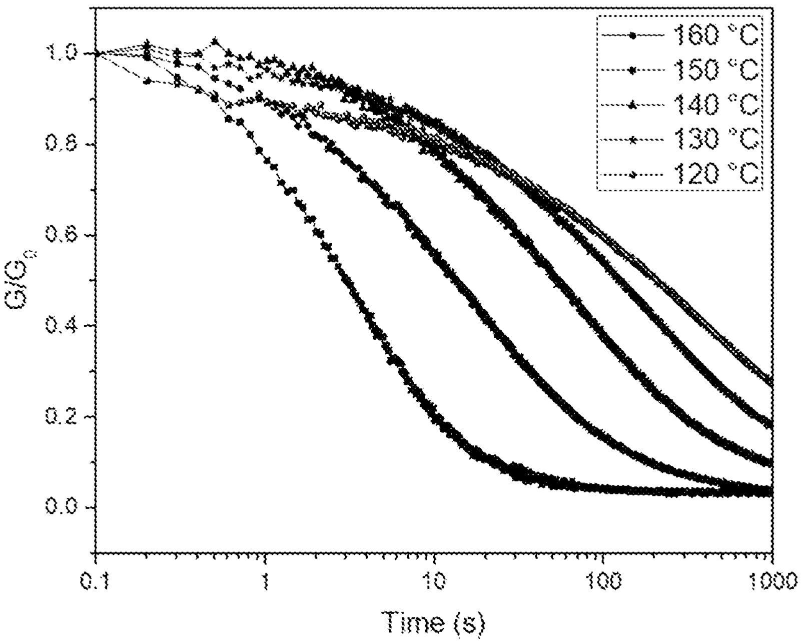
FIG. 20 depicts the stress relaxation experiments from 120-160° C. of example 12H. A constant strain of 0.1% was applied, which was within the linear viscoelastic region (LVER).
Figure 22:
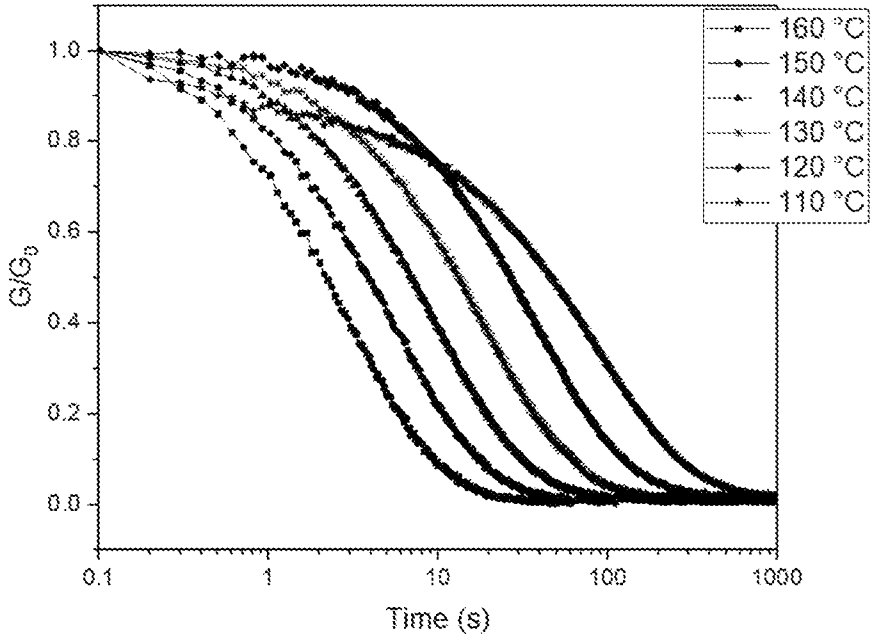
FIG. 22 depicts the stress relaxation experiments from 110-160° C. of example 13K. A constant strain of 0.1% was applied, which was within the linear viscoelastic region (LVER).
Figure 24:
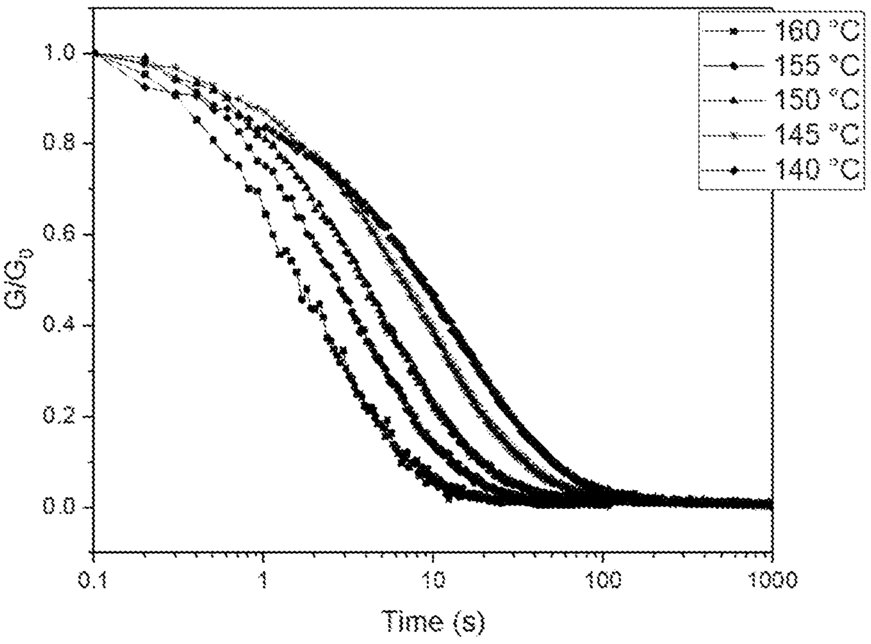
FIG. 24 depicts the stress relaxation experiments from 140-160° C. of example 13L. A constant strain of 0.1% was applied, which was within the linear viscoelastic region (LVER).
Figure 26:
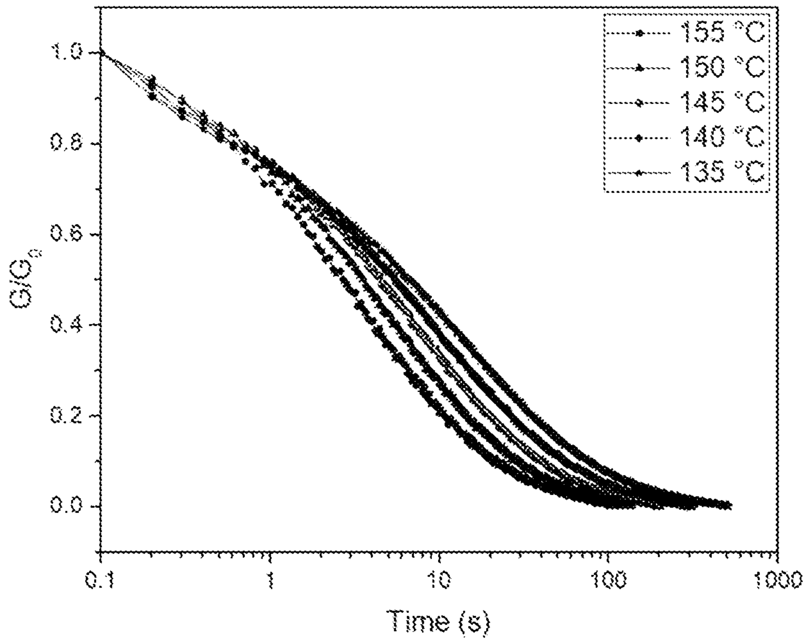
FIG. 26 depicts the stress relaxation experiments from 135-155° C. of example 14L. A constant strain of 0.1% was applied, which was within the linear viscoelastic region (LVER).

Arrhenius plots used to calculate the activation energies of examples 11D, 11G, 11H, 11J, 12G, 12H, 13K, 13L and 14 L are shown in FIGS. 10, 12, 14, 16, 18, 20, 22, 24 and 26, respectively.

The invention claimed is:

1. A composition comprising an epoxy-derived covalent adaptable network, said epoxy-derived covalent adaptable network comprising at least one unit of formula (I)

(I)

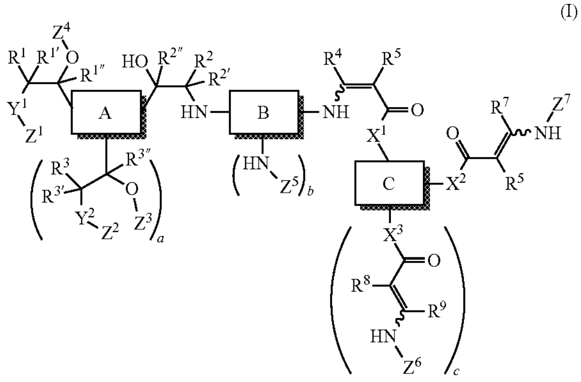

wherein $R^1$, $R^2$, $R^{1'}$, $R^{2'}$, $R^{1''}$, $R^{2''}$ and each occurrence of $R^3$, each occurrence of $R^{3'}$ and each occurrence of $R^{3''}$ are individually selected from the group consisting of H, alkyl, alkenyl, alkynyl, aryl, cycloalkyl, arylalkyl and polymeric groups, wherein one or wherein one or more of the carbon atoms in the backbone of said alkyl, alkenyl, alkynyl, aryl or cycloalkyl may be replaced by a heteroatom independently selected from O, S, N and Si and/or wherein said alkyl, alkenyl, alkynyl, aryl or cycloalkyl may be substituted;

$R^4$, $R^7$ and each occurrence of $R^9$ are individually selected from H or methyl;

$R^5$, $R^6$ and each occurrence of $R^8$ are individually selected from H or methyl;

$X^1$, $X^2$ and each occurrence of $X^3$ are individually selected from O, $CR^{10}R^{11}$ and $NR^{12}$;

$R^{10}$, $R^{11}$ and $R^{12}$ are individually selected from H or methyl;

$Y^1$ and $Y^2$ are individually selected from O and N;

$Z^1$, $Z^2$, $Z^6$ and $Z^7$ represent the remainder of the epoxy-derived covalent adaptable network;

$Z^3$, $Z^4$, and $Z^5$ represent H or the remainder of the epoxy-derived covalent adaptable network;

A represents an epoxide linking moiety;

B represents an amine linking moiety;

C represents a vinylogous precursor linking moiety;

a, b, and c individually represent an integer higher than or equal to 0;

a+b+c is greater than or equal to 1;

the epoxide linking moiety A, the amine linking moiety B and the vinylogous precursor linking moiety C each comprising or consisting of a group independently selected from the group consisting of alkyls, alkenyls, alkynyls, aryls, cycloalkyls and aryl alkyls, wherein one or more of the carbon atoms in the backbone of said alkyls, alkenyls, alkynyls, aryls, cycloalkyls and aryls alkyls may be replaced by a heteroatom independently selected from O, S, N and Si and/or wherein said alkyl, alkenyl, alkynyl aryl, cycloalkyl or arylalkyl may be unsubstituted or further substituted; and wherein the composition further comprises primary amine groups.

2. A method for preparing a composition comprising an epoxy-derived covalent adaptable network, comprising the following steps:

a) providing at least one amine of formula (II) comprising primary amine groups, at least one vinylogous precursor of formula (III) comprising vinylogous precursor groups, and at least one epoxide comprising (2+a) epoxide groups (II)

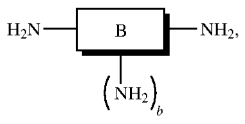

(III)

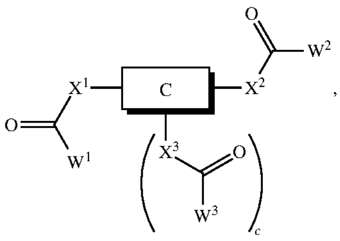

wherein $X^1$, $X^2$ and each occurrence of $X^3$ are individually selected from O, $CR^{10}R^{11}$ and $NR^{12}$;

$R^{10}$, $R^{11}$ and $R^{12}$ are individually selected from H or methyl;

$W^1$, $W^2$ and each occurrence of $W^3$ each represent a functional groups so that —$X^1$—C(═O)—$W^1$, —$X^2$—C(═O)—$W^2$ and —$X^3$—C(═O)—We constitute a vinylogous precursor group;

B represents an amine linking moiety;

C represents a vinylogous precursor linking moiety;

wherein the amine linking moiety B and the vinylogous precursor linking moiety C each comprising or consisting of a group independently selected from the group consisting of alkyls, alkenyls, alkynyls, aryls, cycloalkyls and aryl alkyls, wherein one or more of the carbon atoms in the backbone of said alkyls, alkenyls, alkynyls, aryls, cycloalkyls and aryls alkyls may be replaced by a heteroatom independently selected from O, S, N and Si and/or wherein said alkyl, alkenyl, alkynyl aryl, cycloalkyl or arylalkyl may be unsubstituted or further substituted;

a, b, and c individually represent an integer higher than or equal to 0;

and b) contacting the compounds provided in step (a) thereby obtaining an epoxy-derived covalent adaptable network;

wherein a vinylogous precursor group consists of or comprises a functional group which is capable of forming a vinylogous urethane, vinylogous amide or vinylogous urea upon reacting with a primary amine;

wherein the average functionality F, determined before the compounds are contacted and determined over all compounds provided in step (a), is at least 2.01, the average functionality F being defined as $$F = \frac{\sum n_i(2+a_i) + \sum n_j(2+b_j) + \sum n_k(2+c_k)}{\sum n_i + \sum n_j + \sum n_k}$$

wherein $n_i$ is the number of moles of epoxide with functionality (2+$a_i$); $n_j$ is the number of moles of amine of formula (II) with functionality (2+$b_j$) and $n_k$ is the number of moles of vinylogous precursor of formula (III) with functionality (2+$C_k$); and wherein the ratio P, determined before the compounds are contacted and determined over all compounds provided in step (a), is more than 1, the ratio P being defined as $$P = \frac{\sum n_j(2+b_j)}{\sum n_i(2+a_i) + \sum n_k(2+c_k)}.$$

3. The method according to claim 2 wherein the epoxide comprising (2+a) epoxide groups provided in step (a) is an epoxidized terpene or a co-polymer thereof;

an epoxidized polydiene or a co-polymer thereof;

an epoxidized vegetable oil or a co-polymer thereof; or a compound of formula (VII)

(VII)

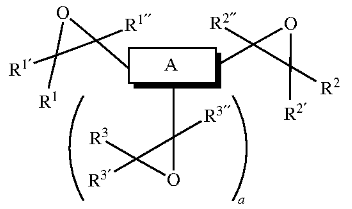

wherein $R^1$, $R^2$ and each occurrence of $R^3$ are individually selected from H or methyl;

$R^{1'}$, $R^{2'}$ and each occurrence of $R^{3'}$ are individually selected from H or methyl;

$R^{1''}$, $R^{2''}$ and each occurrence of $R^{3''}$ are individually selected from H or methyl;

a represents an integer higher than or equal to 0, ; and A represents an epoxide linking moiety, wherein the epoxide linking moiety A comprises or consists of a group selected from the group consisting of alkyls, alkenyls, alkynyls, aryls, cycloalkyls and aryl alkyls, wherein one or more of the carbon atoms in the backbone of said alkyls, alkenyls, alkynyls, aryls, cycloalkyls and aryls alkyls may be replaced by a heteroatom selected from O, S, N and Si and/or wherein said alkyl, alkenyl, alkynyl aryl, cycloalkyl or arylalkyl may be unsubstituted or further substituted.

4. The method according to claim 2 wherein step (b) comprises contacting the compounds provided in step (a) such that the ratio P is more than 1.005.

5. The method according to claim 2 wherein step (b) comprises contacting the compounds provided in step (a) such that the average functionality F is more than 2.02 and/or less than 4.

6. The method to claim 2, wherein step (b) comprises contacting the compounds provided in step (a) such that the ratio of the number of vinylogous precursor groups to the sum of the number of epoxide groups and the number of vinylogous precursor groups, determined before the compounds are contacted and determined over all compounds provided in step (a) is in the range of 0.1-0.8, preferably in the range of 0.2-0.6, more preferably in the range of 0.3-0.5, most preferably in the range of 0.35-0.45.

7. The method according to claim 2 wherein the vinylogous precursor of formula (III) is 1,3 dicarbonyl of formula (IV), an alkynon of formula (V), or an alkenon of formula (VI)

(IV)

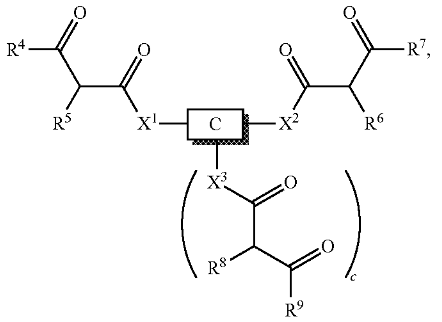

(V)

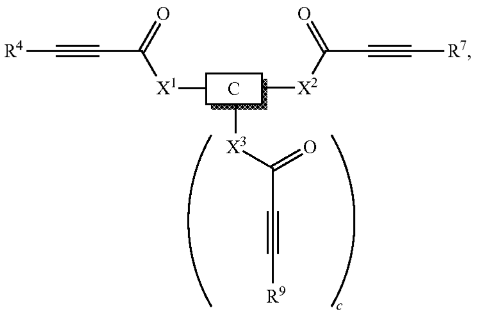

(VI)

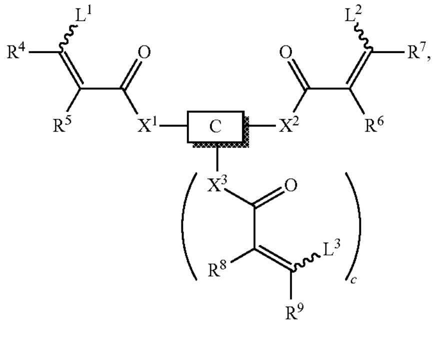

wherein $R^4$, $R^7$ and each occurrence of $R^9$ are individually selected from H, methyl or phenyl;

$R^5$, $R^6$ and each occurrence of $R^8$ are individually selected from H or methyl;

$X^1$, $X^2$ and each occurrence of $X^3$ have the same meaning as defined herein before;

C represents a vinylogous precursor linking moiety; and $L^1$, $L^2$ and each occurrence of $L^3$ represent a leaving group which can be displaced upon reaction with a primary amine.

8. The method according to claim 2, wherein step (b) comprises the following steps b1) contacting at least part of the amine of formula (II) with at least part of the vinylogous precursor of formula (III) to obtain a composition comprising a vinylogous curing agent;

b3) contacting the composition comprising the vinylogous curing agent of step (b1) or (b2) with the epoxide comprising at least (2+a) epoxide groups and optional remaining reagents provided in step (a), thereby obtaining an epoxy-derived CAN.

9. The method to claim 2 wherein step (a) comprises providing an amine according to formula (II) in the form of a primary amine precursor.

10. The method according to claim 3 wherein the epoxide comprising (2+a) epoxide groups provided in step (a) is a compound selected from the group consisting of diglycidyl ethers, triglycidyl ethers, diglycidyl amines, triglycidyl amines, diglycidyl isocyanurates and triglycidyl isocyanurates.

11. The method according to claim 2 wherein the compound of formula (II) provided in step (a) is a compound selected from the group consisting of Diethylenetriamine (DTA); triethylenetetramine; 2,2-Dimethyl-1,3-propanediamine; 4,4'-Methylenebis(2-methylcyclohexylamine); Menthane diamine; Isophoronediamine; 4-4'-Diaminocyclohexylmethane; 1,2-Diaminocyclohexane; 1,3-Bis (Aminomethyl) cyclohexane; m-xylenediamine; Diaminodiphenylmethane; 2-2'-(Ethylenedioxy) bis(ethylamine); Poly(propylene glycol) bis(2-aminopropyl ether); and Tris(2-aminomethyl) amine.

12. The method according to claim 2 wherein the compounds of formula (III) is a 1,3 dicarbonyl of formula (IV), alkynon of formula (V), or alkenon of formula (VI) obtainable from converting the alcohol groups in a compound selected from the group consisting of 1,4-Benzenedimethanol; 1,4-Cyclohexanedimethanol; 1,2-Ethanediol; 1,10-Decanediol; Trimethylolpropane; 2,2'-Biphenyl dimetanol; 2,4-Dimethyl-2,4-pentanediol; 1,2-Cyclohexanediol; Isosorbide; Di(trimethylolpropane); Dipentaerythritol; and 2,2-Dimethyl-1,3-propanediol into 1,3 dicarbonyls, alkynons or alkenons.

13. A composition comprising an epoxy-derived covalent adaptable network obtainable by the method according to claim 2.

14. A composite comprising the composition according to claim 1 and at least one fiber material.

15. The composite of claim 14 wherein the at least one fiber material is selected from the group consisting of glass fibers, carbon fibers or combinations thereof.

16. The method according to claim 2, wherein step (b) comprises the following steps:

b1) contacting at least part of the amine of formula (II) with at least part of the vinylogous precursor of formula (III) to obtain a composition comprising a vinylogous curing agent;

b2) reducing the water content of the composition comprising the vinylogous curing agent of step (b1); and b3) contacting the composition comprising the vinylogous curing agent of step (b1) or (b2) with the epoxide comprising at least (2+a) epoxide groups and optional remaining reagents provided in step (a), thereby obtaining an epoxy-derived CAN.

17. The method according to claim 10 wherein the epoxide comprising (2+a) epoxide groups provided in step (a) is a compound selected from the group consisting of Tris(4-hydroxyphenyl) methane, Trimethylolpropane triglycidyl ether; Bisphenol A diglycidyl ether; Bisphenol F diglycidyl ether; Bisphenol C diglycidyl ether; Bisphenol E diglycidyl ether; Bisphenol BP diglycidyl ether; Bisphenol FC diglycidyl ether; Bisphenol Z diglycidyl ether; 1,6-Hexanediol diglycidyl ether; 1,4-Butanediol diglycidyl ether; Triglycidylisocyanuraat; Hydrogenated Bisphenol A diglycidyl ether; Hydrogenated Bisphenol F diglycidyl ether; Hydrogenated Bisphenol C diglycidyl ether; Hydrogenated Bisphenol E diglycidyl ether; Hydrogenated Bisphenol BP diglycidyl ether; Hydrogenated Bisphenol FC diglycidyl ether; Hydrogenated Bisphenol Z diglycidyl ether; 1,6-Naphthalenediol diglycidyl ether; Neopentyl glycol diglycidyl ether; Poly(propylene glycol) diglycidyl ether; 4,4'-Methylenebis(N,N-diglycidylaniline); and N,N-diglycidyl-4-glycidyloxyaniline.

* * * * *